United States Patent
Madisetti et al.

(10) Patent No.: US 12,405,978 B2
(45) Date of Patent: Sep. 2, 2025

(54) METHOD AND SYSTEM FOR OPTIMIZING USE OF RETRIEVAL AUGMENTED GENERATION PIPELINES IN GENERATIVE ARTIFICIAL INTELLIGENCE APPLICATIONS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 19/051,820

(22) Filed: Feb. 12, 2025

(65) Prior Publication Data
US 2025/0190460 A1    Jun. 12, 2025

Related U.S. Application Data

(63) Continuation-in-part of application No. 19/040,471, filed on Jan. 29, 2025, which is a continuation-in-part (Continued)

(51) Int. Cl.
*G06F 16/3329* (2025.01)
*G06F 40/284* (2020.01)

(52) U.S. Cl.
CPC ........ *G06F 16/3329* (2019.01); *G06F 40/284* (2020.01)

(58) Field of Classification Search
CPC ............................ G06F 16/3329; G06F 40/284
See application file for complete search history.

(56) References Cited

U.S. PATENT DOCUMENTS

| | | | |
|---|---|---|---|
| 5,410,475 A | 4/1995 | Lu et al. | |
| 8,346,791 B1 * | 1/2013 | Shukla | G06F 16/3338 707/759 |

(Continued)

OTHER PUBLICATIONS

Non Final Office Action received in related U.S. Appl. No. 19/040,471 issued on Apr. 9, 2025; 11 pages.

(Continued)

*Primary Examiner* — Eric Yen
(74) *Attorney, Agent, or Firm* — Daniel C. Pierron; Widerman Malek, PL

(57) ABSTRACT

A method of generating outputs in LLMs including receiving including textual content, defining a context for the documents including identifying a topic or a category, segmenting the textual content into content chunks associated with the topic or category, assigning a tag to each content chunk, identifying selected chunks, adding metadata to the selected chunks indexing the selected chunks, receiving a query, and performing a response generation process including determining if a cache includes information for the query and either retrieving the information from the cache or performing a search of the index to retrieve the information, generating an augmented query by augmenting the query with retrieved information, generating a response from the augmented query, evaluating the response for compliance with criteria, and one of generating a final response and transmitting the final response to the user or performing a fine-tuning process comprising redefining the of the one or more contexts.

24 Claims, 67 Drawing Sheets

Related U.S. Application Data of application No. 18/921,852, filed on Oct. 21, 2024, which is a continuation-in-part of application No. 18/812,707, filed on Aug. 22, 2024, which is a continuation-in-part of application No. 18/470,487, filed on Sep. 20, 2023, now Pat. No. 12,147,461, which is a continuation of application No. 18/348,692, filed on Jul. 7, 2023, now Pat. No. 12,001,462.

(60) Provisional application No. 63/742,792, filed on Jan. 7, 2025, provisional application No. 63/693,351, filed on Sep. 11, 2024, provisional application No. 63/647,092, filed on May 14, 2024, provisional application No. 63/607,647, filed on Dec. 8, 2023, provisional application No. 63/607,112, filed on Dec. 7, 2023, provisional application No. 63/535,118, filed on Aug. 29, 2023, provisional application No. 63/534,974, filed on Aug. 28, 2023, provisional application No. 63/529,177, filed on Jul. 27, 2023, provisional application No. 63/469,571, filed on May 30, 2023, provisional application No. 63/463,913, filed on May 4, 2023.

(56) References Cited

U.S. PATENT DOCUMENTS

| | | | |
|---|---|---|---|
| 11,928,569 | B1 | 3/2024 | Douthit |
| 12,020,140 | B1 * | 6/2024 | Mondlock ............ G06N 3/0455 |
| 12,039,263 | B1 * | 7/2024 | Mondlock ............... G06F 40/20 |
| 12,242,503 | B1 | 3/2025 | Kelsey et al. |
| 2007/0244937 | A1 | 10/2007 | Flynn, Jr. et al. |
| 2008/0140616 | A1 * | 6/2008 | Encina .................... G06F 16/31 |
| 2009/0182741 | A1 * | 7/2009 | Chen ..................... G06F 3/0237 |
| 2009/0254512 | A1 * | 10/2009 | Broder .................. G06Q 30/02 |
| 2009/0271700 | A1 * | 10/2009 | Chen ...................... G06Q 10/10 715/261 |
| 2010/0138531 | A1 | 6/2010 | Kashyap |
| 2011/0179075 | A1 * | 7/2011 | Kikuchi .................. G06F 16/93 707/769 |
| 2012/0023073 | A1 | 1/2012 | Dean et al. |
| 2012/0290521 | A1 | 11/2012 | Frank et al. |
| 2014/0297845 | A1 | 10/2014 | Tamura |
| 2018/0095845 | A1 | 4/2018 | Sanakkayala et al. |
| 2019/0081959 | A1 | 3/2019 | Yadav et al. |
| 2019/0130902 | A1 | 5/2019 | Itoh et al. |
| 2019/0354630 | A1 * | 11/2019 | Guo ........................ G10L 15/08 |
| 2021/0406735 | A1 * | 12/2021 | Nahamoo ......... G06F 16/24522 |
| 2022/0124013 | A1 | 4/2022 | Chitalia et al. |
| 2022/0156262 | A1 * | 5/2022 | Chen ................... G06F 21/6227 |
| 2024/0289560 | A1 | 8/2024 | Kelly et al. |
| 2024/0354130 | A1 | 10/2024 | Cadoni et al. |
| 2024/0354490 | A1 | 10/2024 | Chauvin et al. |
| 2024/0404687 | A1 | 12/2024 | Bell et al. |
| 2024/0412029 | A1 | 12/2024 | Yang et al. |
| 2025/0005523 | A1 * | 1/2025 | Katta .................... G06F 40/186 |
| 2025/0036866 | A1 * | 1/2025 | Tunstall-Pedoe ....... G06F 40/20 |
| 2025/0045256 | A1 | 2/2025 | Gottlob et al. |

OTHER PUBLICATIONS

Notice of Allowance received in related U.S. Appl. No. 18/812,707 issued on May 20, 2025; 26 pages.

Notice of Allowance received in related U.S. Appl. No. 18/921,852 issued Jun. 20, 2025; 25 pages.

* cited by examiner

METHOD AND SYSTEM FOR OPTIMIZING USE OF RETRIEVAL AUGMENTED GENERATION PIPELINES IN GENERATIVE ARTIFICIAL INTELLIGENCE APPLICATIONS

RELATED APPLICATIONS

This application is a continuation-in-part application of and claims priority under 35 U.S.C. § 120 of U.S. patent application Ser. No. 19/040,471 filed on Jan. 29, 2025 and titled Method and System for Multi-Level Artificial Intelligence Supercomputer Design, which in turn claims priority under 35 U.S.C. § 119 (e) of U.S. Provisional Patent Application Ser. No. 63/742,792 filed on Jan. 7, 2025 and titled Hierarchical Tokens for Fine Tuning and Model Training and is a continuation-in-part application of and claims priority under 35 U.S.C. § 120 of U.S. patent application Ser. No. 18/921,852 filed on Oct. 21, 2024 and titled Fault Tolerant Multi-Agent Generative AI Applications, which in turn claims priority under 35 U.S.C. § 119 (e) of U.S. Provisional Patent Application Ser. No. 63/693,351 filed on Sep. 11, 2024 and titled Fault Tolerant MultiAgent Generative AI Applications and is a continuation-in-part application of and claims priority under 35 U.S.C. § 120 of U.S. patent application Ser. No. 18/812,707 filed on Aug. 22, 2024 and titled Method and Systems for Optimizing User of Retrieval Augmented Generation Pipelines in Generative Artificial Intelligence Applications, which in turn claims priority under 35 U.S.C. § 119 (e) of U.S. Provisional Patent Application Ser. No. 63/647,092 filed on May 14, 2024 and titled Using LLMs to Influence Users and Organizations, U.S. Provisional Patent Application Ser. No. 63/607,647 filed on Dec. 8, 2023 and titled High-Level UI for Prompt Generation for LLMs, U.S. Provisional Patent Application Ser. No. 63/607,112 filed on Dec. 7, 2023 and titled Long Document Attention Span Enhancement for LLMs, U.S. Provisional Patent Application Ser. No. 63/535,118 filed on Aug. 29, 2023 and titled Networked LLMs and Focused LLMs, U.S. Provisional Patent Application Ser. No. 63/534,974 filed on Aug. 28, 2023 and titled Using Prompts to Generate Search Queries for Context Generation in LLMs, and U.S. Provisional Patent Application Ser. No. 63/529,177 filed on Jul. 27, 2023 and titled Using LLMs to Create Projects and Tasks in an Optimized Way, and is also a continuation-in-part application of and claims priority under 35 U.S.C. § 120 of U.S. patent application Ser. No. 18/470,487, now U.S. Pat. No. 12,147,461, issued Nov. 19, 2024 filed on Sep. 20, 2023 and titled Method and System for Multi-Level Artificial Intelligence Supercomputer Design, which in turn is a continuation application of and claims priority under 35 U.S.C. § 120 of U.S. patent application Ser. No. 18/348,692, now U.S. Pat. No. 12,001,462, issued Jun. 4, 2024 filed on Jul. 7, 2023 and titled Method and System for Multi-Level Artificial Intelligence Supercomputer Design, which in turn claims priority under 35 U.S.C. § 119 (e) of U.S. Provisional Patent Application Ser. No. 63/469,571 filed on May 30, 2023 and titled Multilevel AI PSupercomputer Design and U.S. Provisional Patent Application Ser. No. 63/463,913 filed on May 4, 2023 and titled New Tools for Document Analysis in CatchUp. The contents of these applications are incorporated herein by reference.

FIELD OF THE INVENTION

The present invention primarily relates to artificial intelligence and large language models (LLMs) for generative AI applications.

BACKGROUND

Large Language Models (LLMs) are generative Artificial Intelligence (AI) models which are trained on limited amounts of data and can perform language processing tasks (with multimodal inputs—text, and more recently, image inputs as in Microsoft's Kosmos-1) and generate human-like text (and associated multimedia material, like images, video and advertisements). LLMs have many parameters (from millions to billions). LLMs can capture complex patterns in language and produce text that closely resembles human language.

The high-level goal of an LLM is to predict the text (and other multimedia material) that is likely to come next in a sequence. The applicants recognize that LLMs are a type of generative AI that is in usually different from traditional machine learning and AI applications. LLM also stands for Learning with Limited Memory and implies that LLM's are closely tied to their training data and make decisions based on the limited amount of data. Both generative AI and LLM generate content, but LLM does it in a manner that improves computational and memory efficiency.

Traditional machine learning type algorithms focus on analysis, such as statistical regression or clustering, and are usually again different from Generative AI and LLMs, which focus on generating content. LLMs have immediate practical implication in generation of new content that matches associated or preceding/future content in an optimized manner, such as legal briefs or computer code, based on training with a limited amount of data, such as existing briefs or code, both from private and public sources. In this invention, we focus on LLM models as the primary focus of these improvements, though we do not disclaim other AI models, unless expressly done as part of the claims.

LLMs are created with complex architectures such as transformers, encoders and decoders. LLMs, typically, use a technique of natural language processing called Tokenization that involves splitting the input text (and images) and output texts into smaller units called tokens. Tokens can be words, characters, sub-words, or symbols, depending on the type and the size of the model. Tokenization helps to reduce the complexity of text data, making it easier for LLMs to process and understand data thus reducing the computational and memory costs. Another important component of an LLM is Embedding, which is a vector representation of the tokens. The Encoder, within the Transformer architecture, processes the input text and converts it into a sequence of vectors, called embeddings, that represent the meaning and context of each word. The Decoder, within the Transformer architecture, generates the output text by predicting the next word in the sequence, based on the embeddings and the previous words. LLMs use Attention mechanisms that allow the models to focus selectively on the most relevant parts of the input and output texts, depending on the context of the task at hand, thus capturing the long-range dependencies and relationships between words.

LLMs are designed to learn the complexity of the language by being pre-trained on vast amounts of text (and multimedia) data from sources such as Wikipedia, books, articles on the web, social media data and other sources. The training procedure can be decomposed into two stages:

1. Pre-training on a large amount of unlabeled plain text; and
2. Supervised fine-tuning Through training on limited amounts of data, the models are able to learn the statistical relationships between words, phrases, and sentences and other multimedia content. The trained models can then be used for generative AI applications such as Question Answering, Instruction Following, Inferencing, for instance, where an input is given to the model in the form of a prompt and the model is able to generate coherent and contextually relevant responses based on the query in the prompt.

Popular LLM models include GPT (Generative Pre-trained Transformer), BERT (Bidirectional Encoder Representations from Transformers), BART (Bidirectional and Auto-Regressive Transformers) and PaLM (Pathways Language Model). See, for example, public domain websites, such as openai.com or bard.google.com for more information as to how a person of ordinary skill in the art may use these models. Public domain and company-specific LLMs, such as GPT4All, MiniGPT4, RMKV, BERT, MPT-7B, Kosmos-1 (which accepts image and multimodal inputs), YaLM, are also available for wide use, as for example, described in medium.datadriveninvestor.com/list-of-open-source-large-language-models-llms-4eac551bda2e.

Current AI generative models and LLMs require supercomputing efforts to compute results and an efficient way to improve response times, accuracies, and reduce computational load is required to improve both cost and scalability and expandability of existing AI models and their use.

LLMs face significant challenges when processing long documents, particularly in maintaining coherence and performing long-range reasoning. This limitation, often referred to as the "attention span problem," causes a noticeable drop in performance as the length of the input context increases, typically above 10,000 to 50,000 tokens.

The attention span problem has substantial implications for real-world applications, especially in domains that frequently deal with lengthy and complex documents, such as legal, engineering, healthcare, and academic research. In these fields, the ability to comprehend and reason over extended contexts is crucial for tasks like document summarization, question answering, and information extraction.

Existing approaches to mitigate the attention span problem, such as sliding window techniques or hierarchical attention mechanisms, have shown limited success. They often struggle to maintain global coherence or fail to capture long-range dependencies effectively. As a result, there is a pressing need for innovative solutions that can enhance the attention span of LLMs and enable them to process long documents more effectively.

LLMs face inherent limitations due to their reliance on pre-trained knowledge. These include a fixed knowledge cutoff, potential for hallucination, and lack of specificity in responses. Retrieval-Augmented Generation (RAG) is a useful approach in AI that combines the strengths of LLMs with external knowledge retrieval. RAG addresses the limitations of LLMs by providing them with relevant, up-to-date information from a curated knowledge base. This approach grounds LLM outputs in retrieved facts, significantly reducing hallucinations while enabling more accurate and context-specific responses.

Existing RAG systems have shown promise in enhancing the performance of LLMs by providing relevant context from external knowledge sources. However, these systems face significant challenges in processing and retrieving information from long, complex documents. Current RAG implementations often struggle with inefficient document chunking, leading to loss of context and semantic coherence. They typically rely on simplistic keyword-based retrieval methods, which fail to capture the nuanced graph-like relationships between concepts. Moreover, existing systems lack sophisticated mechanisms for dynamically adapting to different types of queries and documents, resulting in suboptimal retrieval and generation performance. The inability to effectively handle large volumes of text, combined with inadequate context preservation and limited semantic understanding, hinders the widespread adoption of RAG systems in domains that deal with extensive and intricate textual information, such as legal, medical, engineering, and scientific research fields.

LLMs face significant challenges in managing context windows and maintaining semantic coherence across long documents. While existing approaches like Retrieval Augmented Generation (RAG) and Hierarchical Navigable Small World (HNSW) indexes have made progress in addressing these challenges, they still operate primarily at the token level, which can limit their effectiveness in capturing and utilizing higher-level functional relationships within text.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for multi-level generative AI and large language models (LLM) for generative AI applications, that utilize the following techniques:

Derived Requests: An initial level of generative AI software program, or AI broker, evaluates the incoming client request (maybe a conversational query or through an API, such as OpenAI API) and identifies its specific AI "characteristics" that may make it suitable for one or other or both or multiple AI language models and checks its "derived requests" categories to see if the query suits one of the "derived requests" categories and/or it can or should create a new request.

Multiple h-LLMs: If the new request does is not assigned to one or more of the "derived requests) categories, it evaluates the request and selects one or more AI h-LLM model categories for its evaluation. An h-LLM is a family of models, such as GPT-4, that (in addition) have been trained according to a particular training set T1. A family of generative models, LLM1, trained with a data set T1, can be represented as h-LLM1, while a family of models, LLM2, trained with data set T2, can be represented as h-LLM12. Further, a family of models, LLM1, trained with a data set T3, can be represented as h-LLM35. The combination of models and their training sets (T1 could be a subset of T3, for example, or they can be different) may be used in our proposed invention and they are referred to as h-LLMs, throughout. A family of LLMs that operate at a lower arithmetic precision, on computer CPUs or graphical processing units (GPUs, such as Nvidia's H100), may also be called by a different identifier, e.g., h-LLM14, when trained with its corresponding data set.

Choosing h-LLMs with varying levels of accuracy: It further checks the workload of the AI h-LLM models in the one or more categories and its level of training and its accuracy-called its workload scores or its technical accuracy scores, or its business value metrics or a combination of these scores, and then assigns the request (or its derived form) to one or more of the AI h-LLM models within the selected AI h-LLM model categories.

Assigning weights to results: It then receives the results from the AI models in the AI h-LLM models categories and weights them to compute a result that could be returned to the requester program, or it could resend the request back to the AI h-LLM models/categories hierarchy till it reaches a certain level of service level assurance.

Use of Local Database: It also updates a local database with the results of the request's path through its hierarchy and create an index of "derived requests" that may be used in future to select which set of "derived requests" an incoming request may fall into for further processing.

Distributed Architecture: The tasks may be implemented as containers within Kubernetes environment and a service mesh, such as Istio, may be used to instrument and parameterize the metrics and log collections, but not limited to these cloud models for implementation.

Efficient Search & Retrieval: Traditional online and offline approaches to cluster search are used to find the relevant subset of the documents being evaluated in Retrieval Augmented Generation (RAG) pipelines. Once this subset is retrieved then the traditional pipeline of LLMs operations are carried out as in LangChain and LlamaIndex. The cluster may be generated during time of the Query Prompt input (adds to the delay due to need to generate indexes) or could be used to select a subset of indexes in Vector Db in a quicker approach. Few important queries and prompts may be used to generate clusters (offline) and each new online query may be mapped to the best "cluster" that was pre-generated based on that query or similar queries.

Network of LLMs working together to replace a larger LLM: Currently a single large LLM is trained on all types of data and has large number of parameters (e.g. OpenAI GPT3.5 has 175 billion parameters and GPT-4 has over 1 trillion of parameters). A approach using a Network of LLMs is proposed which combines smaller LLMs (with 3B or 7B parameters, for example), preferably each focused on a specific type of result (cost estimation, profit estimation, expense estimation or prediction). The network of LLMs is used to provide a composite result that is easier to prompt for, easier to optimize and easier to "explain" how it works by having smaller focused LLMs trained on specialized training sets.

Embodiments of the present invention are directed to a system and associated methods for enhancing the attention span of Large Language Models (LLMs) when processing long documents. The system, long-document attention span enhancement through refinement ("LASER"), uses an iterative attention focusing technique that dynamically refines and condenses document and chunk context to improve model comprehension and coherence over extended inputs.

Other embodiments of the present invention are directed to enhancing Retrieval-Augmented Generation (RAG) through context-optimized retrieval techniques. The system, scored context-optimized retrieval enhancement for retrieval augmented generation ("SCORE-RAG"), addresses the limitations of existing RAG systems by incorporating advanced document (including chunk) processing, intelligent information retrieval, and adaptive response generation mechanisms.

In one embodiment, the present invention comprises a document processing system that includes an input module, a model module, an iteration controller, a knowledge module, and an output handler. The input module is configured to split long documents into manageable blocks (or chunks) and generate iterative contexts, while the model module contains an attention model for processing these contexts and a ranking unit for evaluating outputs.

Another embodiment of the invention involves a method for iterative attention focusing, which includes splitting a long document into blocks, batching these blocks, processing them through an LLM, ranking the outputs, and then clustering and reforming new batches based on the highest-ranked content. This process is repeated iteratively, gradually condensing the document to its most relevant parts.

Another embodiment of the invention provides a mechanism for dynamically adjusting the attention focus of an LLM. This mechanism employs a ranking system that scores model outputs based on coherence and relevance, allowing the system to identify and prioritize the most important parts of a document or chunks across multiple processing cycles.

Another embodiment of the invention introduces a knowledge module that incorporates an extractive summarizer and a document clustering component. These elements work together to identify key information and group related content, further enhancing the system's ability to distill and focus on critical parts of long documents and chunks.

Another embodiment of the invention comprises a document processor for handling various input formats, a topic modeling engine for semantic analysis, and an intelligent document chunking module that preserves contextual integrity. This embodiment also features a hybrid search module that combines keyword-based and vector similarity search methods for improved retrieval accuracy.

Another embodiment of the invention involves a method for dynamically processing and indexing documents. This method employs a citation analyzer to assess the importance of different text segments, a chunk selection and ranking module to identify the most relevant portions of a document, and a metadata enrichment module to enhance the contextual information associated with each text chunk. The method further includes an adaptive indexing process that optimizes storage and retrieval of processed information.

Another embodiment of the invention provides a mechanism for query augmentation and response generation. This mechanism utilizes a Query Processor to analyze and classify user inputs, an Augmentation Engine to integrate retrieved context with the original query, and a Generation Module that interfaces with LLMs to produce coherent and relevant responses.

Embodiments of the present invention are directed to a system and associated methods for enhancing LLMs through Functional Language Modeling (FLM) that utilize Hierarchical Tokens (H-Tokens) to improve context management and semantic coherence. The system addresses limitations in traditional token-based processing by introducing functional abstractions that can compress multiple regular tokens into single semantic units while preserving functional meaning.

In one embodiment, the present invention comprises a document processing system that includes an input processing module configured to recognize document domains and identify functional components, a function identification module for analyzing and mapping hierarchical relationships between functions, and an H-Token generation module that encapsulates identified functions into compressed token representations. The system further includes implementation modules for mapping H-Tokens to specific functions, events, and implementation methods within their respective domains.

Another embodiment of the invention involves a method for processing domain-specific content through functional abstraction, which includes analyzing input documents to identify domain-specific functions, breaking these functions into sub-functions, generating H-Tokens that encapsulate the functional units, and processing these H-Tokens either through expansion to regular tokens or direct H-Token processing in conjunction with RAG systems. This method enables efficient handling of long documents while maintaining semantic coherence across document boundaries.

Another embodiment of the invention provides a mechanism for dynamically adapting the FLM system across different domains (such as legal, travel, customer service, technical, for instance). This mechanism employs domain-specific analyzers to identify relevant functions, generates appropriate H-Tokens for each domain, and maintains relationships between functions, events, and implementation methods. The mechanism can process multi-modal inputs and integrate with existing RAG systems through either token expansion or direct H-Token processing paths, providing flexibility in implementation while improving context management efficiency.

Another embodiment of the invention introduces a hybrid processing approach that combines H-Token based processing with traditional RAG systems, enabling organizations to leverage existing infrastructure while gaining the benefits of functional abstraction. This approach includes methods for H-Token context assembly, processing path selection, and output generation that can be customized based on specific domain requirements and processing needs.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
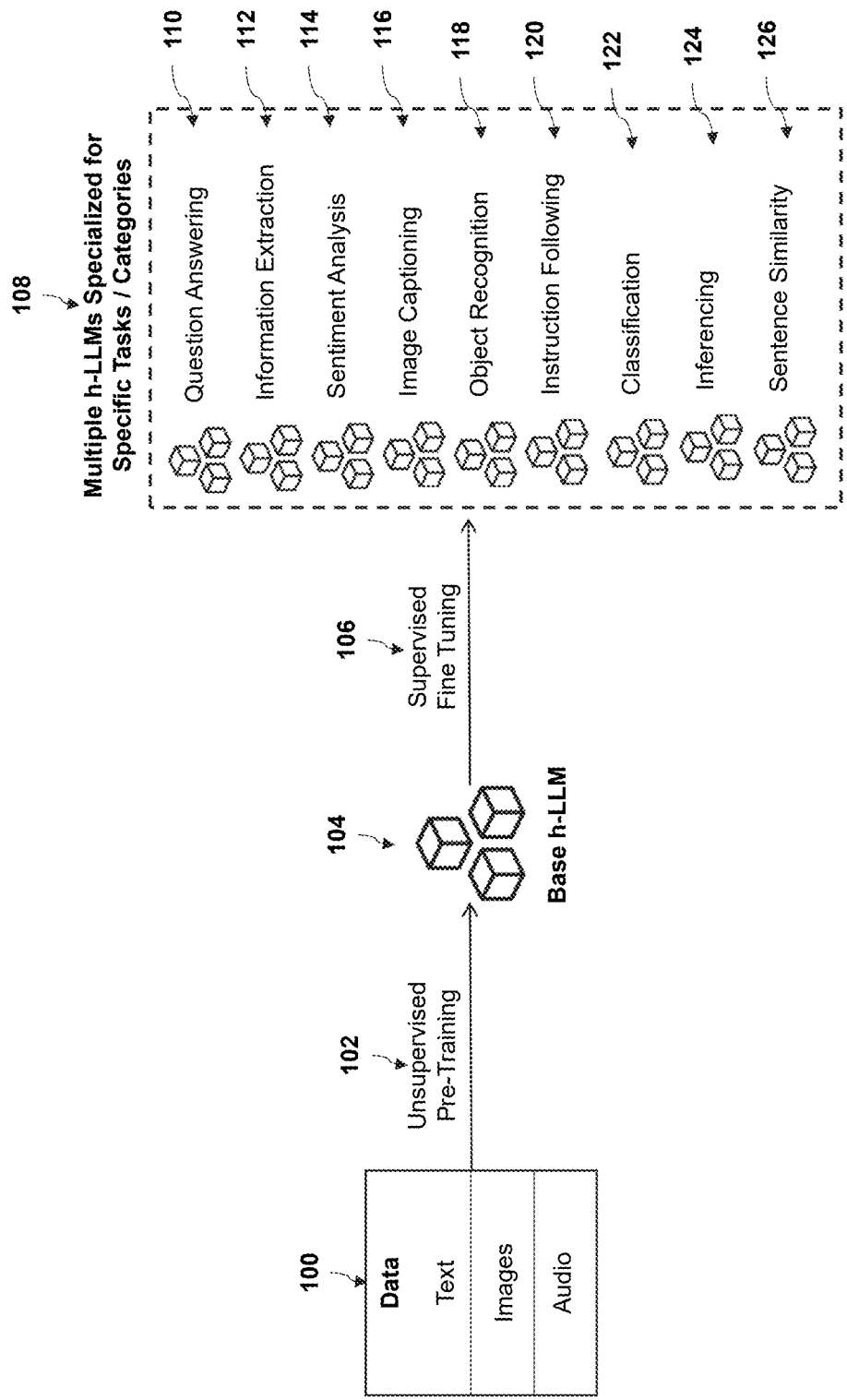
FIG. 1 is an illustration of the training process for creating multiple specialized large language models for specific tasks/categories, according to an embodiment of the present invention.

Referring now to FIG. 1 is an illustration of the training process for creating multiple specialized large language models for specific tasks/categories, is described in more detail. Data 100 (such as text, images, and audio) is used to pre-train a model in a process called unsupervised pre-training 102 which generates a base h-LLM model 104. The pre-training process is referred to as unsupervised as unlabeled data is used at this step. The base h-LLM model 104 is then fine-tuned in a process called supervised fine-tuning 106. The fine-tuning process uses smaller labeled data sets. The base h-LLM model 104 is fine-tuned to generate multiple h-LLM models which are specialized to perform specific tasks such as Question Answering, Information Extraction, Sentiment Analysis, Image Captioning, Object Recognition, Instruction Following, Classification, Inferencing, and Sentence Similarity, for instance.

Figure 2:
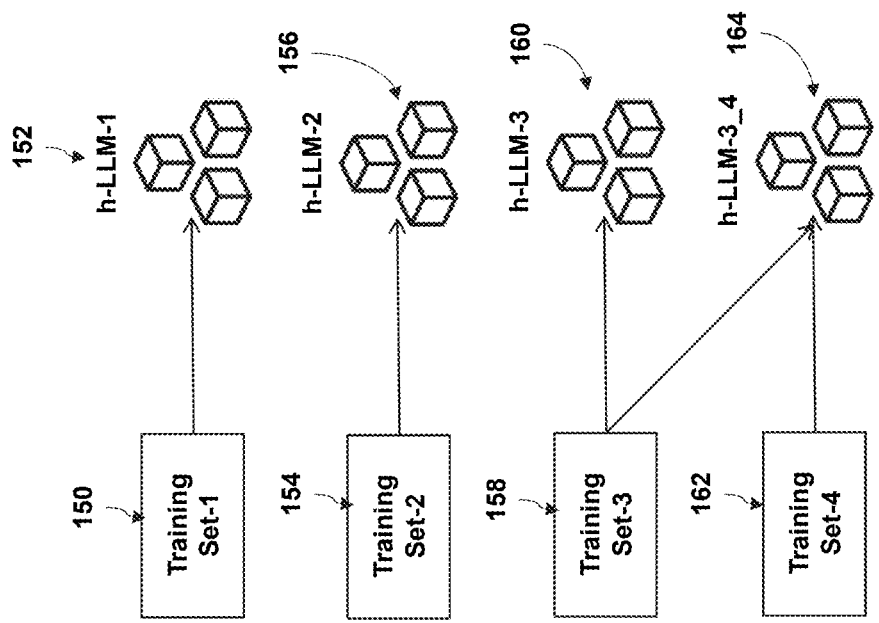
FIG. 2 is an illustration of h-LLMs trained with different training sets, according to an embodiment of the invention.

Referring now to FIG. 2 is an illustration of h-LLMs trained with different training sets, is described in more detail. As used in this specification h-LLM usually refers to a family of LLMs, such as those used in Google's Bard or OpenAI's GPT-4, that have been trained on a particular training set T. Therefore, the same family of LLMs (e.g., GPT) if trained on a different training set, T1, as opposed to GPT trained on training set T2 could be differentiated as a separate h-LLM). The training sets can be private within an organization or public datasets.

For example, as shown in FIG. 2, h-LLM-1 152 is trained with training set-1 150, h-LLM-2 156 is trained with training set-2 154, h-LLM-3 160 is trained with training set-3 158, and h-LLM-3_4 164 is trained with training set-3 158 and training set-4 162.

An h-LLM can be described as a combination of LLM families and the training dataset used as follows:

h-LLM=LLM family (X) trained with Training Set (Y)

Figure 3:
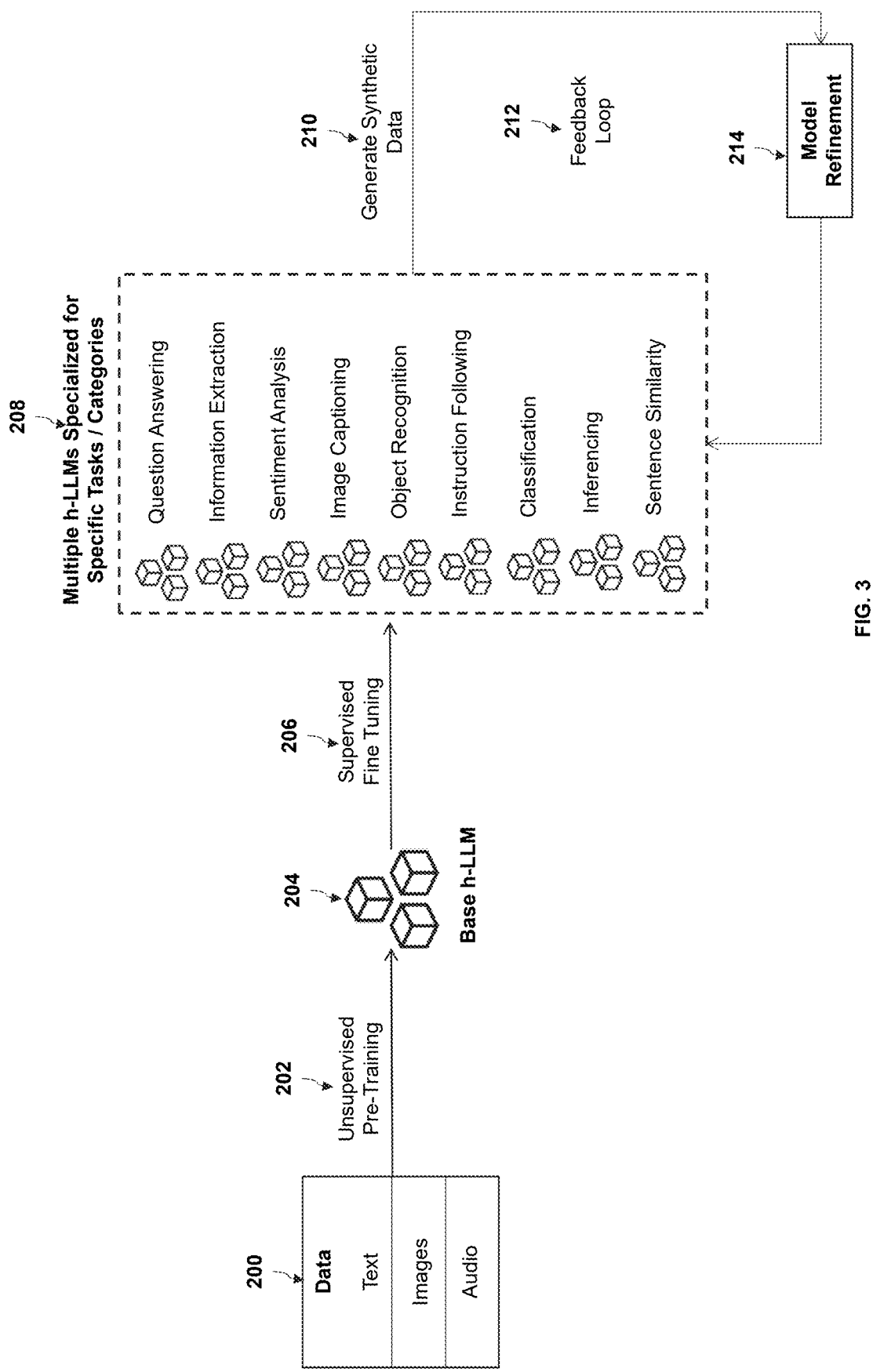
FIG. 3 is an illustration of the process for generating synthetic data from multiple h-LLMs and using it for model refinement, according to an embodiment of the invention.

For example,
h-LLM_1=PaLM-2 may be trained with training set T12
h-LLM_2=PaLM-2 may be trained with training set T12+T45
h-LLM_3=GPT-4 may be trained with Training Set T65
h-LLM_4=GPT-4 may be trained with ANY data set Referring now to FIG. 3, an illustration of the process for generating synthetic data from multiple h-LLMs and using it for model refinement, is described in more detail. Data 200 is used to train a base h-LLM model 204 using unsupervised pre-training 202 which is then fine-tuned in a supervised fine-tuning process 206 to generate multiple h-LLMs specialized for specific tasks or categories 208. Each of these h-LLMs 208 are used to generate synthetic data 210 which is then fed back to the models in feedback loop 212 through a process called model refinement 214.

Figure 4:
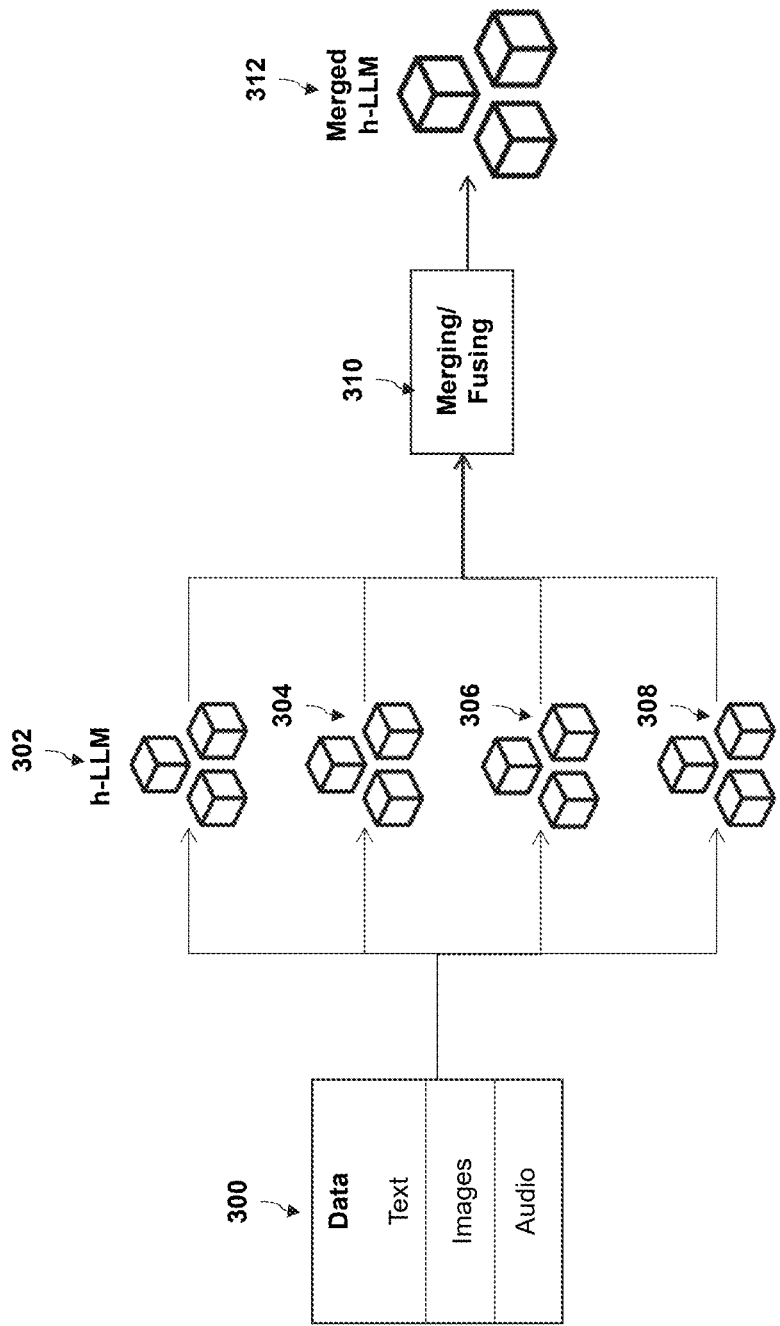
FIG. 4 is an illustration of a "bagging" approach where multiple h-LLMs with lower precision and accuracy are merged/fused to create a merged h-LLM with higher precision and accuracy, according to an embodiment of the invention.

Referring now to FIG. 4 is an illustration of a bagging approach, that has some similarity to what was originally used in the context of machine learning models in a different way (for analytics as opposed to generative AI applications, such as LLMs) that are described in this invention, where multiple h-LLMs with lower precision and accuracy are merged/fused to create a merged h-LLM with higher precision and accuracy, is described in more detail. Bagging is a machine learning technique which improves the stability and accuracy of machine learning models. Using the input data 300, multiple subsets of the data are created which are used to train multiple h-LLMs (302, 304, 306, 308) in parallel. These models are then combined in a process called merging or fusing 310 to create a merged h-LLM 312.

Figure 5:
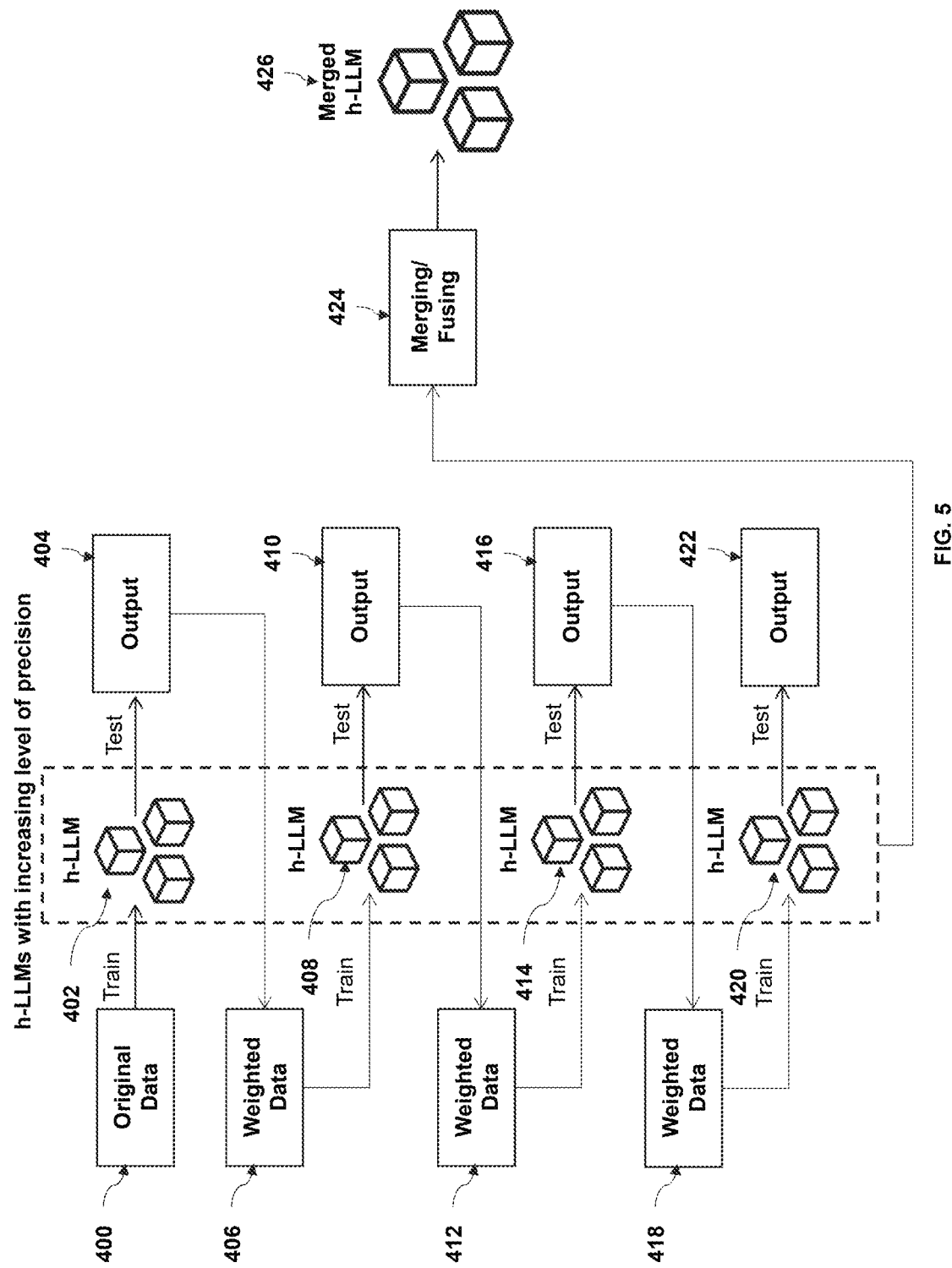
FIG. 5 is an illustration of a "boosting" approach where multiple h-LLMs of increasing precision and accuracy are created in a sequential manner and then merged/fused to create a merged h-LLM, according to an embodiment of the invention.

Referring now to FIG. 5 is an illustration a boosting approach, that has some similarities to that originally used in the context of machine learning models in a different way (for analytics as opposed to generative AI applications used in this invention) where multiple h-LLMs of increasing precision and accuracy are created in a sequential manner and then merged/fused to create a merged h-LLM, is described in more detail. Boosting is a machine learning technique that involves creating a stronger and more accurate model from a number of weaker models. The original data 400 is used to train an h-LLM 402. The h-LLM 402 is tested and the output 404 is assigned weights to generate weighted data 406. The weighted data 406 is then used to train h-LLM 408. The same process is then repeated and h-LLMs 414 and 420 are generated in a sequence. The h-LLMs 402, 408, 414 and 420 are then combined in a process called merging or fusing 424 to create a merged h-LLM 426.

Figure 6:
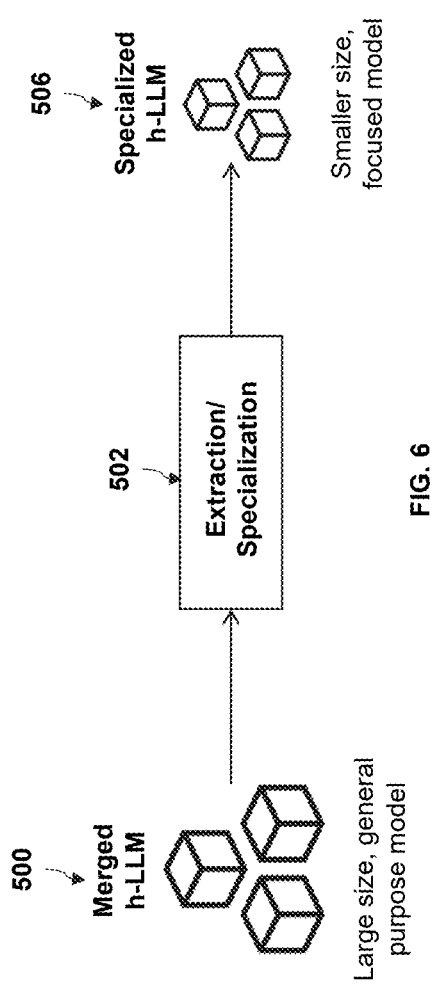
FIG. 6 is an illustration of creating a smaller and more specialized h-LLM through extraction/specialization process from a larger h-LLM, according to an embodiment of the invention.

Referring now to FIG. 6 is an illustration of creating a smaller and more specialized h-LLM through extraction/specialization process from a larger h-LLM, is described in more detail. The extraction/specialization process 502 extracts the specific knowledge required for a task from a big, general-purpose model, and creates a smaller h-LLM 506. For example, a specific task can be sentiment analysis of input text, for which a smaller model 506 is more efficient as compared to a large, general-purpose model.

Figure 7:
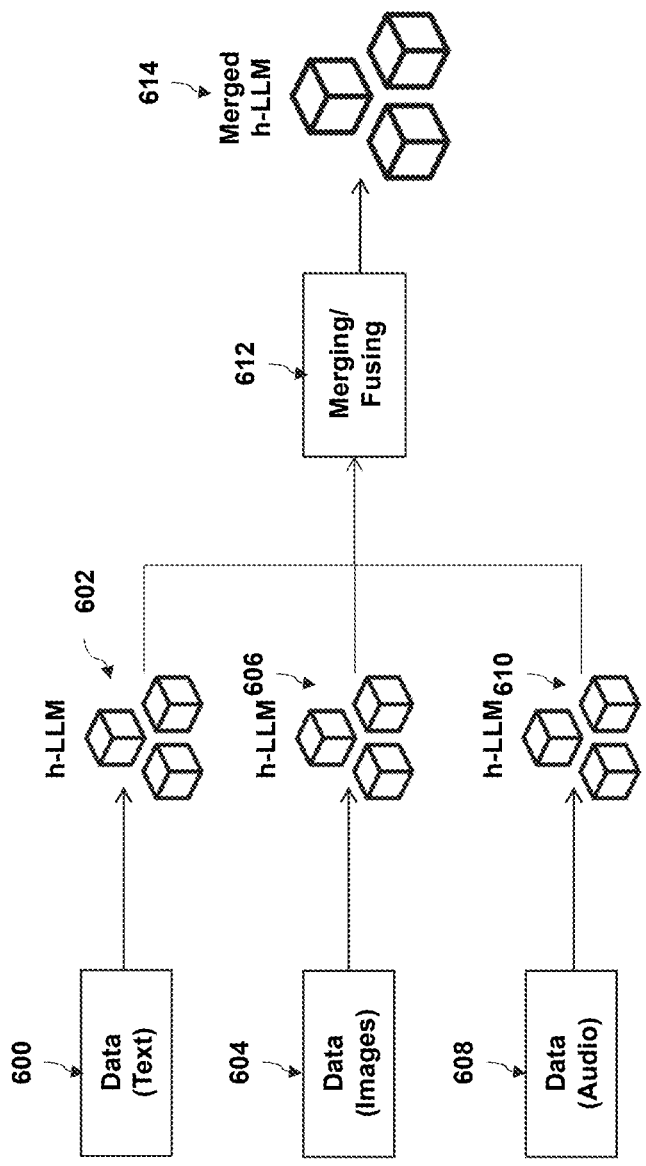
FIG. 7 is an illustration of combining h-LLMs trained with text, image and audio data to create a merged h-LLM, according to an embodiment of the invention.

Referring now to FIG. 7 is an illustration of combining h-LLMs trained with text, image and audio data to create a merged h-LLM, is described in more detail. Text data 600 is used to train h-LLM 602, image data 604 is used to train h-LLM 606 and audio data 608 is used to train h-LLM 610. The h-LLMs 602, 604, 608 are combined in a process called merging/fusing to create a merged h-LLM 614.

Figure 8:
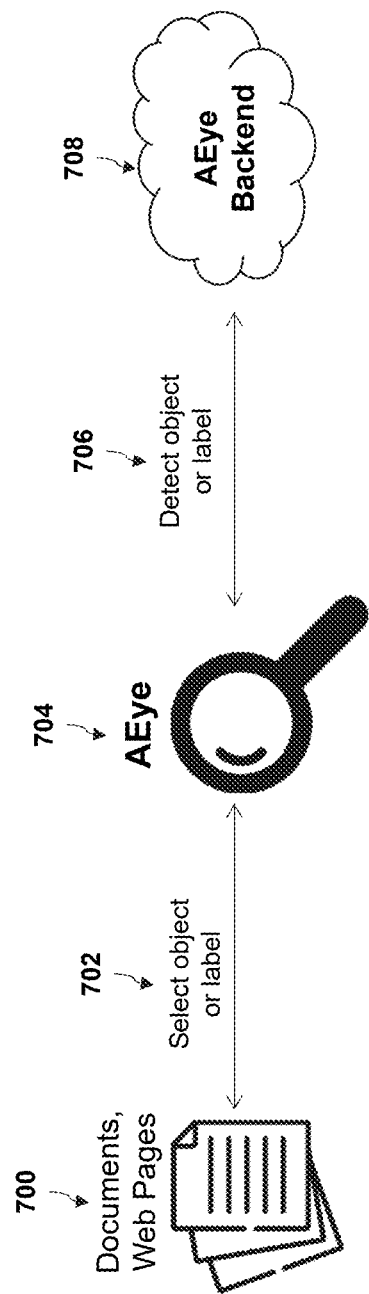
FIG. 8 is an exemplary illustration of an application of using AI models for detecting labels in PDF files, according to an embodiment of the invention.

Referring now to FIG. 8 is an exemplary illustration of an application of using AI models for detecting labels in PDF files, is described in more detail. Patent documents (such as PDF files) have figures in which various entities/blocks/items are labeled using numeric labels (for instance 110, 120 and so on). These labels are referenced and described in the patent text specification. When reviewing multiple documents, readers find it difficult to quickly lookup the labels mentioned in the figures (and what they refer to) from the text, as they need to go back and forth between a figure and the text in the specification. A novel PDF Label search solution is offered within CatchUp which allows quick lookup of labels in a figure using an innovative "AI Magnifier" approach. The user can select one or more labels using the Magnifier tool in the CatchUp GlassViewer (a PDF viewer tool within CatchUp that has annotation and other AI features). When one or more labels are selected using the Magnifier tool, the labels are searched within the PDF and the search results are returned. The PDF Label Search tool is built upon a novel AI Magnifier technology (which we refer to as AEye). AEye serves as a gateway to the world of Artificial Intelligence (AI) for documents and web pages. AEye can be used for a wide range of applications such as detecting objects in images, labels in documents, for instance. Documents or web pages 700 can be searched using an AEye application 704 which detects objects or labels utilizing an AEye backend 708.

Figure 9:
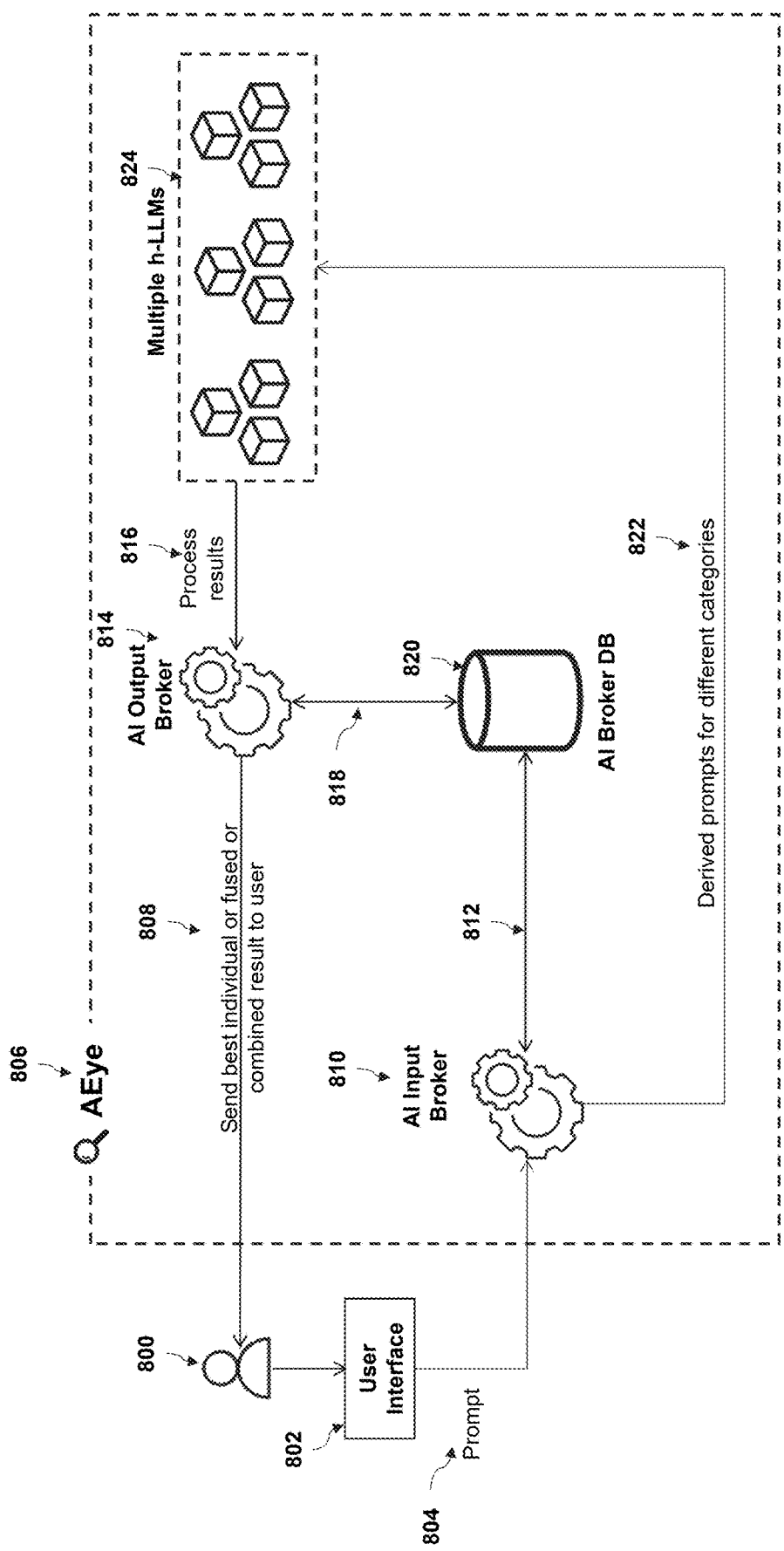
FIG. 9 is an illustration of generating derived prompts for different categories and using them with multiple h-LLMs to generate the best results, according to an embodiment of the present invention.

Referring now to FIG. 9 is an illustration of generating derived prompts for different categories and using them with multiple h-LLMs to generate the best results, is described in more detail. User 800 enters a prompt in user interface 802. The prompt is sent to the AI Input Broker 810 which generates multiple derived prompts for different categories. The derived prompts 822 are sent multiple h-LLMs 824 which produce the results. The results 816 are sent to the AI Output Broker 814 which processes the results and performs tasks such as filtering, ranking, weighting, assigning priorities, and then sends the best results to the user 800. The h-LLMs 824 can have varying levels of accuracy, and optimized for different tasks such as Question Answering, Information Extraction, Sentiment Analysis, Image Captioning, Object Recognition, Instruction Following, Classification, Inferencing, and Sentence Similarity, for instance. The AI Output Broker 814 computes various scores and assigns weights for ranking the results. The results may be sent back to the h-LLMs till a certain level of accuracy or service level assurance is reached. The AI Input Broker 810 and Output Broker 814 update a local AI Broker Database 820 with the results of the request's path through its hierarchy and create an index of "derived requests" that may be used in future to select which set of "derived requests" an incoming request may fall into for further processing.

Figure 10:
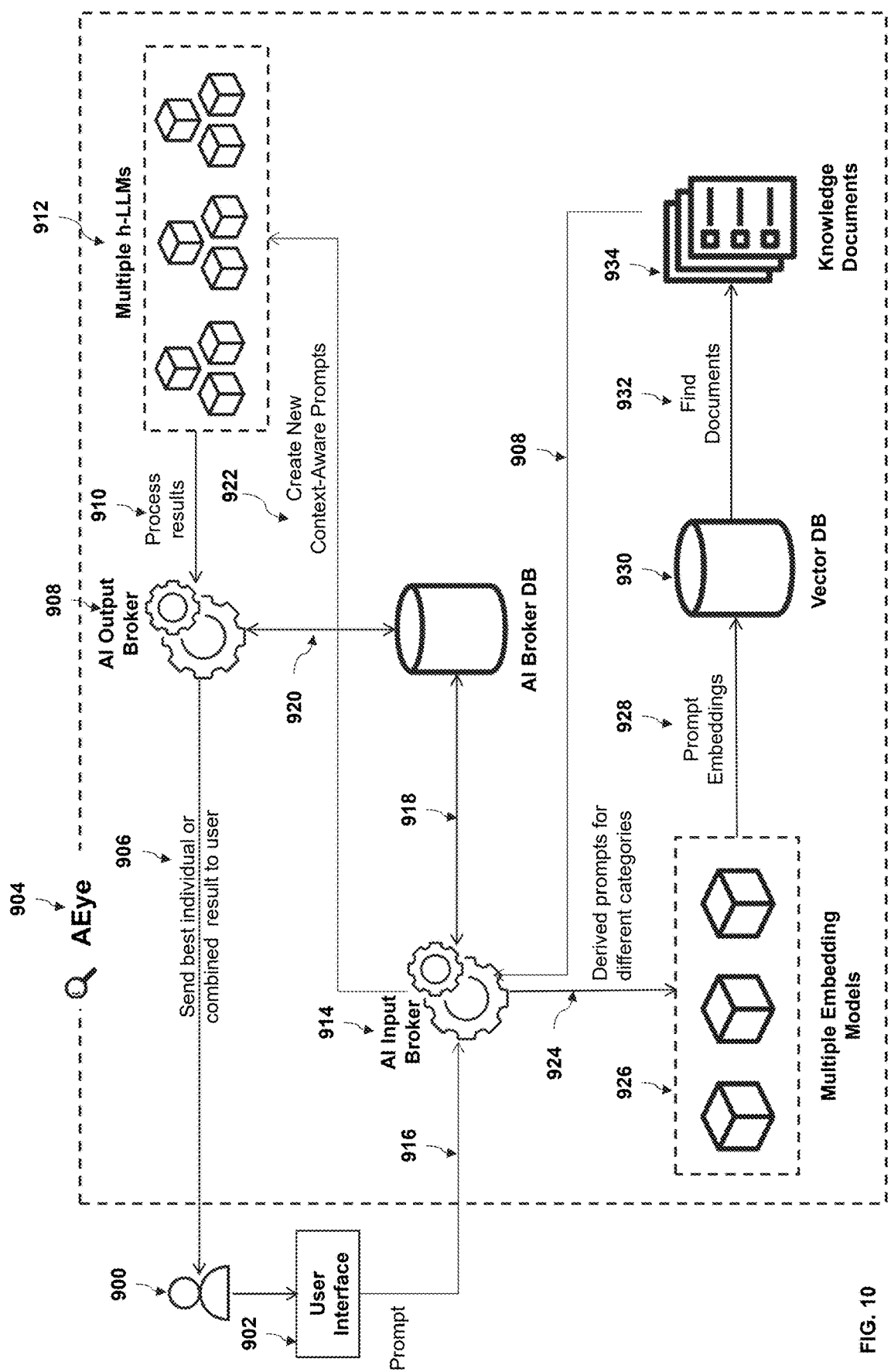
FIG. 10 is an illustration of using multiple h-LLMs to answer questions from specific input documents, according to an embodiment of the present invention.

Referring now to FIG. 10 is an illustration of using multiple h-LLMs to answer questions from specific input documents, is described in more detail. User 900 enters a prompt in user interface 902. The prompt is sent to AI Input Broker 810 which generates multiple derived prompts for different categories 924. The prompts are converted into embeddings using multiple embedding models 926. The prompt embeddings 928 are sent to a vector database 930 which returns a list of knowledge documents 934 that are relevant to the prompt based on the similarity of their embeddings to the user's prompt. The knowledge documents 934 are sent to the AI Input Broker 810 which creates new context-aware prompts based on the user's initial prompt 916, derived prompts 924 and the retrieved knowledge documents 934 as context and sends it to multiple h-LLMs 912. The results produced by multiple h-LLMs are processed by the AI Output Broker 908 and the best result is sent to the user 900 along with citations from the knowledge documents 934.

Figure 11:
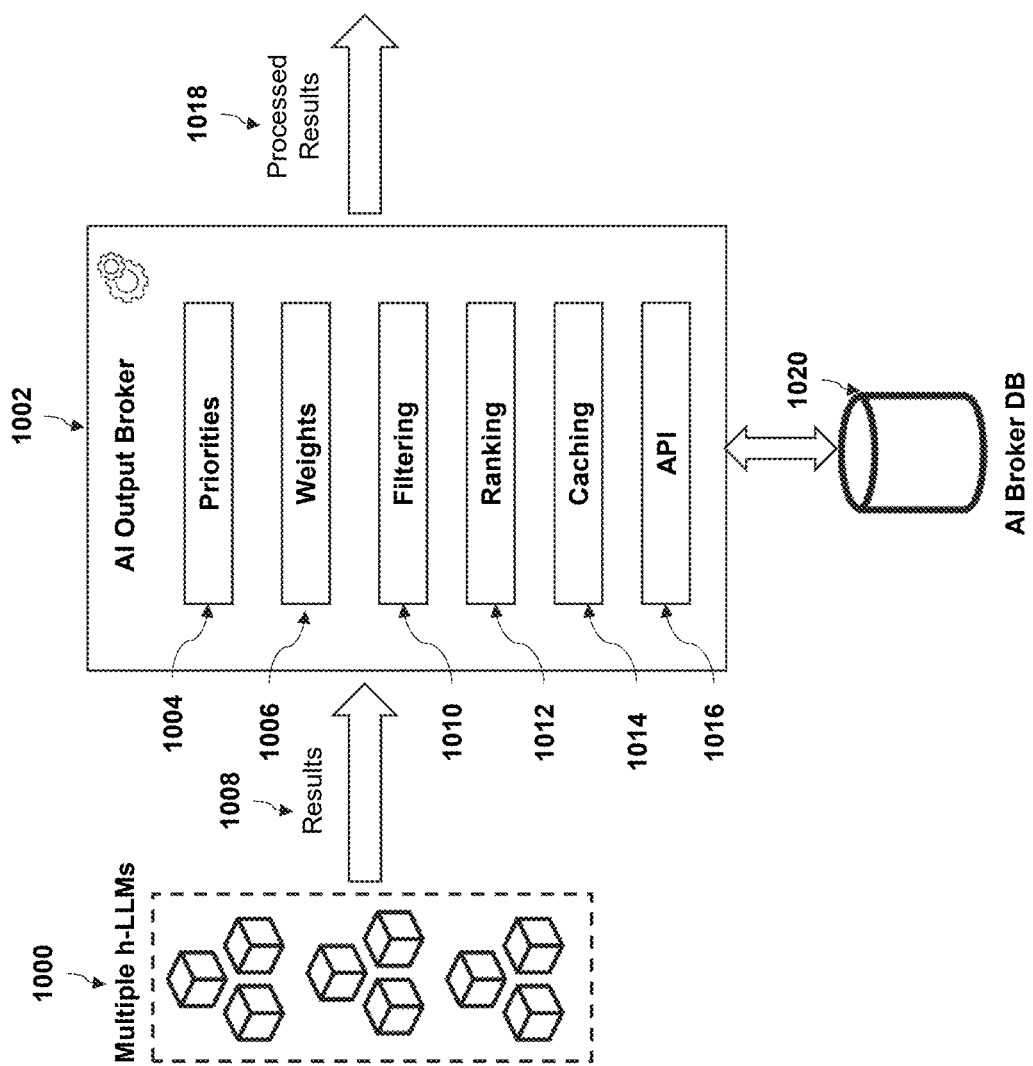
FIG. 11 is an illustration of an AI Broker for processing results from multiple h-LLMs, according to an embodiment of the present invention.

Referring now to FIG. 11 is an illustration of an AI Broker for processing results from multiple h-LLMs, is described in more detail. Results produced by multiple h-LLMs 1000 are sent to an AI Output Broker 1002 which performs tasks such as assigning priorities 1004 and weights 1006 to the results, filtering 1010, ranking 1012 and caching 1014. The AI Output Broker 1002 provides an API interface 1016 for configuring and managing various aspects of the broker. An AI Broker Database 1020 stores the results along with the meta-data information such as the request path. AI Broker Database 1020 creates an index of "derived requests" that may be used in future to select which set of "derived requests" an incoming request may fall into for further processing.

Figure 12:
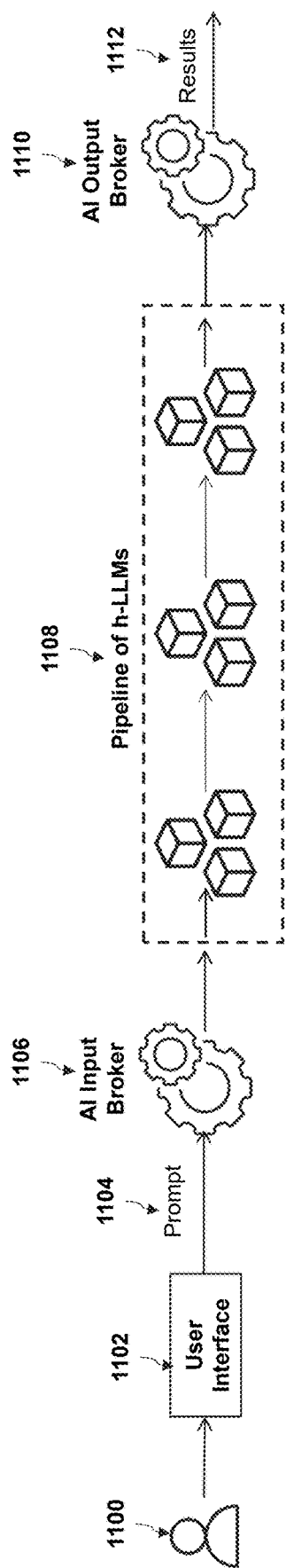
FIG. 12 is an illustration of the combining h-LLMs in series, according to an embodiment of the present invention.

Referring now to FIG. 12 is an illustration of the combining h-LLMs in series, is described in more detail. User 1100 enters a prompt in user interface 1102. The prompt 1104 is sent to an AI Input Broker 1106 which generates a derived prompt by adding more contextual information. The derived prompt is sent to multiple h-LLMs 1108 connected in series. The derived prompt goes to the first h-LLM in the sequence which generates results. The results of the first h-LLM are sent to the second h-LLM in the sequence for refinement/enhancement and then to the third h-LLM and so on. The AI Output Broker 1110 processes the results 1112 and sends the processed results to user 1200.

Figure 13:
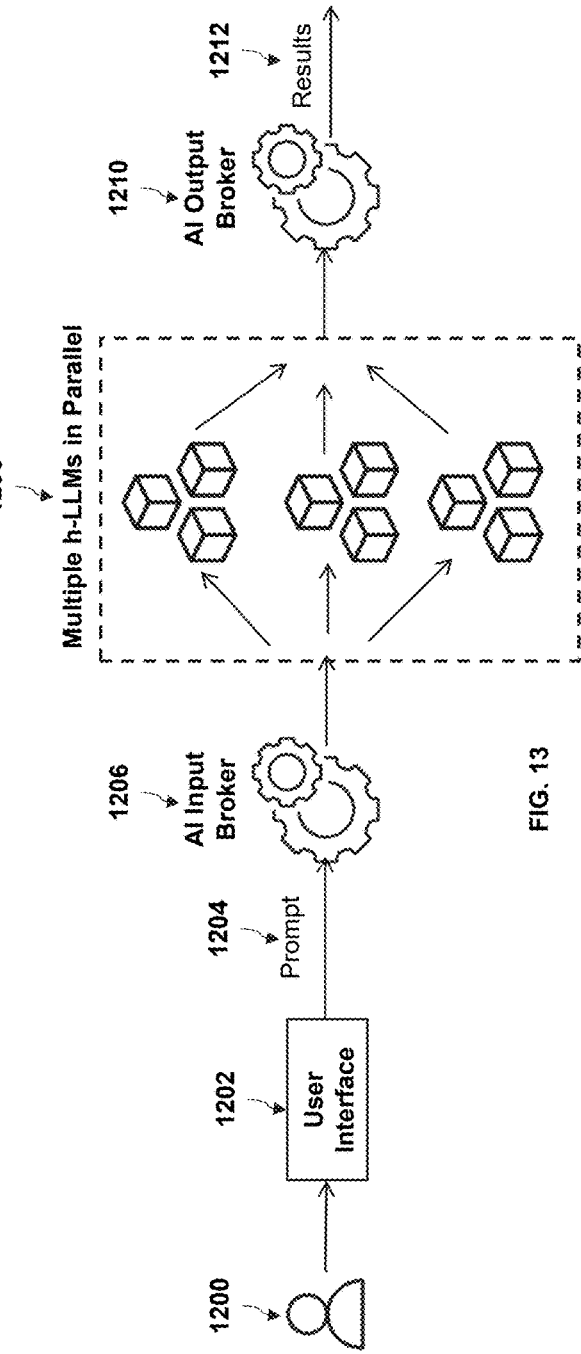
FIG. 13 is an illustration of combining h-LLMs in parallel, according to an embodiment of the present invention.

Referring now to FIG. 13 is an illustration of combining h-LLMs in parallel, is described in more detail. User 1200 enters a prompt in user interface 1202. The prompt 1204 is sent to an AI Input Broker 1206 which generates multiple derived prompts by adding more contextual information. The derived prompts are sent to multiple h-LLMs 1208 which process the prompt in parallel generating multiple results. The AI Output Broker 1210 processes the results and sends the processed results 1212 to the user 1200.

Figure 14:
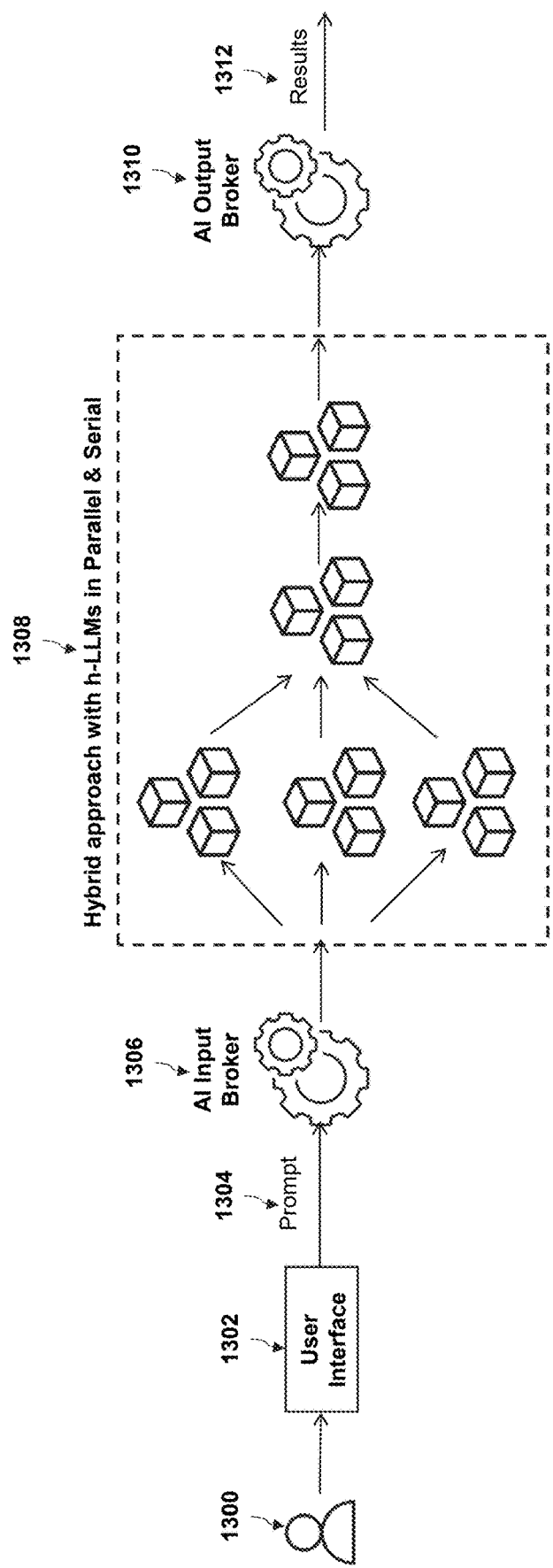
FIG. 14 is an illustration of a hybrid approach of combining h-LLMs in series and parallel, according to an embodiment of the present invention.

Referring now to FIG. 14 is an illustration of a hybrid approach of combining h-LLM in series and parallel, is described in more detail. User 1300 enters a prompt in user interface 1302. The prompt 1304 is sent to an AI Input Broker 1306 which generates multiple derived prompts by adding more contextual information. The derived prompts are sent to multiple h-LLMs 1308 which processes the prompts generating one or more results. The AI Output Broker 1310 processes the results and sends the processed results 1312 to the user 1300.

Figure 15:
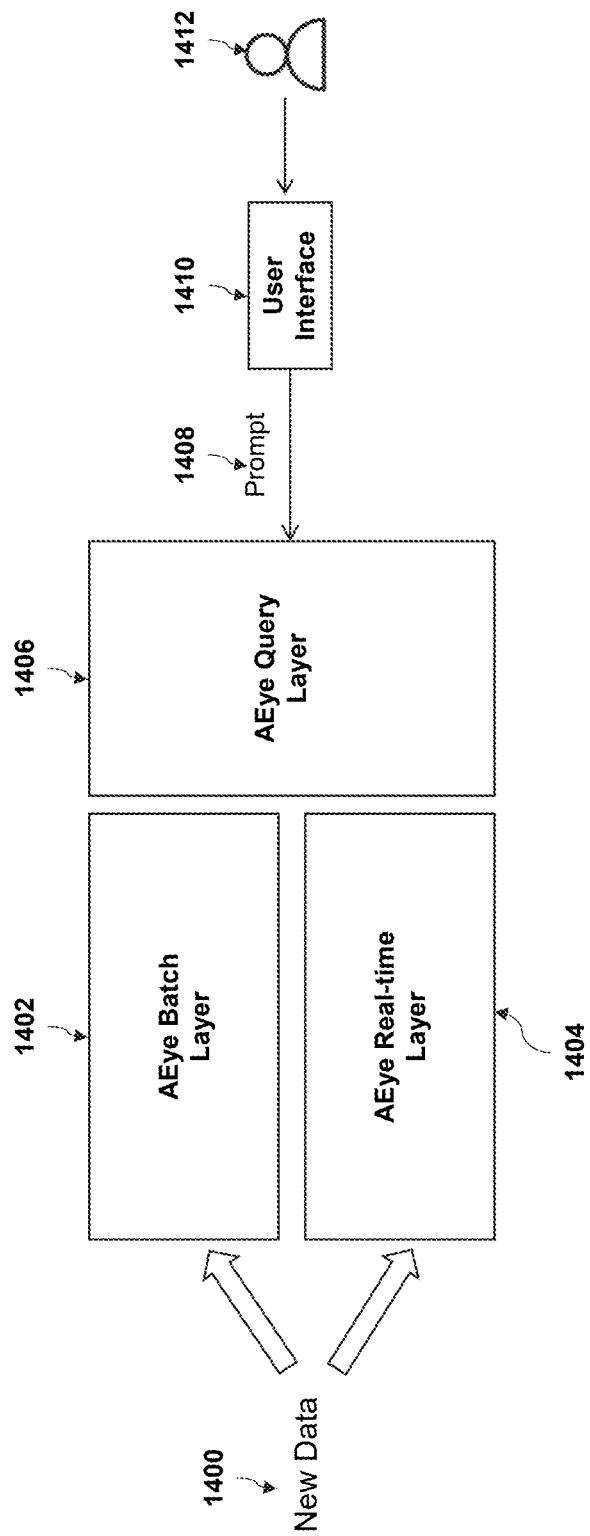
FIG. 15 is an illustration of the lambda architecture for h-LLMs, according to an embodiment of the present invention.

Referring now to FIG. 15 is an illustration of the lambda architecture for h-LLMs, is described in more detail. Lambda architecture is a way of processing massive quantities of data that provides access to batch-processing and stream-processing methods with a hybrid approach, often utilizing in-memory storage instead of disks for speedier processing. Such in-memory processing may be accomplished using a volatile memory device such as random-access memory (RAM) devices, static random-access memory (SRAM) devices, dynamics random-access memory (DRAM) devices, magnetoresistive random-access memory (MRAM) devices, and the like, or a non-volatile random-access memory (NVRAM) device. Such processing may be done partially or entirely in-memory.

This figure illustrates a lambda architecture for h-LLMs comprising batch layer 1402, real-time layer 1404 and a query layer 1406. New input data 1400 comes in continuously and is fed to the batch layer 1402 and real-time layer 1404 simultaneously. The batch layer 1402 maintains one or more h-LLMs which are updated/fine-tuned with the new data on a fixed schedule. Data is aggregated from the new input data 1400 over an aggregation duration that is tied to the fixed schedule. The real-time layer 1404 deals only with recent data which is not processed in the batch layer. The real-time layer 1404 maintains and updates smaller h-LLMs with incremental updates. The real-time layer 1404, also utilizes Map Reduce type analytics and computing and processing (See for example, tutorialspoint.com/map_reduce/map_reduce_introduction.htm) of tokens in the tokenization processes to improve speeds by which tokens are merged or otherwise aggregated in a distributed GPU computing environment, User 1412 sends a prompt 1408 through user interface 1410 to the query layer 1406. The query layer 1406 forwards the original prompt or creates one or more derived prompts which are sent to the batch and real-time layers. The query layer receives the results from the batch and real-time layers and performs tasks such as combining, ranking, filtering, assigning weights and priorities to the results and sends the best results to the user.

Figures 16, 17:
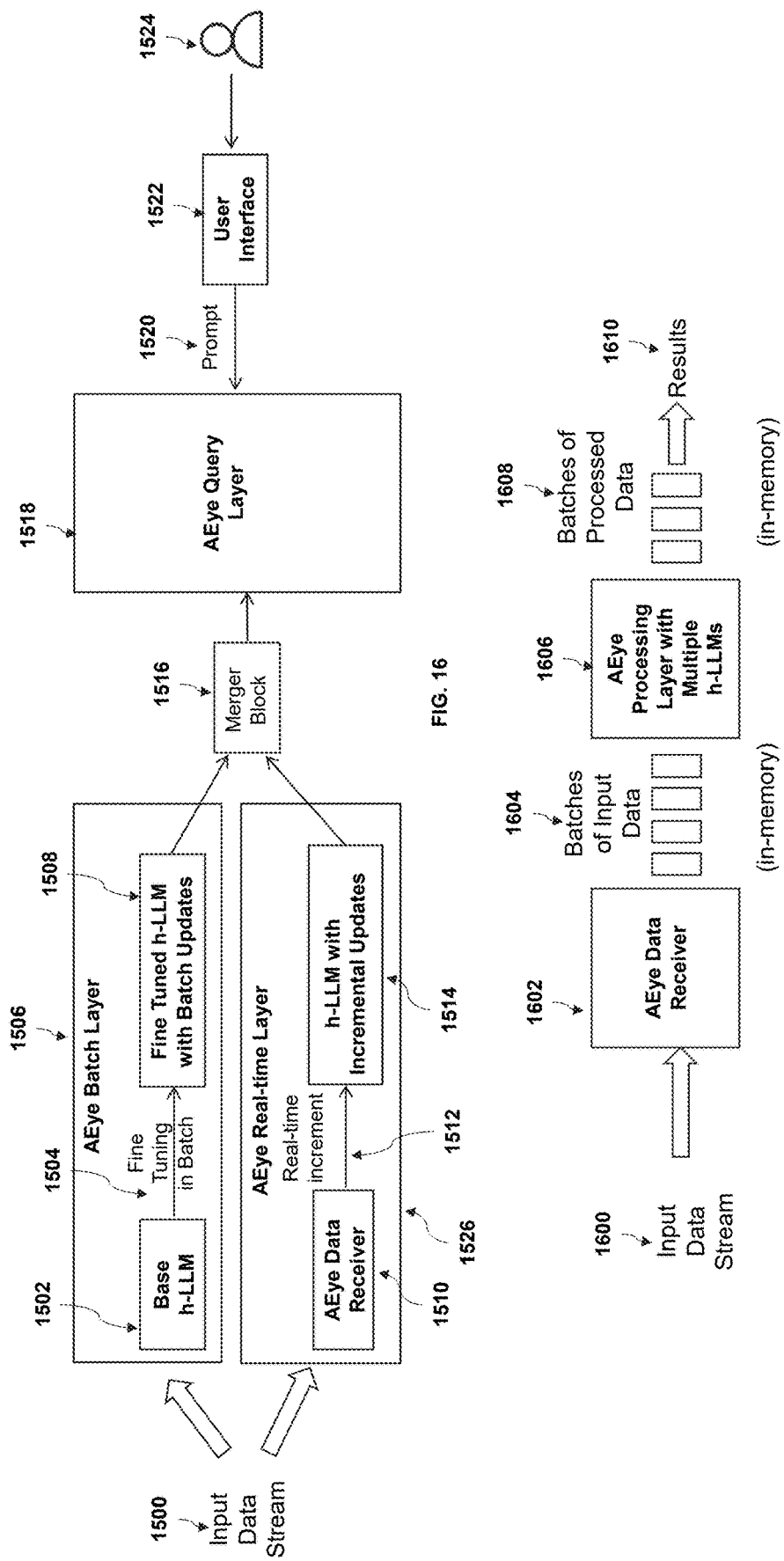
FIG. 16 is an illustration of batch and real-time processing architecture for h-LLMs, according to an embodiment of the present invention.
FIG. 17 is an illustration of an in-memory processing architecture for h-LLMs, according to an embodiment of the present invention.

Referring now to FIG. 16 is an illustration of batch and real-time processing architecture for h-LLMs, is described in more detail. The input data stream 1500 is sent to batch layer 1506 and real-time layer 1526. The batch layer 1506 maintains a base h-LLM 1502 which is fine tuned 1504 in batch to generate fine-tuned h-LLM 1508. The real-time layer 1526 generates smaller h-LLMs with incremental updates 1514 in real-time increments 1512. The merger block 1516 combines and merges the h-LLMs from the batch layer and real-time layer to produce a combined h-LLM. The merged h-LLM is used with the query layer 1518 to respond to prompts 1520 sent by user 1524 through the user interface 1522.

Referring now to FIG. 17, an illustration of an in-memory processing architecture for h-LLMs, is described in more detail. The input data stream 1600 is sent to the data receiver 1602 which breaks the data into small batches 1604 which can be processed at least partially, and in some embodiments entirely, in-memory. The processing layer 1606 includes multiple h-LLMs which process the batches on input data and produce the batches of processed data 1608. Such batches may be produced after aggregating data from the input data stream 1600 over an aggregation duration.

Figure 18:
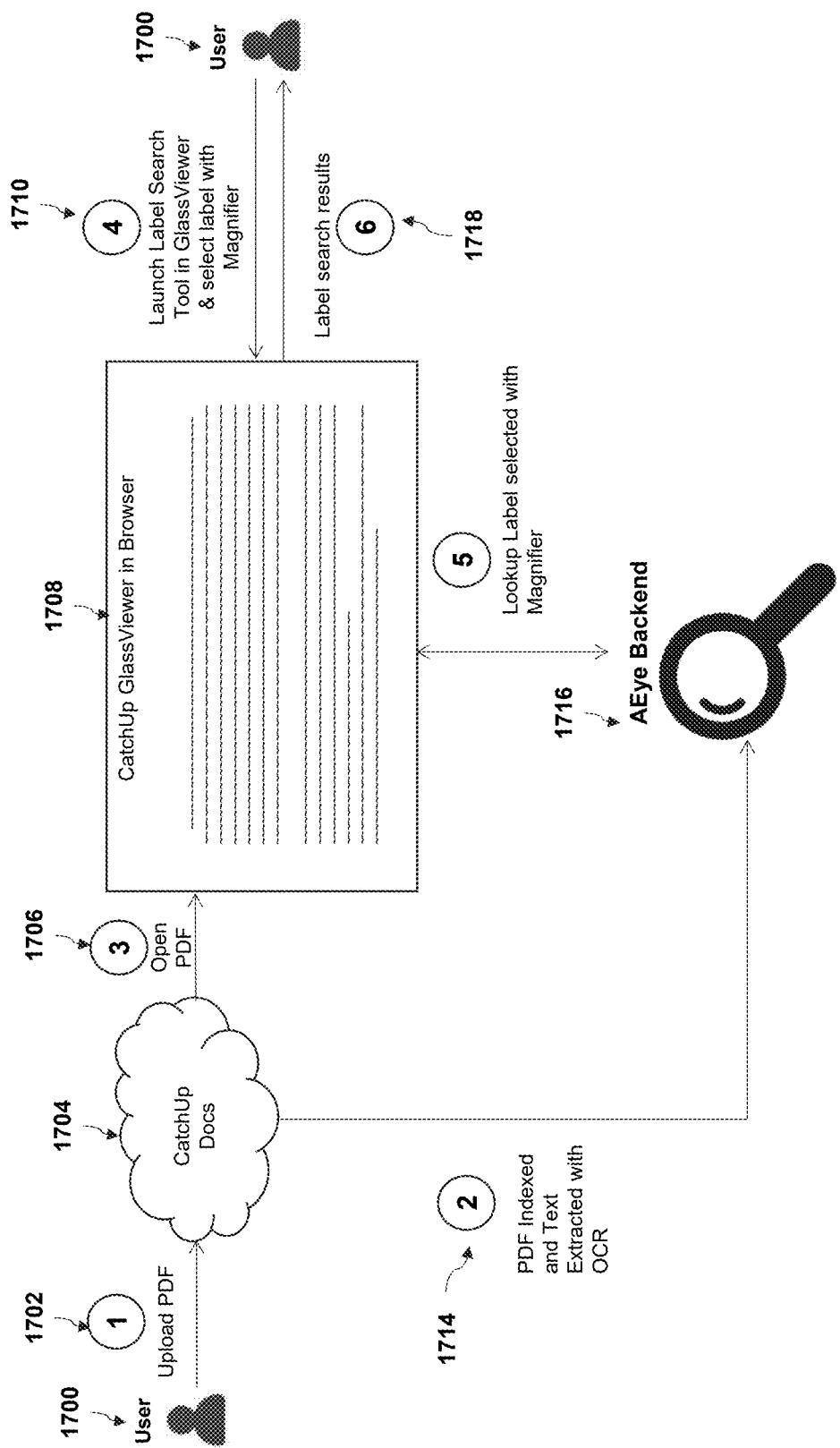
FIG. 18 is an illustration of the architecture of PDF label search tool with CatchUp GlassViewer, according to an embodiment of the invention.

Referring now to FIG. 18 is an illustration of the architecture of PDF label search tool with CatchUp GlassViewer, is described in more detail. User 1700 uploads a PDF document 1702 to the CatchUp document management system 1704. The text of the PDF document is extracted and indexed 1714 in the AEye backend system 1716. Such extraction and indexing may be performed using character recognition analysis, including optical character recognition analysis. The user opens the PDF document 1706 with the CatchUp GlassViewer application 1708 in a browser. User 1700 launches the label search tool 1710 within the CatchUp GlassViewer application 1708 and selects a label using the magnifier tool. The selected label is sent to the AEye backend system 1716 which retrieves and returns 1718 all occurrences of the label.

Figure 19:
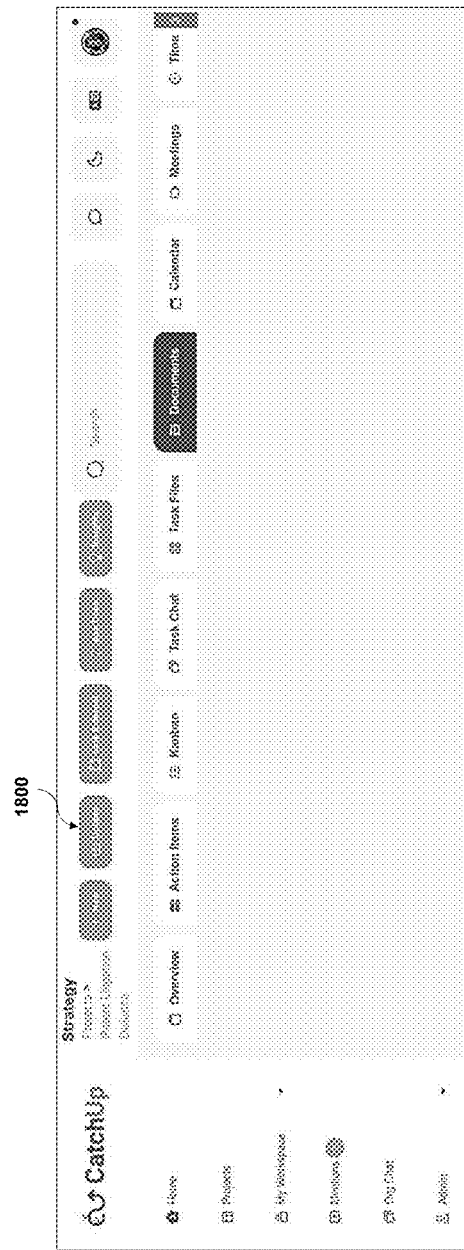
FIG. 19 is an exemplary interface of the CatchUp platform showing the document management system, according to an embodiment of the invention.

Referring now to FIG. 19 is an exemplary interface 1800 of the CatchUp platform showing the document management system, is described in more detail. Within this interface users can create new documents, upload existing documents, view and edit the documents.

Figure 20:
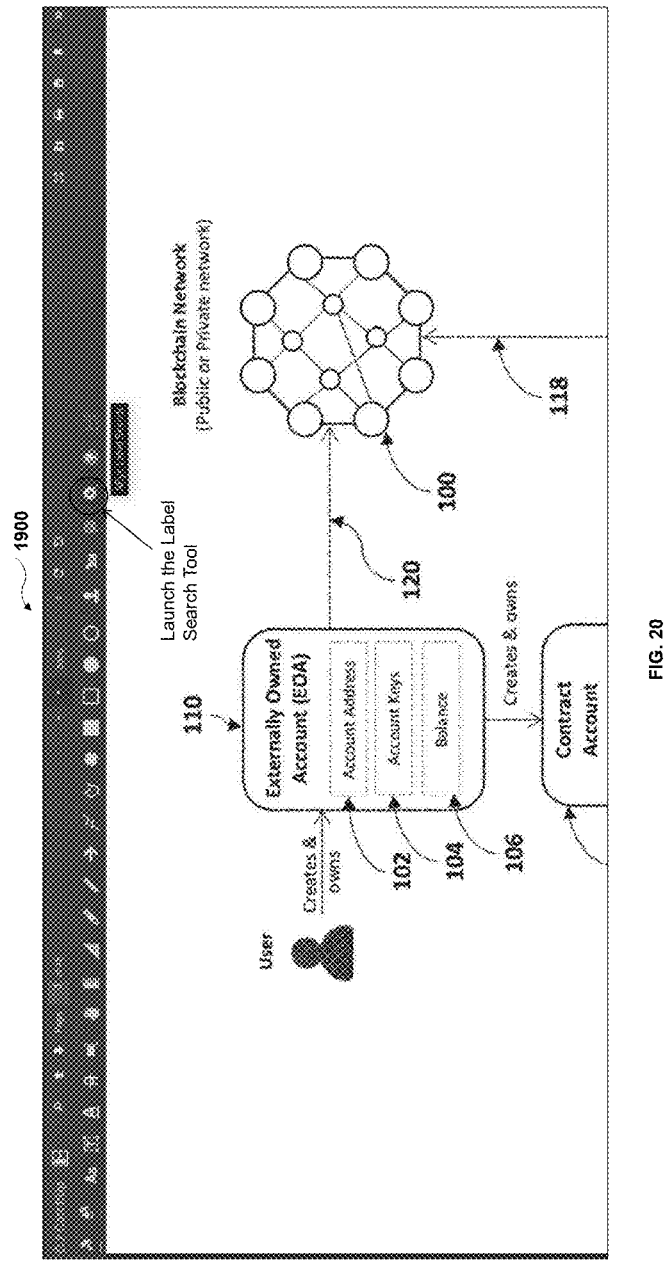
FIG. 20 is an exemplary interface of the CatchUp platform showing the PDF viewer (GlassViewer), according to an embodiment of the invention.

Referring now to FIG. 20 is an exemplary interface 1900 of the CatchUp platform showing the PDF viewer (GlassViewer), is described in more detail. GlassViewer is a PDF viewer application with CatchUp that allows annotating and commenting PDF files. The annotations and comments are stored in a separate layer which is rendered above the PDF document.

Figure 21:
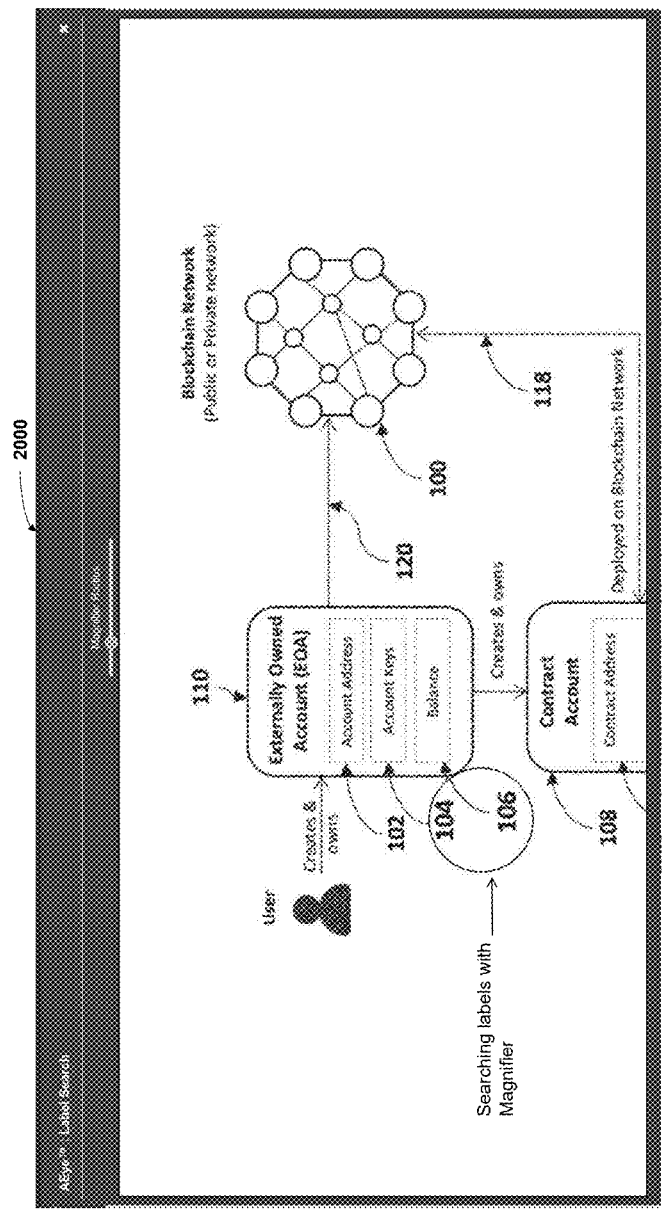
FIG. 21 is an exemplary interface of the CatchUp platform showing a magnifier tool within the GlassViewer for searching labels, according to an embodiment of the invention.

Referring now to FIG. 21 is an exemplary interface 2000 of the CatchUp platform showing a magnifier tool 2002 within the GlassViewer for searching labels, is described in more detail. GlassViewer includes a PDF label searching tool called AEye Label Searcher that allows quickly searching for all occurrences of selected labels within the PDF. AEye Label Searcher uses a magnifier to select specific labels within a region of the PDF which are sent to the AEye backend for processing, and the results are then displayed, which include excerpts from the document where the labels are mentioned. In some embodiments, the AEye backend may lookup labels within multiple documents or return additional information generated from one or more h-LLM models as taught elsewhere in other embodiments of this invention. For example, a legal brief may be first generated using a local (in-house) database of briefs and then supplemented by h-LLMs that are trained on public-domain training sets of legal briefs, and the combination may be merged as needed.

Figure 22:
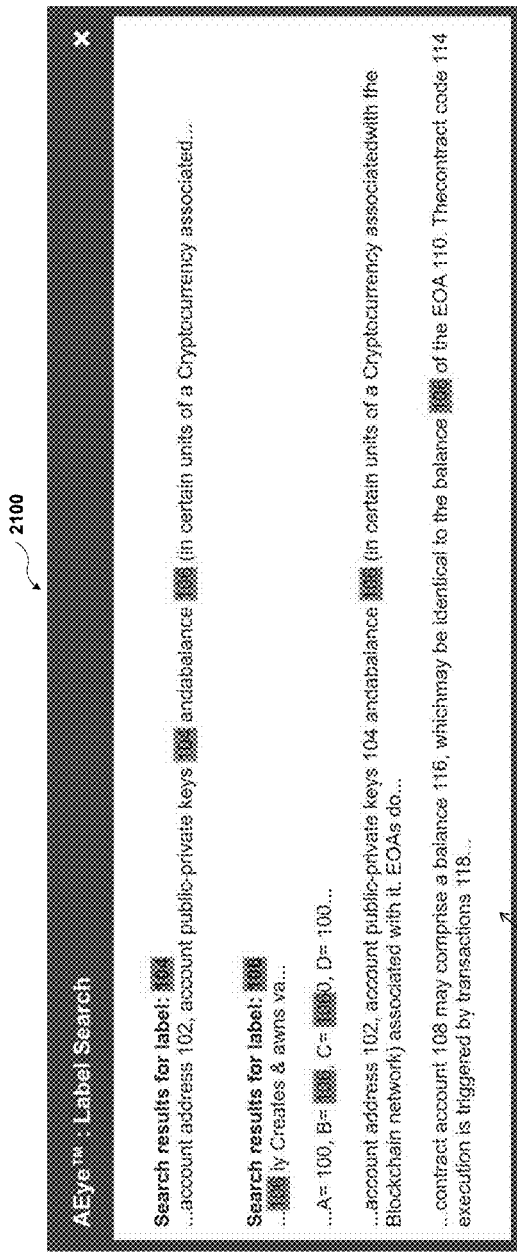
FIG. 22 is an exemplary interface of the CatchUp platform showing label search results within GlassViewer, according to an embodiment of the invention.

Referring now to FIG. 22 is an exemplary interface of the CatchUp platform showing label search results within GlassViewer, is described in more detail. The labels selected using the magnifier within the AEye Label Searcher are sent to the AEye backend for processing and the results are then displayed as shown in this figure.

Figure 23:
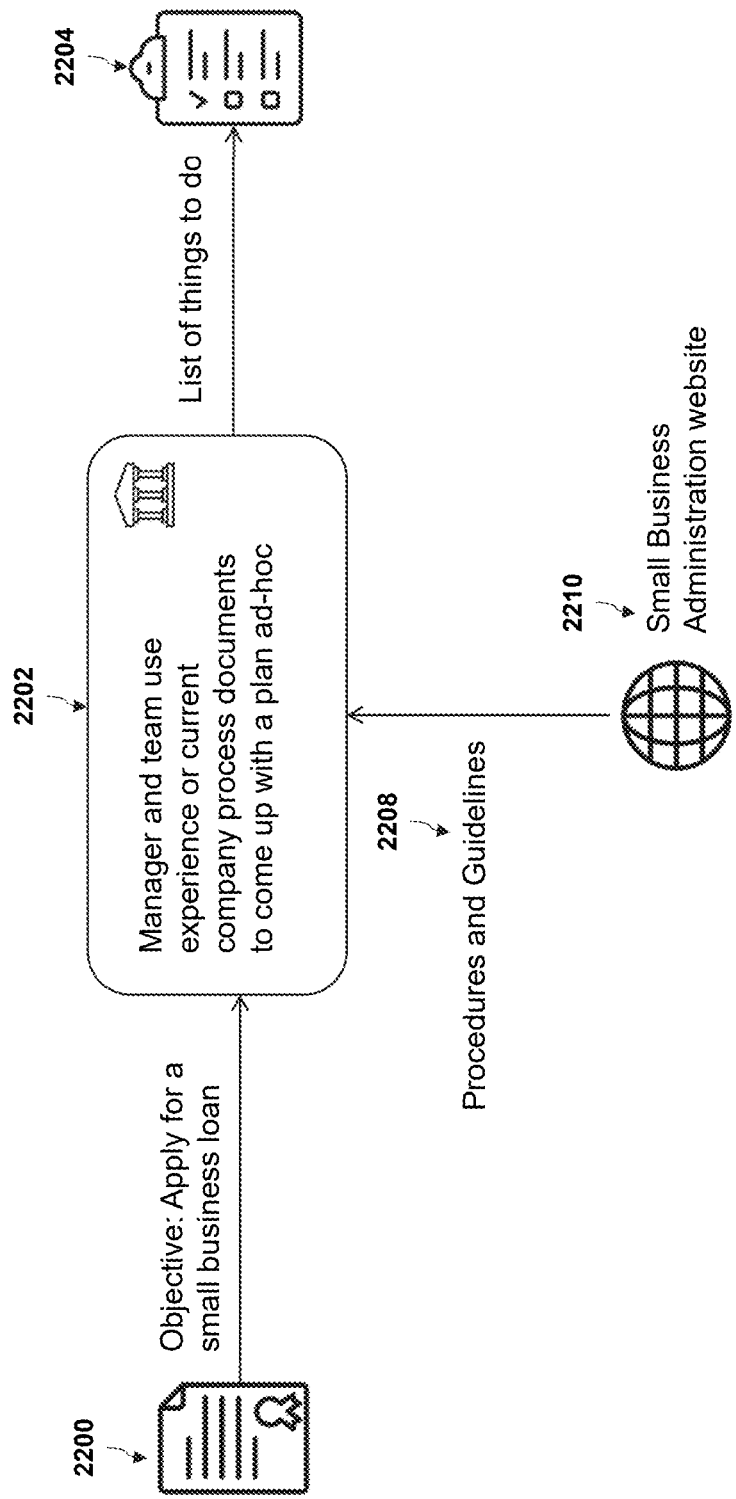
FIG. 23 is an illustration of the process used by organizations to decide the list of tasks for a project, according to an embodiment of the invention.

Referring now to FIG. 23, an illustration of the process used by organizations to decide the list of tasks for a project, is described in more detail. Given an objective 2200 such as applying for a business loan, the manager and team 2202 in an organization use their experience or current company process documents to come up with a plan in an ad-hoc manner. The plan includes a list of things to do 2204. The list of things to do may be informed by procedures and guidelines 2208 that may be provided by an administrative or governing body, such as, for example, the Small Business administration, and may be retrieved from a website 2210 therefor.

Figure 24:
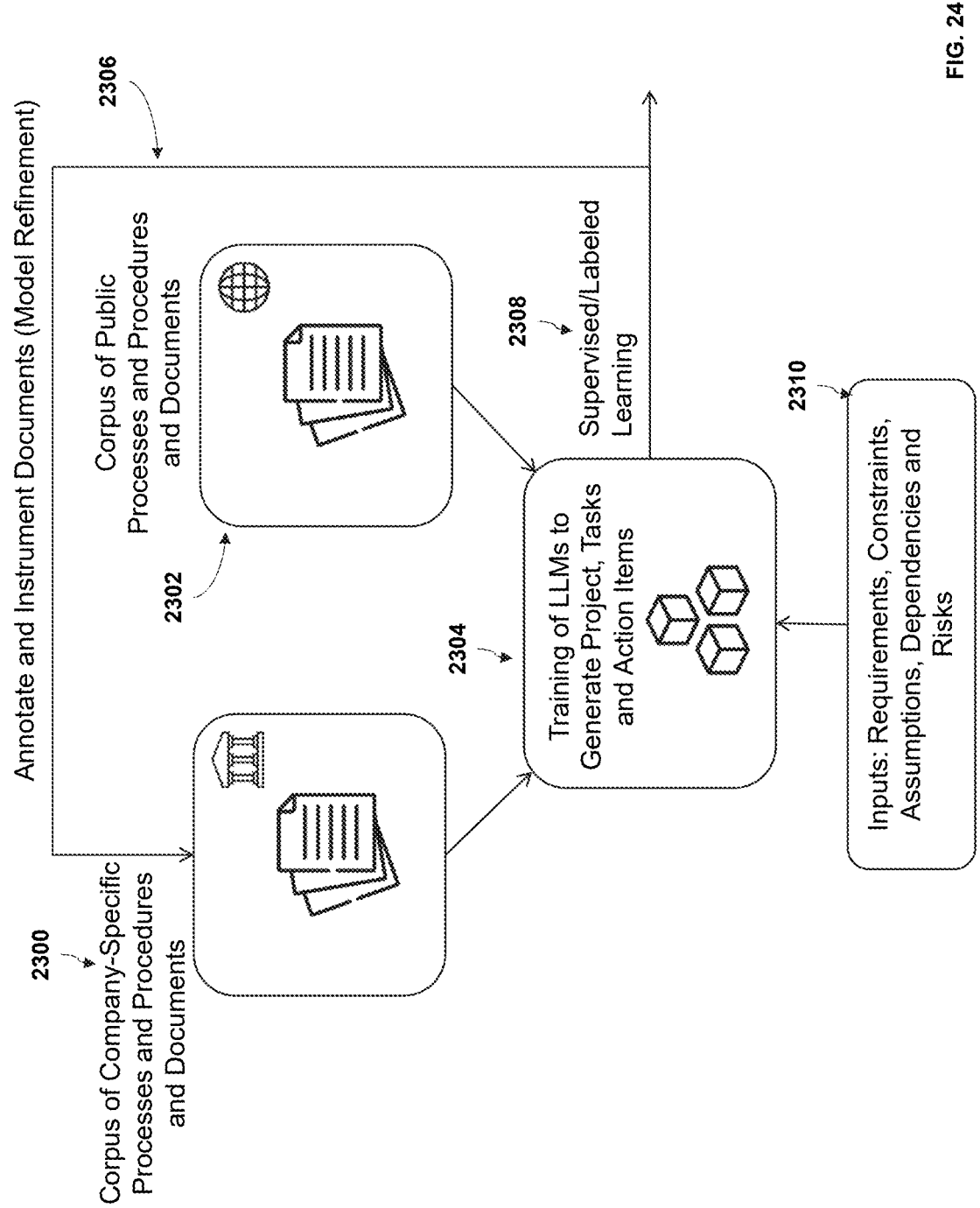
FIG. 24 is an illustration of the process of training LLMs to generate project, tasks and action items, according to an embodiment of the invention.

Referring now to FIG. 24, an illustration of the process of training LLMs to generate project, tasks and action items, is described in more detail. A Corpus of Company-Specific Processes and Procedures and Documents 2300 and Corpus of Public Processes and Procedures and Documents 2302 are used as input data for training of LLMs to generate Project, Tasks and Action Items 2304. The content generated by the LLMs may be designated as supervised or labeled learning data 2308. During the training process inputs such as requirements, constraints, assumptions, dependencies and risks 2310 are given. The trained LLMs are used to generate synthetic data which is then fed back to the models in feedback loop through a process called model refinement 2306.

Figure 25:
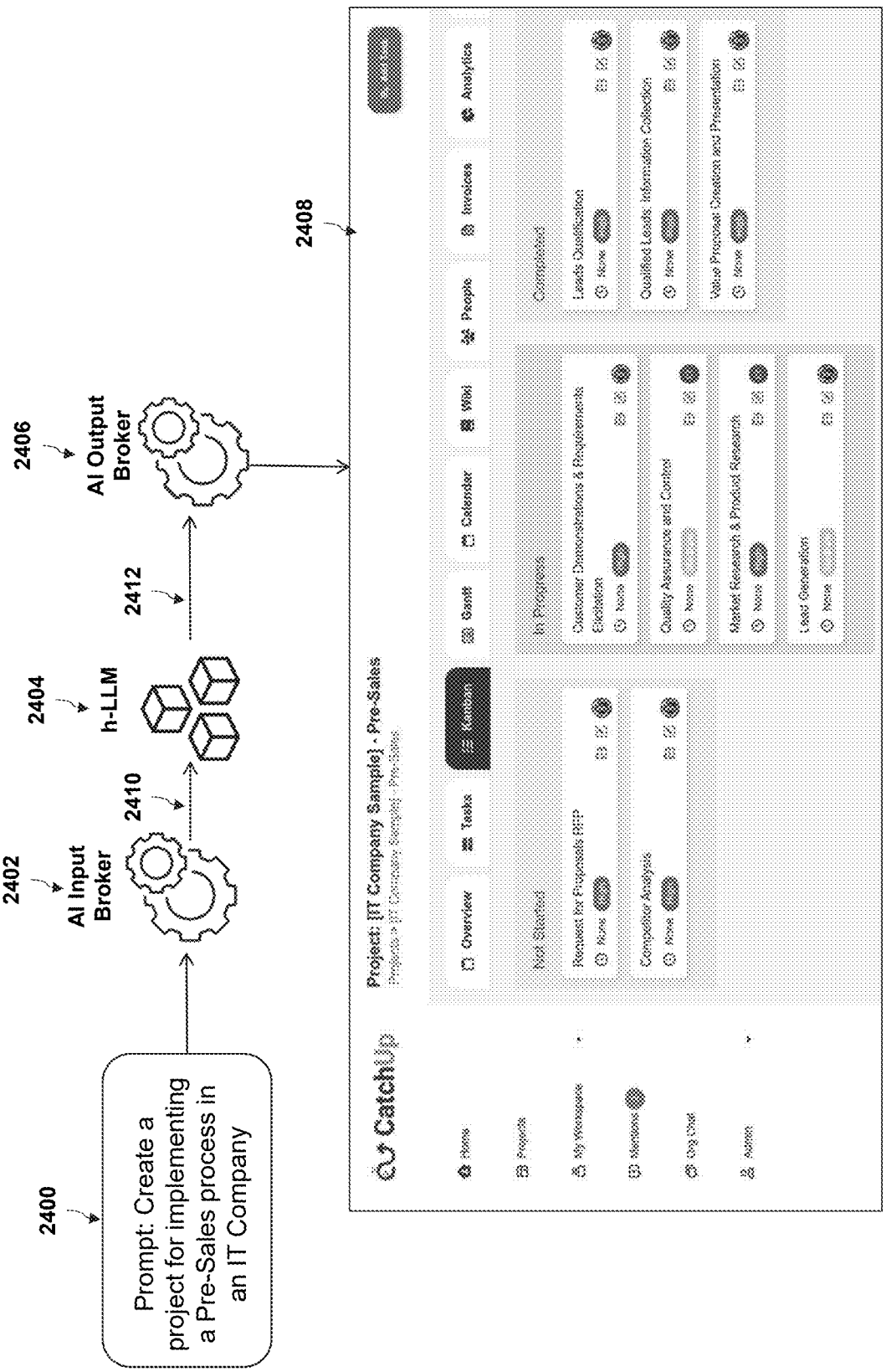
FIG. 25 is an illustration of the process of creating a project within CatchUp using a prompt, according to an embodiment of the invention.

Referring now to FIG. 25, an illustration of the process of creating a project within CatchUp using a prompt, is described in more detail. Within CatchUp, the user enters a prompt 2400 (such as create a project for implementing a pre-sales process in an IT Company). The prompt 2400 is sent to the AI Input Broker 2402 which generates one or more derived prompts 2410. The derived prompts 2410 are sent to one or more h-LLMs 2404, preferably several h-LLMs, which produce the results. The results 2412 are sent to the AI Output Broker 2406 which processes the results and performs tasks such as filtering, ranking, weighting, assigning priorities, and then sends the best results to the user. CatchUp 2408 creates a project and list of tasks and sub-tasks/action items within the project based on the response received from the AI Output Broker.

Figure 26:
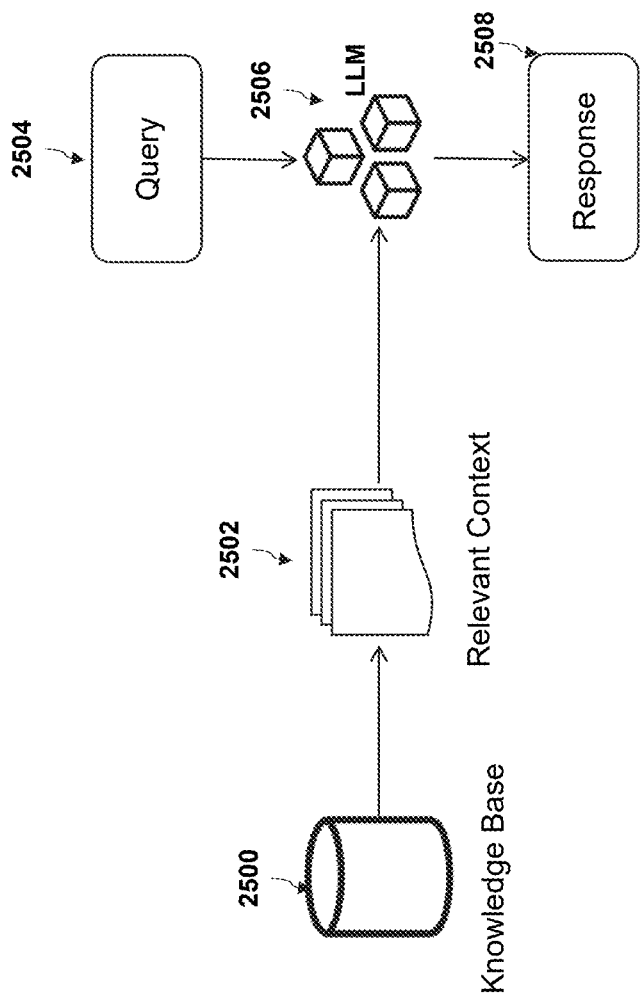
FIG. 26 is an illustration of the process of Retrieval Augmented Generation (RAG), according to an embodiment of the invention.

Referring now to FIG. 26, an illustration of the process of Retrieval Augmented Generation (RAG), is described in more detail. RAG is a paradigm for augmenting LLM with custom data. A knowledge base 2500 is prepared from a corpus of documents (such as company-specific documents or public documents) in an indexing stage. The knowledge base 2500 can then be queried in the querying stage in which the relevant context 2502 is retrieved from the knowledge base to assist the LLM 2506 in generating a response 2508 to a query 2504.

Figure 27:
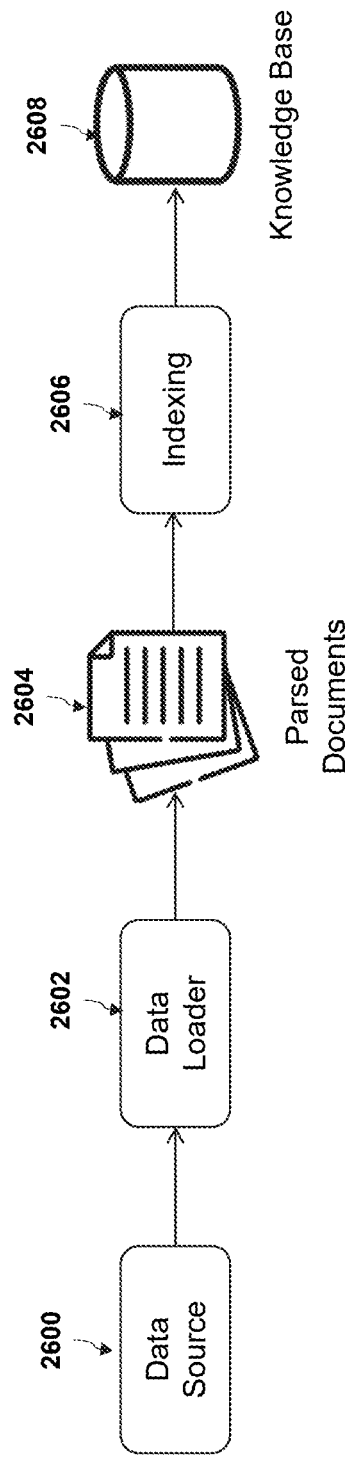
FIG. 27 is an illustration of the process of indexing documents in RAG, according to an embodiment of the invention.

Referring now to FIG. 27, an illustration of the process of indexing documents for RAG, is described in more detail. The data source 2600 comprises documents (such as company-specific documents or public documents). The data loader 2602 reads the data source files and parses them to create the parsed documents 2604. The parsed documents 2604 are then indexed in an indexing stage 2606 in which the documents are converted into vector embeddings, and related metadata is inferred. The vector embeddings of documents are stored in a vector database which serves as the knowledge base 2608 for RAG.

Figure 28:
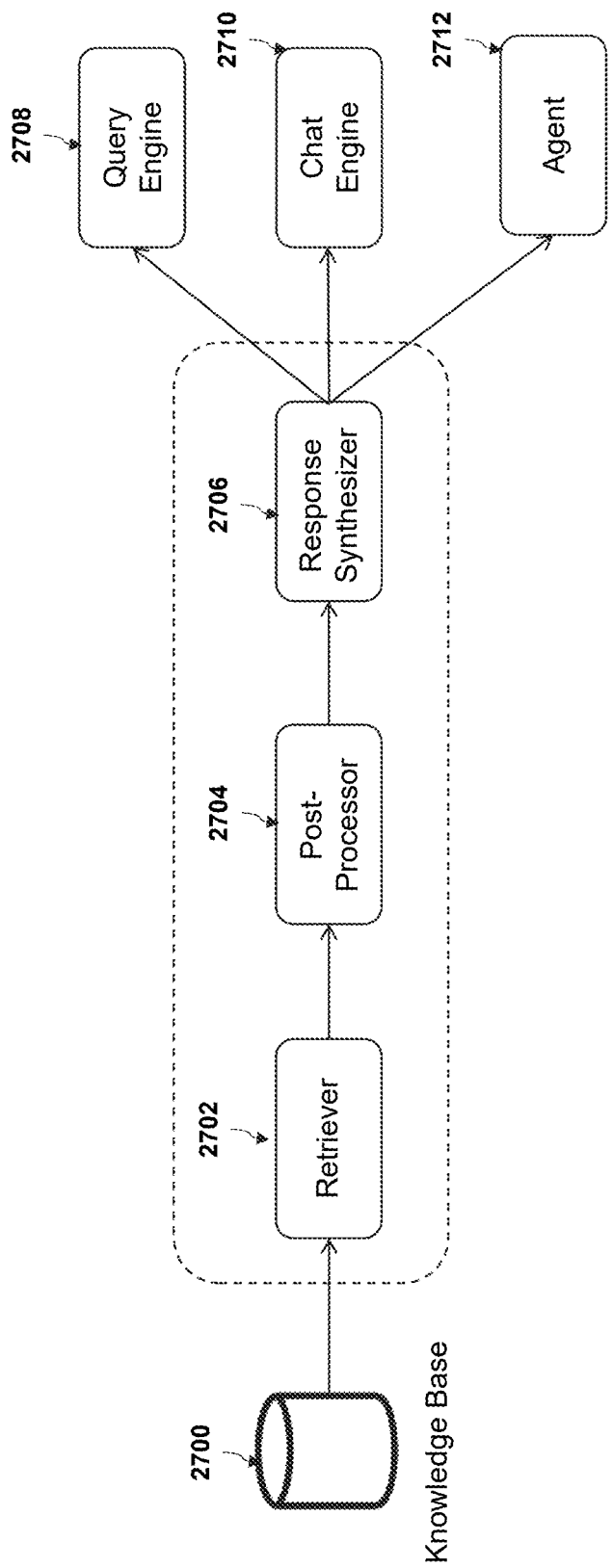
FIG. 28 is an illustration of the process of querying documents in RAG, according to an embodiment of the invention.

Referring now to FIG. 28, an illustration of the process of querying documents in RAG, is described in more detail. In the querying stage, the most relevant documents from the knowledge base 2700 are retrieved as the relevant context which is passed to the LLM along with the user's query. The relevant context allows the LLM to respond to the user query (including through use of the derived queries) even though the LLM may not be trained with the data from the knowledge base. The retrievers 2702 are used to retrieve the relevant context from the knowledge base 2700. The retrievers 2702 may use different search and similarity matching strategies to search and retrieve the documents. Post-retrieval, the post-processor 2704 filters, transforms and ranks the relevant documents. The response synthesizer 2706 generates a response from an LLM, using a user query. The query engine 2708 allows users to ask questions over their own data. The chat engine 2710 allows users to have chat conversations with their data. The agent 2712 is an automated decision maker that interacts with external tools.

The knowledge base contains a large set of documents (which can be private documents that are used to generate a "context" for the trained LLM". The Retriever may use efficient search algorithms, such as keyword-based or page-rank based searches for a cluster or subset, to identify the relevant context that is then used by the Retriever to generate the context that is they sent to the Query engine, or Chat Engine or LLM Agent. This is a two-step process that adds to how existing RAGs operate and removes the limitation that current LLMs start with an unsuitable context, and thus cannot do better. The same approach can also be used when training the LLM initially or fine-tuning it. Our approach thus combines traditional search algorithms of a set of documents to find the "best match" through traditional search mechanisms (e.g., page rank, or cluster search algorithms (both online, internet, and offline or local modes) to identify the suitable (e.g., based on a matching score of the subset of relevant documents or their portions/blocks/chunks) cluster, which may be ordered or reordered or transformed relevant to the prompt/query (or the derived queries and/or prompts) and associated context.

Figure 29:
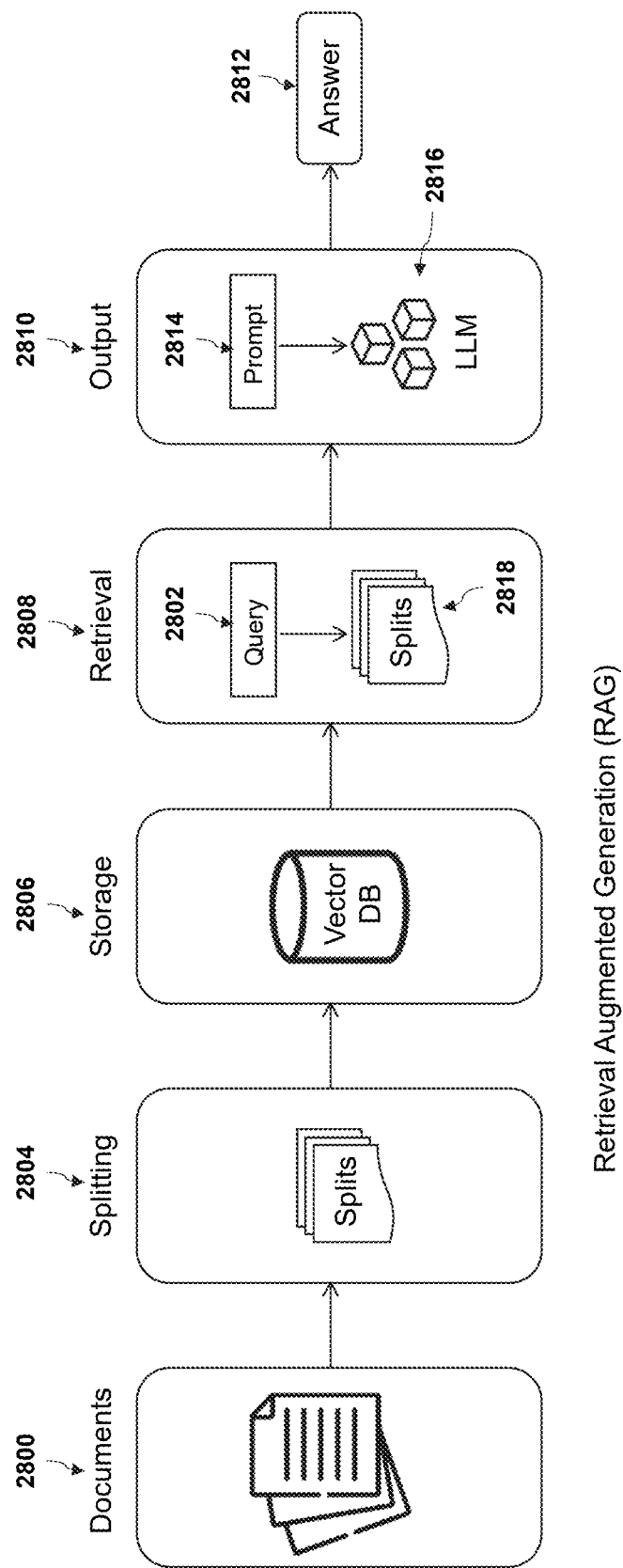
FIG. 29 is an illustration of the Retrieval Augmented Generation (RAG) pipeline, according to an embodiment of the invention.

Referring now to FIG. 29, an illustration of the RAG pipeline is described in more detail. RAG is a paradigm that allows combining LLMs with custom data. The RAG pipeline includes indexing and querying stages. In the indexing stage, documents and custom data 2800 (such as such as company-specific documents or public documents) are loaded and parsed. Next, the documents 2800 are split into smaller chunks using text splitters creating document splits 2804. The splits 2804 are then stored in a vector database 2806, such as ChromaDB, along with extracted metadata. Relationships between the document splits (or chunks, contexts, or blocks) may be stored in a graph database, such as Neo4j or GraphRAG (that was open-sourced by Microsoft in 2024). The documents 2800 are stored in the form of vector embeddings in the vector database which allows fast searching, retrieval and comparison of documents using different similarity measures and/or through use of the metadata. This completes the indexing stage. In the querying stage, the user sends a query 2802. The system retrieves splits from the vector database which are similar to the query. These retrieval splits 2818 and relevant associated metadata and processing results are then sent to the LLM as the context information along with the query as a prompt 2814. The prompt 2814 comprises the user query 2802 and the retrieval splits 2818. The LLM 2816 generates the answer 2812 based on the query 2802 and context information in the prompt 2814.

Figure 30:
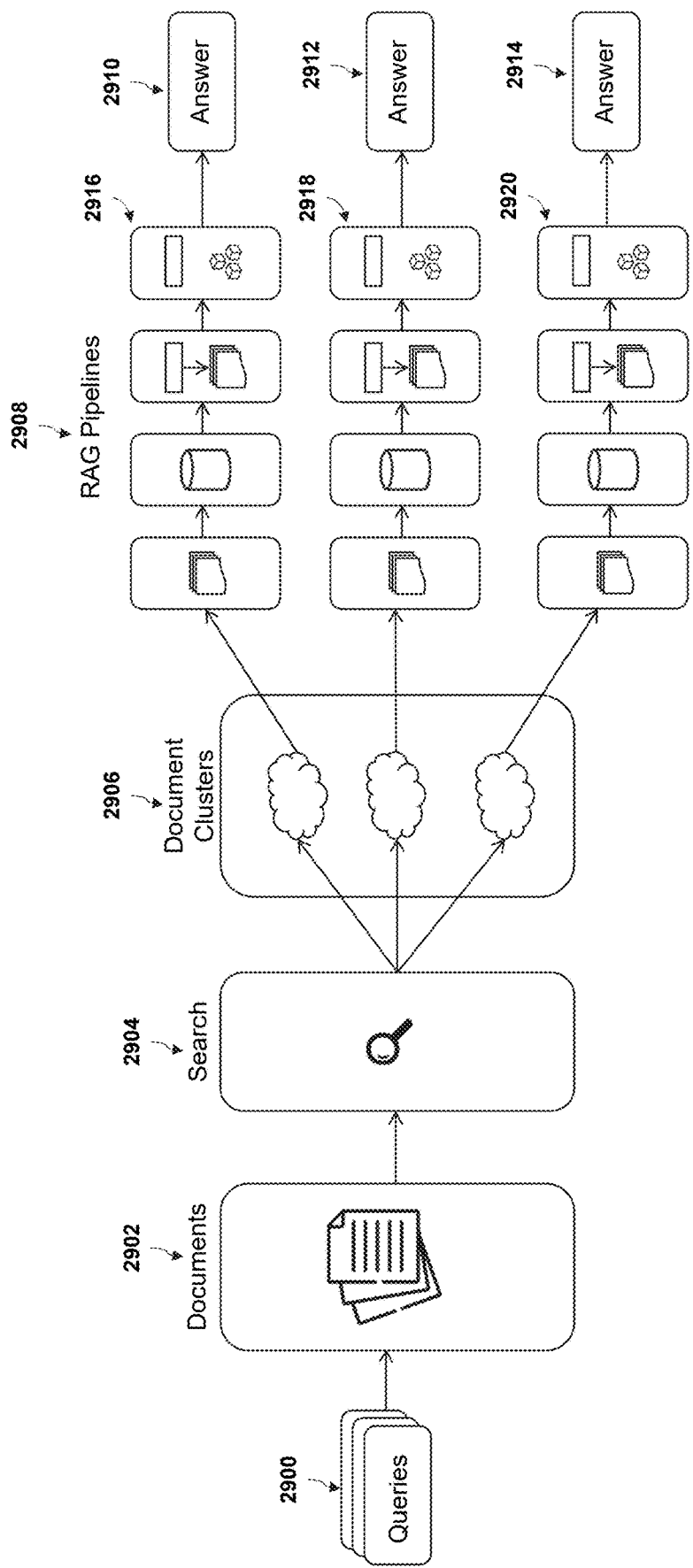
FIG. 30 is an illustration of an approach that uses multiple RAG pipelines with clusters of documents, according to an embodiment of the invention.

Referring now to FIG. 30, an illustration of an approach that uses multiple RAG pipelines with clusters of documents, is described in more detail. Existing LLMs and RAG pipelines have low accuracy and increased memory and performance penalties because of the way they develop context in normal high-level API use. A problem with LLMs includes the context being typically small (e.g. 4 k tokens) as opposed to much larger context size, that could be 100 k tokens or more. The context is not relevant and is created or selected through techniques that may not create the highest relevance score. To address these limitations an approach of using multiple retrieval augmented generation pipelines with clusters of documents is proposed. Based on a set of user queries 2900 the documents 2902 are searched 2904 and clustered 2906. The proposed approach thus combines traditional search of a set of documents to find the "best match" through traditional search mechanisms (e.g., page-rank), or cluster search algorithms (both online and offline modes) to identify the suitable (e.g., based on a matching Score of the subset of relevant documents) cluster and associated metadata relevant to the query and its context. For each document cluster 2906, a separate RAG pipeline is created 2916, 2918, 2920 and produces its own result 2910, 2912, 2914. The user queries are then routed to the most suitable RAG pipelines 2908 using a similarity/matching score and/or processing based on relationships between documents and/or their chunks and each other across the entire document set (utilizing, for example, a graph database as well for processing of relationships and/or metadata).

Figure 31:
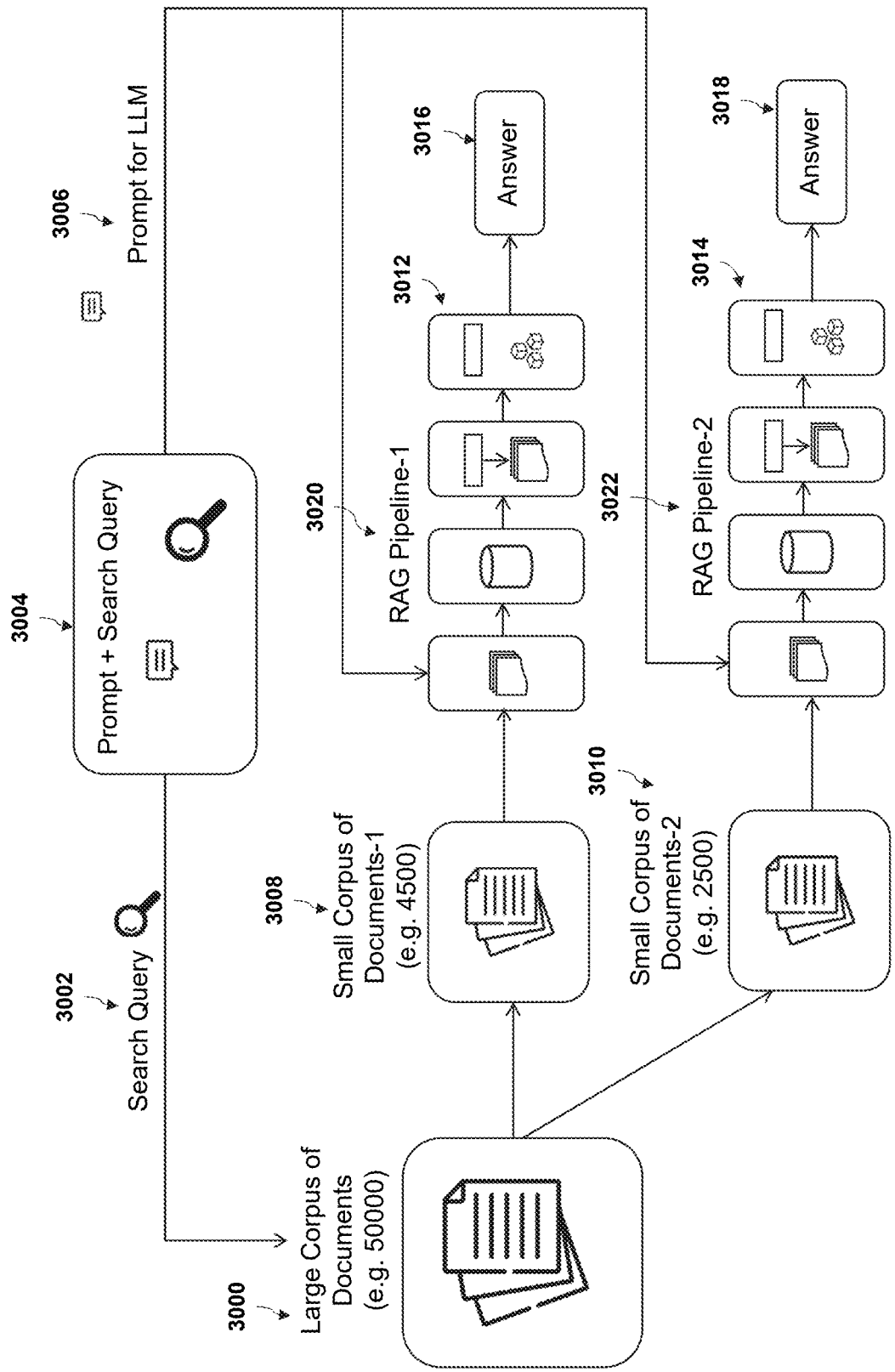
FIG. 31 is an illustration of an approach that uses a prompt augmented with a search query, according to an embodiment of the invention.

Referring now to FIG. 31, an illustration of an approach that uses a prompt augmented with a search query, is described in more detail. Currently, in RAG pipelines, the prompt is used by both the Retriever and also the LLM. The language in the prompt may cause the retriever to generate low quality context that is then sent to the LLM, and results in poor quality results from the LLM. Instead, the prompt that we propose can be parsed or filtered or processed first to create a search query that is used to retrieve a subset of documents and/or their portions that have the best match with the search query derived from the prompt.

Prompt 3004 has a portion that is the prompt for the LLM 3006, and a portion that is a search query 3002 for creating a subset of the documents to be used by the retriever for its matching function. The search query 3002 portion of the prompt is used to search a large corpus of documents 3000 and create small document clusters (such as corpus 3008 and 3010). For each document cluster, a separate RAG pipeline may be used (such as 3020 and 3022).

The prompt 3004 is processed to separate out a search query (before the documents are indexed into the vector database, and the full corpus of documents is broken (possible offline) into smaller clusters or chunks of documents.

Based on the augmented prompt (that contains the prompt and search query), one or more clusters 3008, 3010 are chosen to answer the query and the corresponding RAG pipelines 3020, 3022 are then used to generate responses 3016, 3018 to the prompts 3012, 3014. For example, consider a document corpus of a large number of PDF files related to real-estate contracts. The prompt is processed to separate out a search query and the full corpus of PDF files is broken into a rental contract subset/cluster and a purchase contract subset/cluster. Based on the query, the rental contract template subset/cluster is chosen and then the RAG pipeline processes the query in the context of rental contracts or their portions.

The processing of the prompt can be done in two ways—the prompt specifically and explicitly identifies "rental option" as a separate field or word, or the "rental option" may be derived from the prompt because the prompt uses "without a downpayment". The context that results, e.g., "Rental Contracts", is more accurate and responsive to the prompt that a combined context that is generated from all the PDFs in the original collection. This partitioning into subsets can be done offline, and the "search portion" of the prompt can be further processed by mapping or filtering or inference to the closest of the subsets of the documents in local or online databases, in case online creation of the subsets takes too long. Sometimes, online creation of the subsets of the collection of PDF files (or files or objects of other kinds, like images, videos, or text or songs) may be possible. In all cases accuracy is improved because the retriever is operating on a more relevant subset of documents or their portions based on their content and/or associated metadata.

Figure 32:
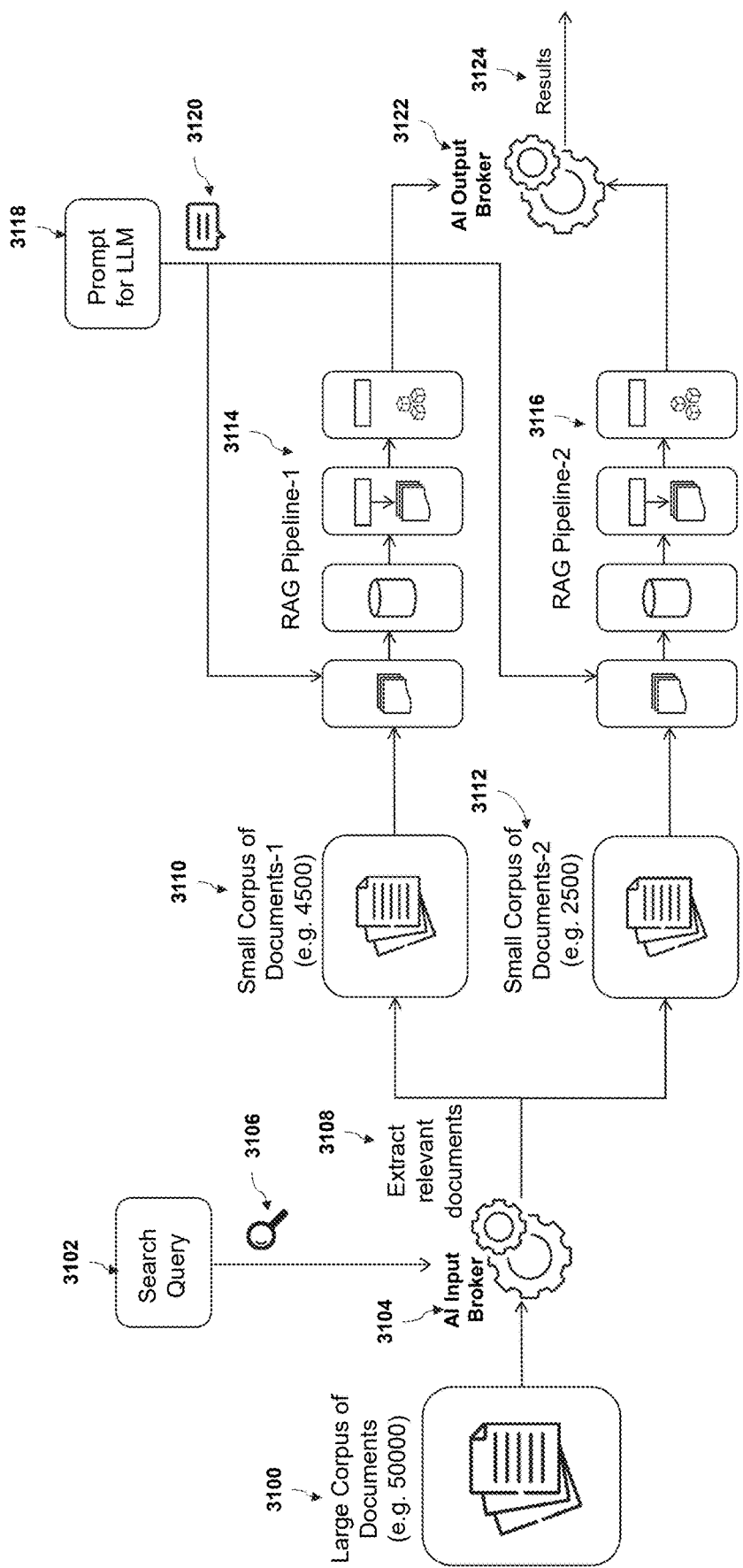
FIG. 32 is an illustration of an approach that uses a search query to extract relevant context for RAG pipelines, according to an embodiment of the invention.

Referring now to FIG. 32, an illustration of an approach that uses a search query to extract relevant context for the RAG pipelines, is described in more detail. A search query 3102 is used to extract documents 3108 from a large corpus 3100 and create smaller clusters of documents 3110 and 3112. The search query 3102 is sent to an AI Input Broker 3104 which generates multiple derived queries which help in clustering documents into different clusters 3110 and 3112. For each document cluster 3110, 3112, a separate RAG pipeline 3114, 3116 is created. The prompt 3118 is sent 3120 to each of the RAG pipelines 3114, 3116 and the responses from these pipelines are combined by the AI Output Broker 3122 which processes the results and performs tasks such as filtering, ranking, weighting, assigning priorities, and then sends the best results (in batch and/or real-time modes) 3124 to the user utilizing suitable APIs and supported by cloud-based container or virtualized systems, such as Kubernetes and Istio Service Mesh.

Figure 33:
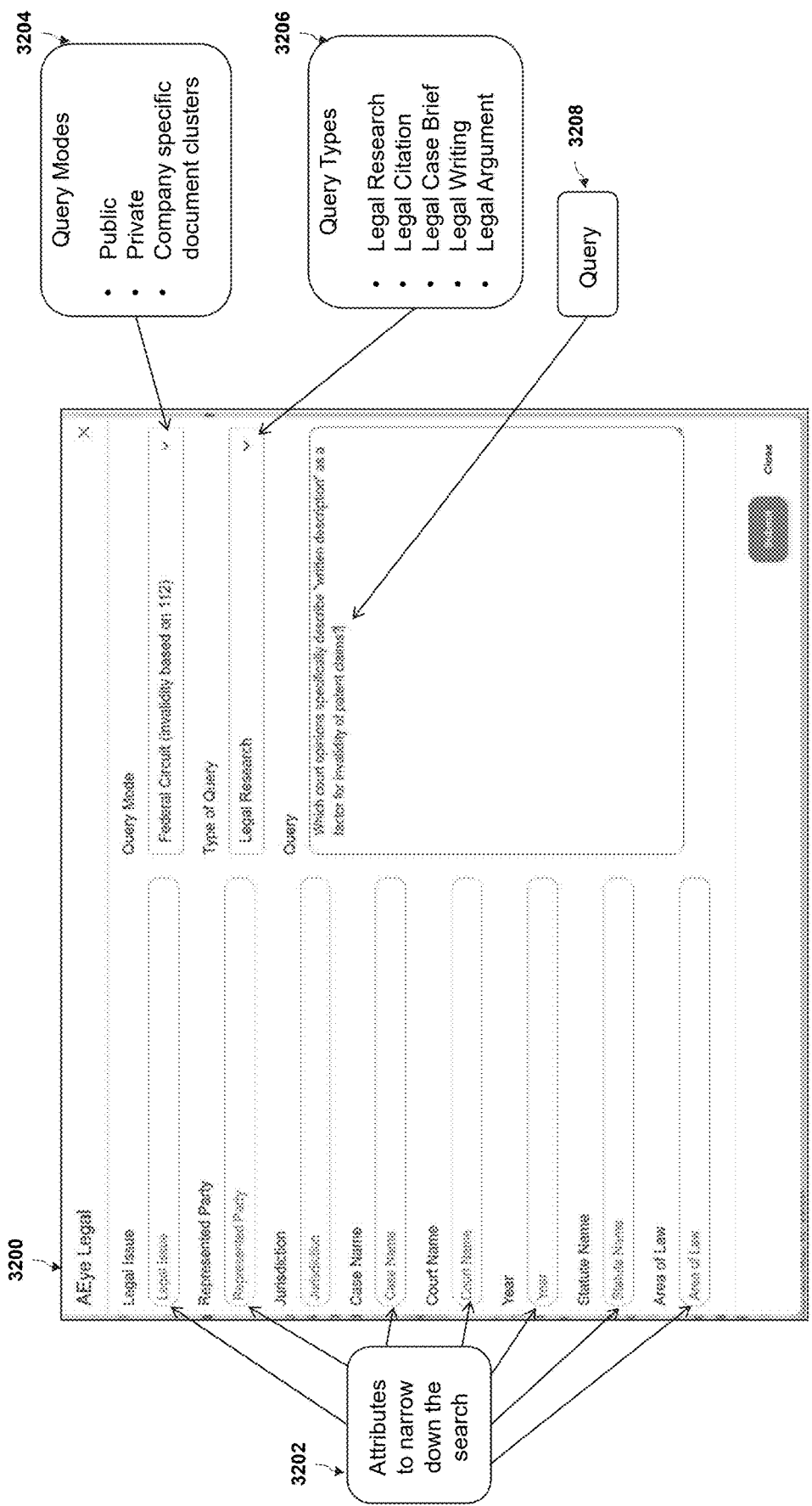
FIG. 33 is an exemplary interface of the CatchUp platform for RAG, according to an embodiment of the invention.

Referring now to FIG. 33, an exemplary interface of the CatchUp platform for RAG, is described in more detail. The exemplary interface 3200 is designed for legal use cases and allows users to query public and private legal documents obtained from courts and other sources. Different query modes 3204 are supported for data sources such as public, private and company specific document clusters, online and offline. For querying documents, different query types 3206 are supported such as legal research, legal citation, legal case brief, legal writing and legal argument. User can optionally provide attributes 3202 such as legal issue, represented party, jurisdiction, case name, court name, year, statute name, area of low, for instance. The user query 3208 is sent to the CatchUp backend server which implements multiple RAG pipelines as shown in FIGS. 31 and 32.

Figure 34:
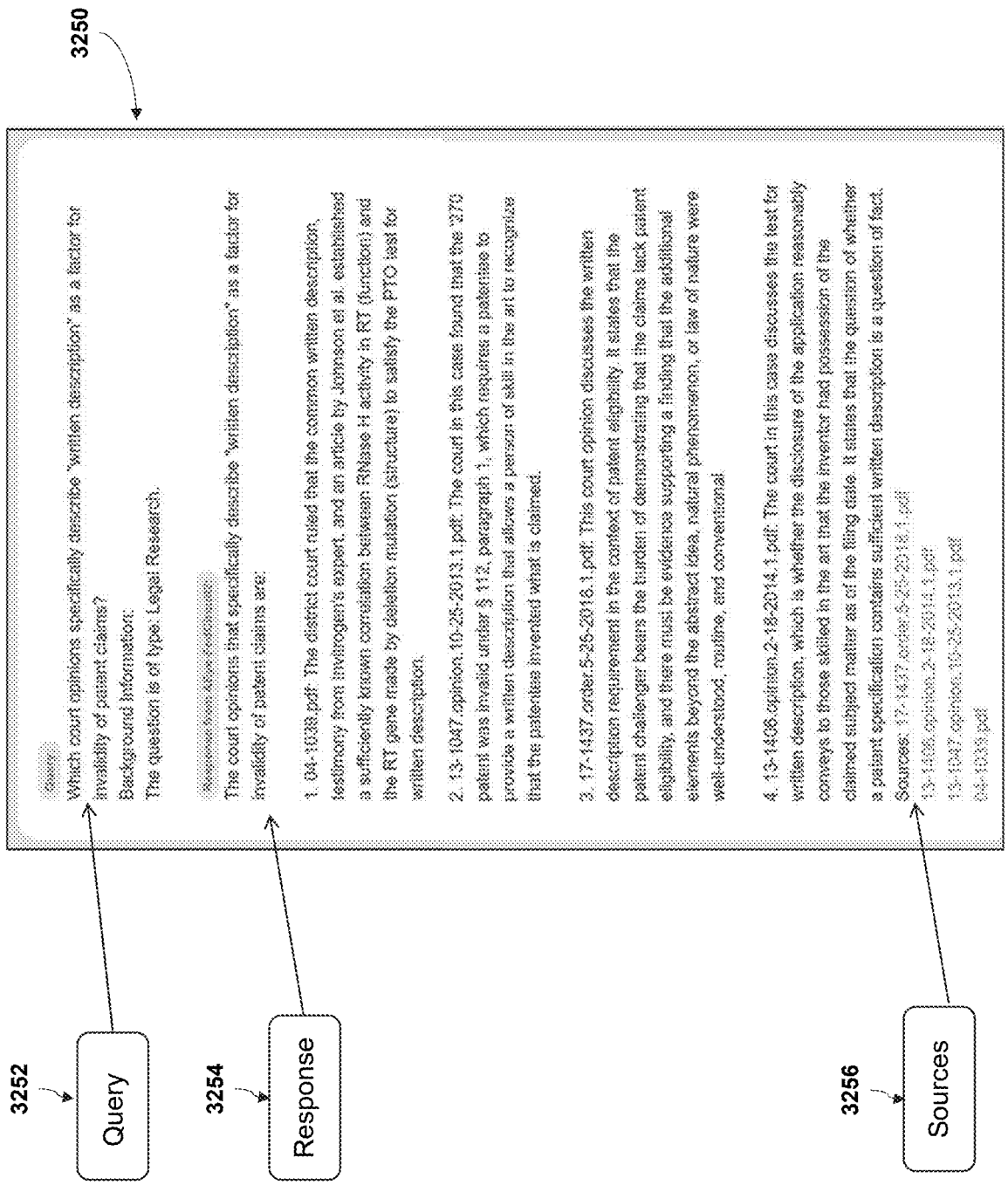
FIG. 34 is an exemplary interface of the CatchUp platform showing a response from a RAG pipeline, according to an embodiment of the invention.

Referring now to FIG. 34, an exemplary interface 3250 of the CatchUp platform showing response from Retrieval Augmented Generation (RAG) pipeline, is described in more detail. In response to a user query 3252 sent from the user interface 3250, as shown in FIG. 33, the response 3254 is returned as shown in FIG. 34. The response 3254 includes the links to the source documents (or their portions or chunks, thereof) 3256 which were used as the relevant context with the RAG pipeline for generation of response.

Figure 35A:
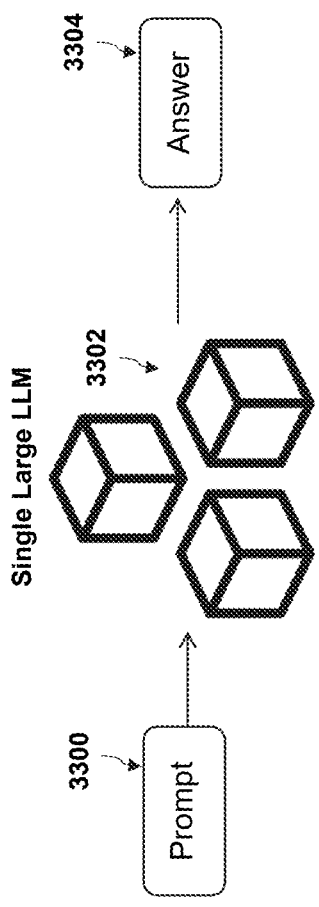
FIG. 35A is an illustration of a prior art embodiments of using a single LLM.

Referring now to FIG. 35A, an illustration of using a single LLM as known in the prior art is depicted. Currently a single large LLM 3302 is trained on all types of data and has large number of parameters (e.g. OpenAI GPT3.5 has 175 billion parameters and GPT-4 has over 1 trillion of parameters). The single large LLM 3302 responds individually to the prompt 3300 to generate the answer 3304.

Figure 35B:
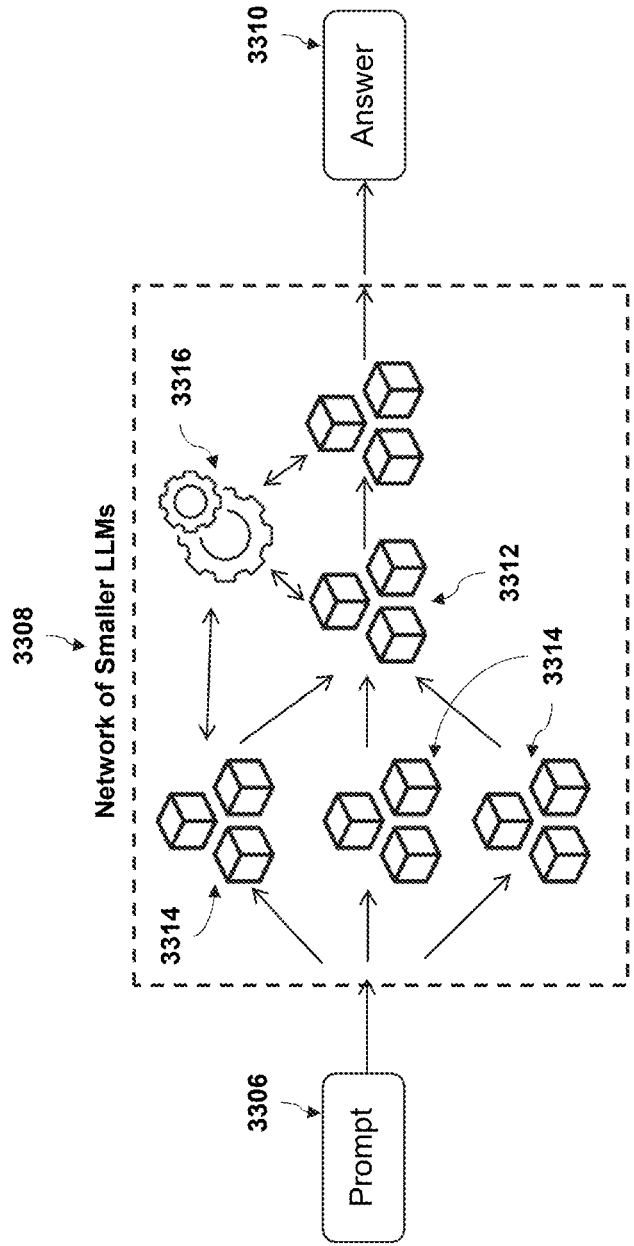
FIG. 35B is an illustration of using a network of LLMs, according to an embodiment of the invention.

FIG. 35B presents an illustration of using a network of LLMS. In an embodiment of the present invention, smaller LLMs (with 3 billion or 7 billion parameters, for example), each focused on a specific type of result (cost estimation, profit estimation, expense estimation or prediction) are provided in a network 3308, and then network of LLMs 3308 is used to provide a composite result that is easier to prompt for, easier to optimize and easier to "explain" how it works by having smaller focused LLMs trained on specialized training sets. The smaller LLMs can be chosen from a library of LLMs and mixed and matched with other compatible LLMs using a communication protocol that exchange messages and exchange messages with a head-end or Manager LLM using an architecture that could be similar to Hadoop (where there is a master manager and bunch of worker nodes). Here is there is a master LLM 3312 and several networked worker LLMs 3314. An adaptor module or a set of adapters 3316 may be configured to process these inter-LLM messages and inter-h-LLM messages and serve as a router for converting the format of a particular LLM's output to fit to the format of the API for another LLM and then route it on a cloud-container based virtualized network, similar to Istio Service Mesh that is used for routing services in typical cloud-based container implementations of computing microservices, that may be optionally based on GPUs. Therefore, if there are two choices available, one is to use an API Gateway that receives the APIs and converts and adapts the APIs for various LLMs and calls between LLMs, and another could be based on a service mesh that has agents, for example, that route the prompts and queries to the respective LLMs and process the results and redirect them to the appropriate destination. Other options are also available in batch or real-time modes.

The LLMs in a network can communicate with each other using client-server protocols such as HTTP/HTTPS, FTP, RPC, or peer-to-peer network protocols such as BitTorrent protocol, IPFS, WebRTC, for instance. Custom protocols may be developed for efficient communication of LLMs in a network. An example use case can be a network of Vision LLMs (one for each car on a road or in a platoon) which exchange information as to unusual traffic incidents that the autonomous car may not have been trained with to handle.

Figure 36A:
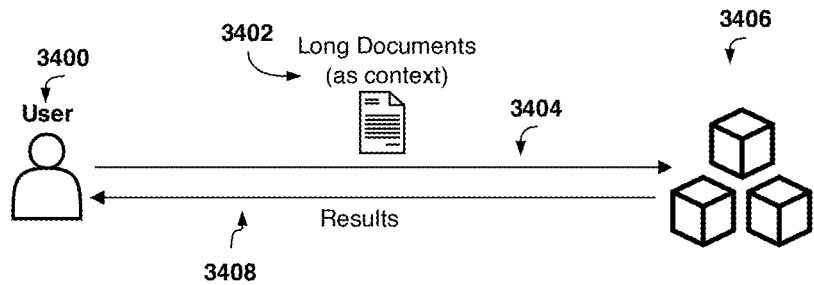
FIGS. 36A-C is a comparison of the current (36A) and proposed (36B, 36C) approaches of a long-document attention span enhancement through refinement (LASER) system and a scored context-optimized retrieval enhancement for retrieval augmented generation (SCORE-RAG) system according to an embodiment of the invention.
Figure 36B:
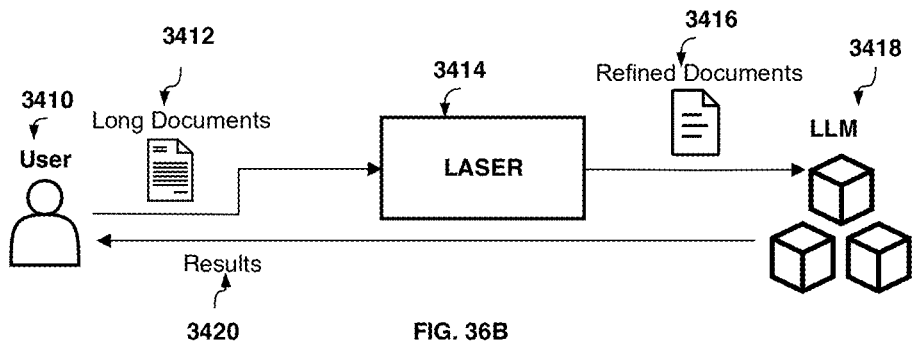
Figure 36C:
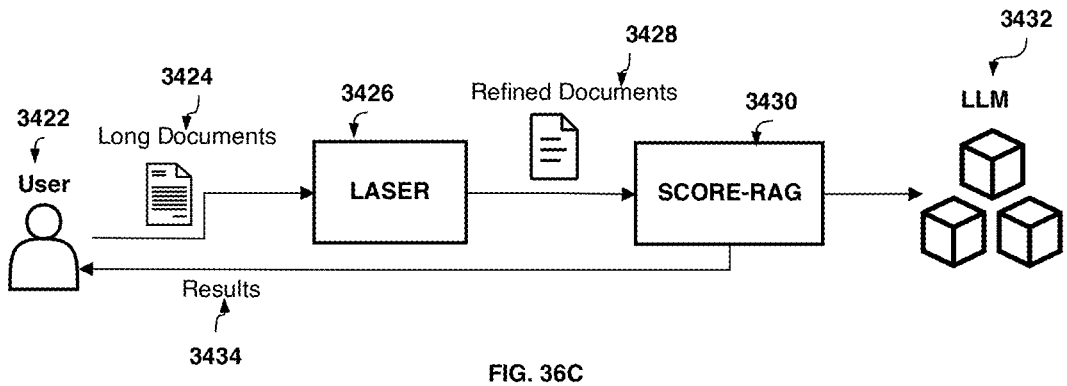

Referring now to FIG. 36, a comparison of the current and proposed approaches with the LASER system and SCORE-RAG system is described in more detail. FIG. 36A illustrates the prior art approach, FIG. 36B illustrates the proposed approach for processing long documents with LASER, and FIG. 36C illustrates the proposed approach for optimizing RAG with SCORE-RAG. In the prior art approach a User 3400 sends 3606 one or more long documents (as context) 3402 along with a prompt (containing the user's query) to an LLM 3406. The LLM processes the prompt and the context and generates a response 3408. The prior art approach is limited by the context length limit of the LLM, therefore, only a limited number of small documents or only a portion of a long document can be processed. Moreover, the LLM faces challenges when processing long documents, particularly in maintaining coherence and performing long-range reasoning due to the attention span problem which causes a noticeable drop in performance as the length of the input context increases, typically beyond 10,000 to 50,000 tokens.

As shown in FIG. 36B, an embodiment of the present invention, the LASER system 3414, uses an iterative attention-focusing technique that dynamically refines and condenses document context to improve model comprehension and coherence over extended inputs. The process begins with a User 3410 who has one or more Long Documents 3412 for processing. Instead of sending the document directly to an LLM 3418, long document(s) 3412 are first passed through a LASER system 3414. The LASER system 3414 employs the iterative attention-focusing technique to refine and distill the context of the long document and its chunks. After refinement, the refined documents (or refined generated documents and subsets/chunks/blocks) 3416 (containing processed and condensed information and also extracted metadata, optionally stored in a graph database) are then sent to the LLM 3418 for final analysis or generation tasks. One distinction between the approaches in FIGS. 36A and 36B is the introduction of the LASER system 3414 for attention span refinement. The LASER system 3414 acts as an intermediary processor that prepares the long document(s) 3412 for more effective handling by the LLM 3418. The LASER system 3414 addresses the limitations of the prior art solution by introducing an intelligent preprocessing step which enables LLMs to effectively handle long documents that would otherwise exceed their attention capacity.

FIG. 36C illustrates another embodiment of the invention, a SCORE-RAG system 3430 which can be combined with a LASER system 3426 to create a solution for processing long documents and generating accurate responses that may perform better than the prior art solution. The process begins with a User 3422 who has one or more long documents 3424 for processing. The documents and/or their chunks are processed through the LASER system 3426 which produces refined documents 3428 which are then fed to the SCORE-RAG system 3430. The SCORE-RAG system 3430 uses context-optimized retrieval techniques to enhance the traditional RAG approach. This system enhances the traditional RAG approach by incorporating advanced techniques such as topic modeling, intelligent document chunking, citation analysis, and hybrid search methods. The SCORE-RAG system 3430 processes the refined documents 3438 to create optimized chunks of information (and associated metadata based relationship information between chunks themselves (within a document and across documents) and also between chunks and documents), which are then indexed and prepared for efficient retrieval and use in language generation by the LLM 3432. New documents or documentation may be assembled (including reordering) "on-the-fly" in batch mode or real-time modes based on this processing. At a high level, without restricting or limiting the invention, given a corpus of documents, the LASER system 3426 processes these documents, document to document, to look at portions of relevance and interest (not in response to a particular user query, usually) but based on categories or types of information that may be present in each document that may be of interest. A long document processed by the LASER system 3426 results in a refined document. The processing of long documents by the laser system 3426 is usually perform, document by document, offline. The refined document may also be a summary, or a subset, or portions (or chunks) of a document that are of most interest in general, by a category. The LASER system 3426 may itself utilize an LLM to help it identify portions or chunks of most relevance to a category of information in the process of creation of the refined documents. The refined documents 3428 may then be taken by the SCORE-RAG system 3430 which may, in response to a query, look at the refined documents 3428 and their tagged portions or chunks organized along with metadata and relationships to each other and to categories, for example, and carry out operations on ranking and scoring those chunks that are most relevant to a particular query or a set of queries, for example, a batch of queries or derived queries.

The LASER system 3426 usually performs offline preprocessing that is not directly related to user query or derived query. The LASER system 3426 processes all documents one by one and identifies portions (or chunks or contexts) of them that fall into one or more categories of interesting information, for example, receipts, bills, tax data, customer names, inventories, etc. The LASER system 3426 then redefines each document to call out these portions and adds meta-data to identify the categories. Additionally, the LASER system 3426 may summarize the portions/chunks/contexts. Multiple categories can exist for the same portion, for example, a single portion can be in the receipt and tax categories. The LASER system 3426 may then repeat this process for all long documents. It can use a LLM or other search means (e.g., cluster search) for this process. This entire process can be done once or relatively few times for each document/Typically, the LASER system 3426 performs this process not responsive to a real-time query or prompt from the user. It can be done each time a long document is loaded into the system. The prompts from users can be used to create categories that are used in the LASER system 3426.

The SCORE-RAG system 3430 may perform online real-time processing to create relevant context in response to a derived prompt or a user prompt. The SCORE-RAG system 3430 may then take the refined documents 3428, which are categorized chunks from these documents and other meta-data, including relationships between chunks and documents, and then performs scoring, ranking, collection, and collation in response to a user query and/or its derived queries. The highly scored chunks may then be sent to the LLM 3432 for processing to create results for the user. The SCORE-RAG system 3430 can use graph and vector databases to create chunks that are most relevant to the user prompt of derived prompts and send the context to the LLM.

The combined approach using the LASER system 3426 and the SCORE-RAG system 3430 may provide improvements over prior solutions. By first refining the document through the LASER system 3426, the subsequent RAG optimization process can work with a more focused and coherent input, potentially improving its effectiveness. The refined documents 3428 (or generated documents and refined subsets/portions/chunks/blocks) allows for more accurate topic modeling and chunking in the SCORE-RAG system 3430, leading to better retrieval results. The iterative refinement process helps maintain important contextual information, which can then be effectively utilized in the RAG system's retrieval and generation stages. Both the LASER system 3426 and the SCORE-RAG system 3430 are designed to handle large volumes of text, making this combined approach suitable for processing extensive document collections or extremely long individual documents. This integrated system can be applied to a wide range of document types and domains, such as scientific literature, legal documents, and technical manuals, for instance.

Figure 37:
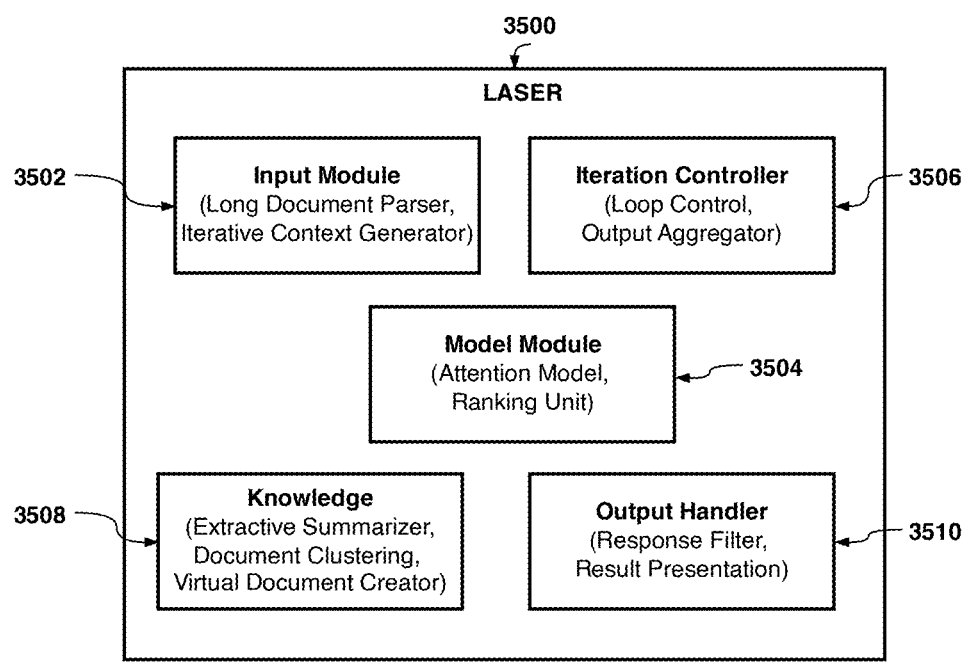
FIG. 37 is an illustration of the high-level architecture of a LASER system according to an embodiment of the invention.

Referring now to FIG. 37, an illustration of the high-level architecture of a LASER system 3500 according to an embodiment of the invention is described in more detail. The LASER system 3500 architecture comprises five primary modules, including an input module 3502, a model module 3504, an iteration controller 3506, a knowledge module 3508, and an output handler 3510. Each of these modules contains sub-components that perform specific functions within the overall system. The input module 3502 serves as the entry point for document processing. It comprises a long document parser, which is operable to ingest long documents and breaking them down into manageable blocks, and an iterative context generator, which is operable to create and refine batches of blocks from the long document processor for processing in subsequent stages. The model module 3504 forms the core processing unit of the system. It comprises, and in some embodiments consists of, an attention model which is an LLM that is operable to process and comprehend the document content, and a ranking Unit that is operable to evaluate and score the outputs produced by the attention model, identifying the most relevant and coherent content. The iteration controller 3506 is operable to control the flow of the iterative process. It comprises a loop control, which is operable to determine when to continue or terminate the iteration process based on predefined criteria, and an output aggregator, which is operable to collect and consolidate the results from multiple iterations. The knowledge module 3508 is operable to enhance the ability of the LASER system 3500 to distill and organize information. The knowledge module 3508 comprises an extractive summarizer, which is operable to identify and extract key sentences or passages from the processed content, a document clustering component, which is operable to group related content/blocks/chunks based on semantic similarity or relevance to a topic, and a virtual document creator which assembles chunks (in any order or sequence or through creation of summaries) together to create an improved document on a topic relative to the long document(s). The output handler 3510 is operable to prepare the processed information for presentation. The output handler 3510 comprises a response filter, which is operable to perform a final validation of the output to ensure quality and relevance, and a result presentation component, which is operable to format the output for user consumption, potentially including visualizations or explanations. This architecture enables the LASER system 3500 to progressively refine and focus attention on the most relevant parts of long documents through multiple iterations.

Figure 38:
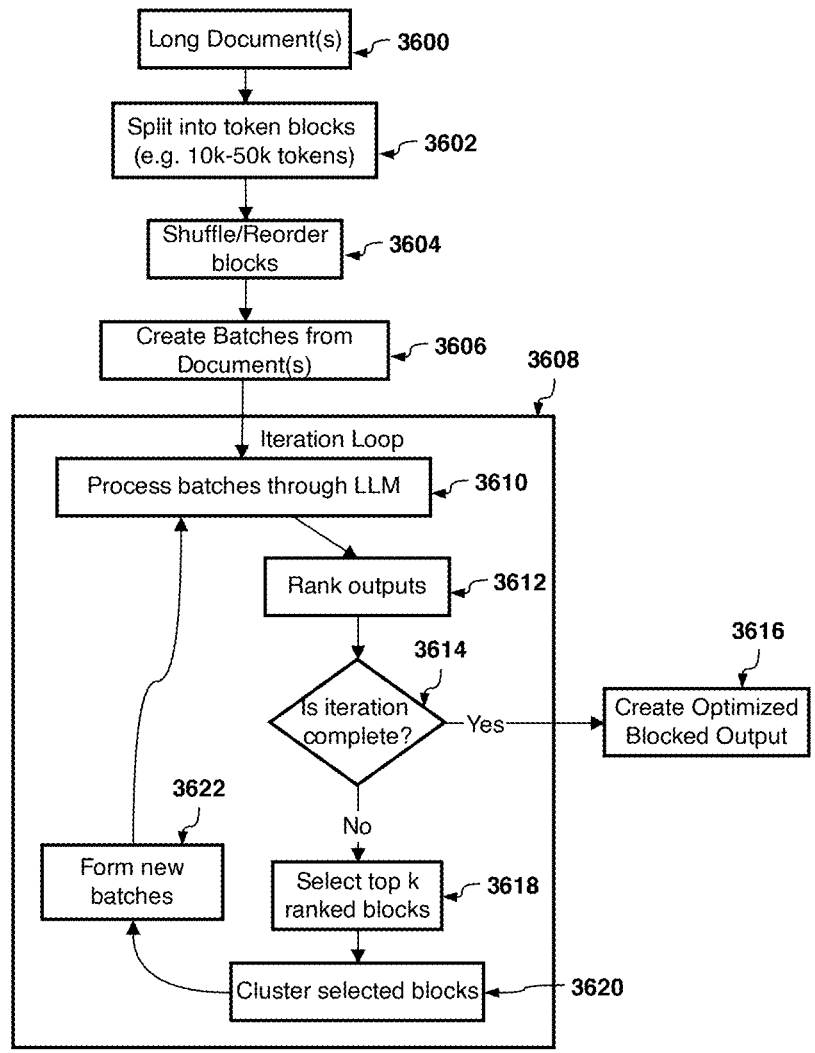
FIG. 38 is a flow chart illustrating a method performed by a LASER system by which long documents are processed and refined to enhance the attention span of LLMs according to an embodiment of the invention.

Referring now to FIG. 38, a flow chart of the LASER system depicting a process by which long documents are processed and refined to enhance the attention span of LLMs according to an embodiment of the invention is described in more detail. The process begins with a long document 3600, which serves as the input to the LASER system. It is contemplated that multiple long documents may be provided. At step 3602, the document is split into smaller, manageable blocks/chunks. The block/chunk size is configurable, typically ranging between 10,000 to 50,000 tokens. This step facilitates breaking down the long document into sizes that are more aligned with the typical attention span of current LLMs. Following the splitting operation, the blocks/chunks undergo a shuffling process at step 3604 to mitigate any potential position bias that might be present in the original document structure. By randomizing the order of the blocks/chunks, the system ensures a more uniform treatment of the content during subsequent processing stages. Alternatively, reordering of blocks/chunks may be done such that most similar blocks/chunks are either at the beginning or at the end, to avoid attention span problems with LLMs. The shuffled/reordered blocks/chunks are then organized into initial batches at step 3606. These batches serve as the first set of inputs for the LLM processing stage. The batching strategy allows for efficient processing while maintaining a balance between context size and manageability. An iterative process 3608 begins at step 3610, where the batches are processed through an LLM. The processing step 3610 involves applying the capabilities of the LLM to comprehend and reason over the content of each batch. The outputs generated by the LLM are then subjected to a ranking process at step 3612. This step evaluates the quality of the LLM's outputs, typically based on factors such as coherence, relevance, and alignment with the original document's intent. At step 3614, the system determines whether the iteration process should continue or conclude. This decision is based on predefined criteria, which may include factors such as the number of iterations completed, the degree of content refinement achieved, or specific quality thresholds being met. If the decision is to continue the iteration, the process moves to step 3618, where the top K of the ranked blocks/chunks are selected, where K is a configurable parameter, typically between 10 to 50%. This selection process ensures that only the most relevant and coherent content is carried forward to the next iteration. The selected blocks/chunks then undergo a clustering operation at step 3618. This step groups related content together, further refining the organization of the information based on semantic similarities. At step 3622, new batches are formed from these clustered blocks, creating a more focused and refined set of inputs for the next iteration. These new batches are then fed back into the LLM processing stage 3610, beginning the next iteration cycle. The iterative process 3608 continues until the termination criteria are met, at which point the process concludes, outputting the final condensed version of the document 3616. This output represents a distilled version of the original long document, containing the most relevant and coherent information as determined by the iterative attention focusing process of the LASER system.

Through this iterative approach, the system progressively refines and focuses the content of long documents, enabling LLMs to more effectively process and reason over extended contexts. This method addresses attention span limitations of current LLMs and provides a novel solution for handling long-form content across various domains. The LASER system is operable to iteratively refine the context to focus on the most relevant information to help the LLM maintain coherence and attention.

Aspects of a LASER system according to an embodiment of the invention include splitting long inputs into multiple blocks/chunks (e.g. 10 k-50 k tokens each) and processing the blocks/chunks separately, ranking and/or scoring the outputs from each block/chunk to determine most relevant content, constructing new condensed blocks/chunks from the highest scoring outputs for next round and/or delete irrelevant information, iteratively processing the blocks/chunks through an LLM, selecting the best outputs, and condensing or summarizing the best outputs, and gradually concentrating the context into fewer but more focused subsets of documents or chunks or summaries.

The LASER system allows an LLM to digest manageable sized contexts, select useful results/signals, and carry those forward in a refined set of inputs. The LASER system works similar to a funnel by distilling the context. The ranking/selection steps of the LASER process improve the ability of an LLM to identify and focus on the pertinent content across rounds of processing. The LASER system guides the LLM's limited attention by incrementally removing irrelevant information and emphasizing the best results/signals from prior rounds. LASER system can have different variations, such as having multiple rounds of a large number of small blocks before condensing, however, the incremental refinement of context and attention through derived inputs remains the core idea.

Figure 39:
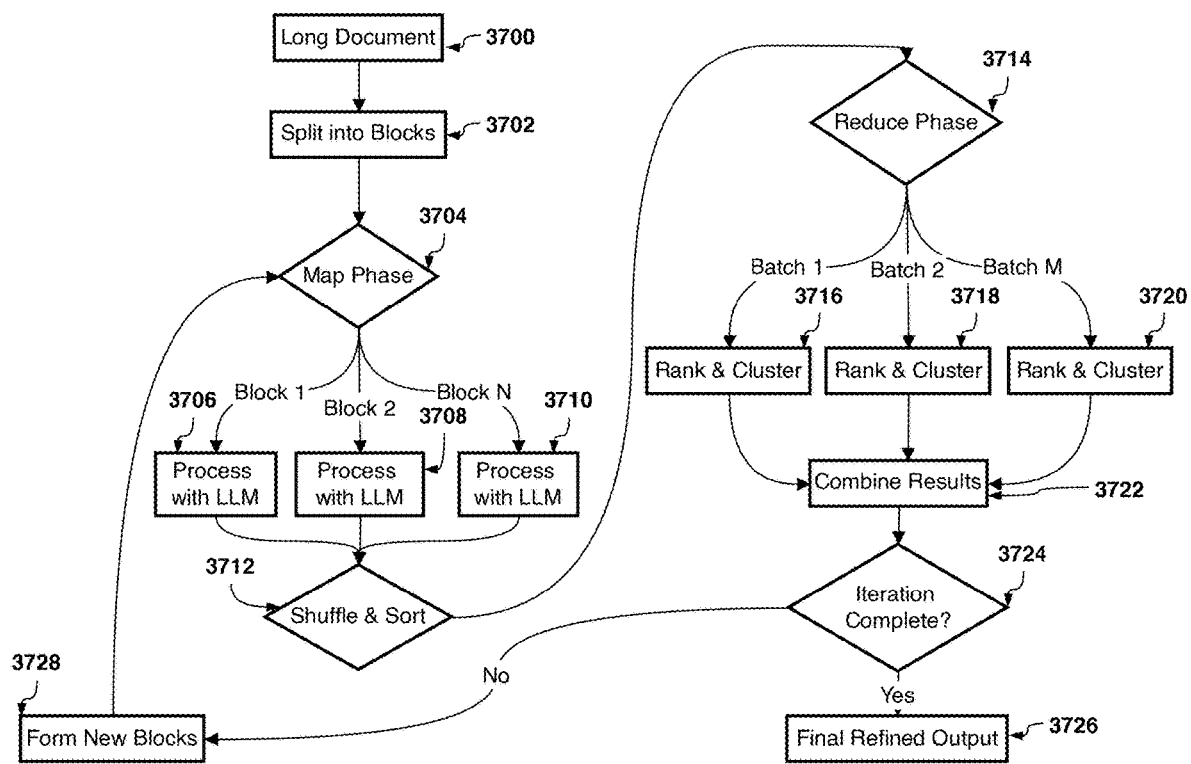
FIG. 39 is a flow chart illustrating a method of adapting a MapReduce model for the LASER system according to an embodiment of the invention.

Referring now to FIG. 39, an illustration of an adaptation of the MapReduce model for the LASER system, is described in more detail. The figure presents a flow chart depicting how the concepts of mapping, translating, shuffling, and reducing are applied to the iterative attention focusing approach of the LASER system, enabling efficient processing of long documents. The process begins with a long document 3700, which is the input to the system. The long document 3700 is split into blocks/chunks at step 3702. Step 3702 prepares the document for distributed processing. The system then enters the map phase at step 3704, which is a component of the MapReduce paradigm. In the map phase, each block/chunk is independently processed by the LLM. This is represented by the parallel processes 3706, 3708 and 3710, each handling a separate block/chunk. The number of these parallel processes can be scaled based on the available computational resources, allowing for efficient handling of long documents. Following the map phase, the system moves to the shuffle & sort stage at step 3712. This stage facilitates reorganizing the processed information from the individual blocks/chunks. It allows for the redistribution of related content across the processed blocks, preparing for the subsequent reduce phase. The reduce phase begins at step 3714, where the shuffled and sorted data is consolidated. The reduce phase is represented by processes 3716, 3718 and 3720, which perform ranking and clustering operations on batches of the processed and reorganized blocks/chunks. The number of reduce processes can be adjusted based on the desired granularity of the reduce operation. The results from the reduce phase are then combined at step 3722, creating a consolidated view of the processed document. At this point, the system evaluates whether the iteration is complete at step 3724 based on predefined criteria such as the number of iterations, the degree of refinement achieved, or specific quality thresholds. If the iteration is not complete, the system forms new blocks/chunks at step 3728 based on the reduced and refined content. These new blocks/chunks are then fed back into the map phase 3704, beginning another iteration cycle. This iterative loop allows for progressive refinement of the document's content, gradually focusing on the most relevant and coherent information. When the iteration criteria are met, the process concludes, outputting the final refined output at step 3726. This output represents a distilled version of the original long document, containing the most relevant and coherent information.

This adapted MapReduce model may be advantageous for the proposed attention span refinement system. The parallel nature of the map phase allows for efficient processing of extremely long documents by distributing the computational load. The number of map-and-reduce processes can be adjusted based on available resources and specific requirements of the task. The cyclical nature of the process, facilitated by the iteration check and feedback loop, allows for progressive improvement of the document's focus and coherence. This model enables the system to leverage distributed computing architectures, potentially improving processing speed for very large documents. Processing of documents can be done in a fault tolerant manner, allowing for robust processing of long documents even in the face of potential hardware or software failures. By adapting the MapReduce model to the attention span refinement process, the LASER system provides an efficient and scalable approach to handle long documents, and address the limitations of current LLMs.

Figure 40:
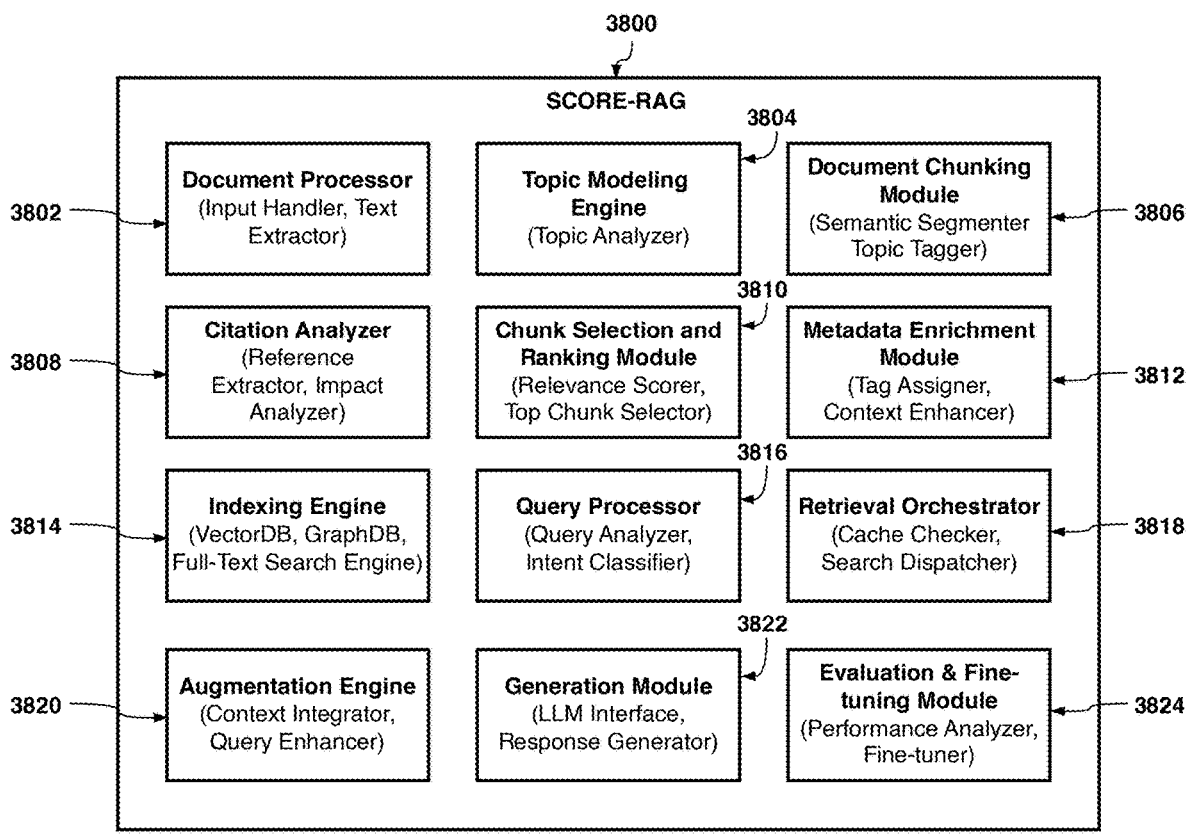
FIG. 40 is an illustration of the architecture of a SCORE-RAG system according to an embodiment of the invention.

Referring now to FIG. 40, an illustration of the architecture of a SCORE-RAG system according to an embodiment of the invention is described detail. The SCORE-RAG system 3800 comprises several modules, each designed to perform specific functions in the overall process. A document processor 3802 serves as the entry point for the system. It includes an input handler operable to receive documents in various formats, a text extractor operable to parse and prepare the text comprised by the received documents for further processing, for example, by creating chunks from the text, and a parent document tracker operable to maintain relationships between original documents and their chunks. A topic modeling engine 3804 is operable to analyze the received document to identify main topics and themes. It comprises, and in some embodiments consists of, a topic analyzer and a theme identifier, working in tandem to create a semantic map of the document. A document chunking module 3806 is operable to break down the received document into semantically meaningful segments. It includes a semantic segmenter for intelligent text division, a topic tagger operable to associate relevant topics with each chunk, and a multi-format generator operable to create multiple representations for each chunk (e.g., summaries, hypothetical questions related to the chunk). A citation analyzer 3808 comprises a reference extractor and an impact assessor. The citation analyzer is operable to identify and evaluate citations within the received document, contributing to the overall relevance scoring of different text segments. A chunk selection and ranking module 3810 employs a relevance scorer in being operable to assess the importance of each chunk, a top chunk selector in being operable to identify the most pertinent segments for indexing and retrieval, and a time-weighted scorer which is operable to incorporate the timestamps into chunk scoring (where more recent chunks may be ranked higher). A metadata enrichment module 3812 is operable to enhance the selected chunks with meta-data. This module uses a tag assigner to append relevant metadata, a context enhancer to add additional contextual information, and a timestamp tracker to record creation and access times for time-weighted retrieval. An indexing engine 3814 comprises a vector database, a graph database and a full-text search engine. This module is operable to prepare the processed chunks for efficient storage and retrieval. Multiple vector representations of the same document or chunk are stored (e.g. summarized versions, tagged versions, hypothetical questions for document/chunk, etc). A query processor 3816 is operable to handle user inputs. This module includes a query analyzer for understanding query structure, an intent classifier for determining the user's information needs, and a derived-query/prompt generator which is operable to create multiple perspective queries/prompts from a user input. A retrieval orchestrator 3818 is operable to coordinate the retrieval process. This module includes a cache checker for rapid information access and a search dispatcher for initiating more complex searches when needed. The search dispatcher implements different search and retrieval techniques such as vector similarity search, maximal marginal relevance (MMR) search, keyword-based search, cluster search (which groups similar documents/chunks into clusters based on their similarity and the query is match with the most relevant clusters) and ensemble search (which combines results from multiple search methods, for example, a combination of vector similarity and keyword based search). As disclosed in U.S. Provisional Patent Application Ser. No. 63/463,913, which is incorporated by reference herein above, a label or a search query results in a search to a set of documents to obtain the most relevant set.

An augmentation engine 3820 may be operable to employ a context integrator to combine retrieved information with the original query and a query enhancer to enhance the query based on this additional context. A generation module 3822 may be configured to interface with an LLM. This module includes an LLM interface for query processing and a response generator for producing coherent and relevant responses. An evaluation and fine-tuning module 3824 includes a performance analyzer which is operable to monitor system-wide metrics and evaluate the response quality, and a model fine-tuner which is operable to adjust the system parameters for optimization.

Figure 41:
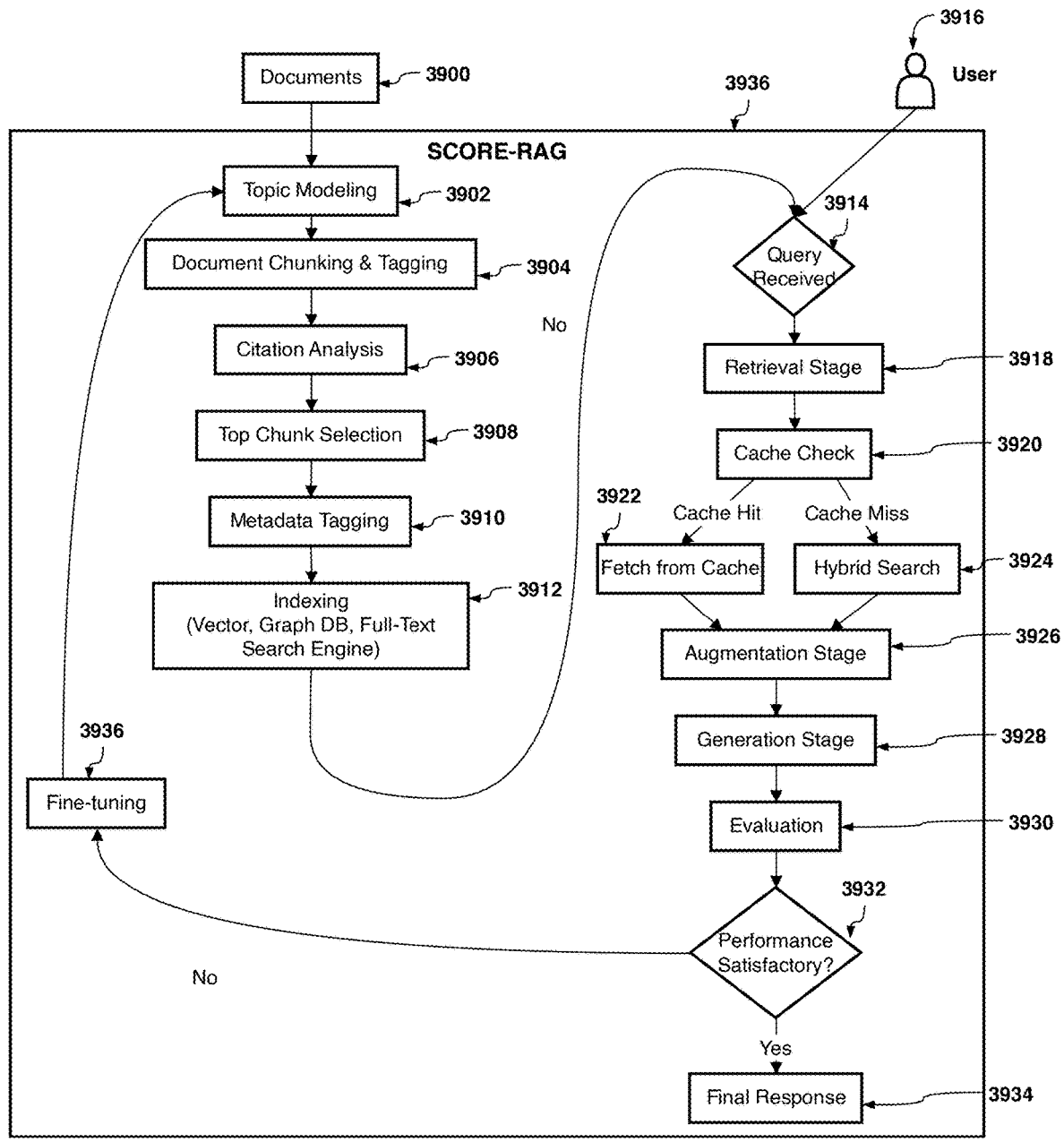
FIG. 41 is a flow chart illustrating a method of a SCORE-RAG system according to an embodiment of the invention.

Referring now to FIG. 41, a flow chart of a process performed by a SCORE-RAG system according to an embodiment of the invention is described in more detail. The process begins with a document 3900, which may be a refined output from the LASER system or any other textual input requiring processing. The document 3900 undergoes topic modeling at step 3902 to identify key topics and categories within the text. The document 3900 is segmented into semantically meaningful chunks at step 3904, with each chunk being associated with the identified topics/categories and having a tag assigned thereto, the tag being related to the identified topics/categories. Citation Analysis is then performed at step 3906, which involves analyzing citations and/or references within the document 3900 to identify the most influential or frequently cited sources. The chunks of the document having the greatest degree of topic relevance and/or citation analysis score are selected for further processing at step 3908. The selected chunks are enriched with metadata at step 3910, including topic tags, citation information, and other relevant attributes. At step 3912 the processed and tagged chunks are indexed in a vector/graph database and/or a full-text search engine (such as, for example, Elasticsearch or Solr), enabling efficient retrieval. Indexing can be done in a combination of databases (vector/graph) and full-text search engines to enable efficient hybrid search at a later stage. At step 3914, the system waits for a query/prompt input. When User 3916 provides the query it triggers the retrieval process. The retrieval stage begins at step 3918. Upon receiving a query, the system initiates the retrieval process to find relevant information. At step 3920, a cache check is performed. The system first checks if the required information is available in the cache/in-memory. If there's a cache hit, i.e. the required information is available in-memory, the information is fetched directly from the cache at step 3922. In case of a cache miss, i.e. the required information is not available in-memory, the system performs a hybrid search at step 3924 to retrieve relevant information. At the augmentation stage is performed at step 3926 where the retrieved information, whether from cache or search, is used to augment the original query. A generation stage is performed at step 3928 where the system generates a response using the augmented query. The generated response undergoes an evaluation process at step 3930 to assess its quality and relevance. The system determines if the generated response meets the required performance criteria at step 3932. If satisfactory and/or a count of successive passes criterion needed is met, a final response is produced at step 3934. If unsatisfactory, the system initiates a fine-tuning process at step 3936. In the fine-tuning process, the system can tweak the models and parameters used in the topic modeling, document chunking and tagging, citation analysis, chunk selection, meta-data tagging, indexing and hybrid search stages, to improve the overall performance and/or multiple successive passes number allowed metric or criterion is satisfied. The system may then iterate steps 3902 through 3912 and 3918 through 3932 until the generated response is determined to be satisfactory, and the aggregate response or its derivation may be presented as a result through an API or an UI. This continuous batching of search results (and chunking results) to create multiple contexts that are fed successively as part of Score RAG and then evaluated for accuracy, quality, or performance, and then multiple result sets are generated and combined or otherwise merged (with potential pruning of one or more sets or their derived modifications) along with additional derivations for semantic and syntactic considerations are then presented to the user or user applications through an API. The evaluation of quality, accuracy, or correctness, or other factors such as ethics, bias, or relevance, may be optionally evaluated by other LLMs that may be specialized for such tasks, and pools of LLMs may be suitably utilized locally or on the cloud (in Kubernetes containers accessed by APIs, for example) may be harnessed to evaluate, correct, collate, and combine the results and/or provide feedback to the base LLM that carries out the scoring or creation of the context.

The SCORE-RAG system of FIG. 41 may be advantageous over previous solutions. Through topic modeling and intelligent chunking, the system can better understand and retrieve relevant information. The use of caching and hybrid search techniques may enhance retrieval speed and accuracy. The fine-tuning process may allow the system to continuously improve its performance based on evaluation results.

In certain embodiments, the SCORE-RAG system of FIG. 41 implements multiple processing passes and parallel execution paths to enhance result quality and processing efficiency. During the citation analysis stage (3906), the system may create a priority queue of documents based on citation rankings and relevant party mentions, enabling efficient document pruning before detailed processing. The chunk selection stage (3908) may operate in multiple parallel paths, simultaneously processing keyword-based searches, chunk-based searches, and named entity recognition (for example, for identifying parties, judges, or courts). These parallel paths can operate independently or in combination, with their results being merged during the augmentation stage (3926).

The generation stage (3928) and evaluation stage (3930) may implement a multi-pass processing approach where results are generated and evaluated in successive batches. For example, the system may process the top twenty relevant chunks in each pass, store the intermediate results, and continue with subsequent batches until a comprehensive result set (the result sets may include aggregated multipass contexts and also outputs of the queries obtained from LLMs that are also aggregated by output brokers for presentation to the user after refinement and derivation) is obtained. The evaluation process at step (3930) may utilize multiple Language Learning Models (LLMs) operating either locally or in cloud environments, depending on privacy requirements. These LLMs may operate in parallel with varying contexts, enabling diverse perspective evaluation. The results from multiple passes and parallel query evaluations are then aggregated before the performance satisfaction check at step (3932). The cache check stage (3920) is enhanced to store not only final results but also intermediate processing results and parallel path outputs, thereby optimizing system performance for similar future queries. This multi-pass, parallel processing approach enables the system to handle complex queries while maintaining result quality and processing efficiency within the existing SCORE-RAG framework. The batched results may be aggregated for presentation to the users via UIs or APIs, and may be pruned or otherwise summarized for presentation or delivery to the user based on one or more metrics, such as relevance, accuracy, or speed.

In the context of the SCORE-RAG system, it should be noted that the RAG and/or context optimizations can occur before or after a document is stored/indexed in a Vector database.

In the context of the present invention, it should be noted that the term "Document" is used in a broad and inclusive manner. A person skilled in the art should understand that "Document" may refer to, but is not limited to: a traditional text-based document in its entirety; a portion or chunk of a larger document along with extracted metadata; a block of text, regardless of its source; a summary or abstract of a document; a combination of multiple distinct documents; a combination of summaries or chunks from multiple documents; a context or set of contextual information, including metadata; any digital content that can be processed as text, including web pages, emails, or social media posts; structured or semi-structured data that can be converted into a textual format; and/or a collection of related information, regardless of its original format or source.

Figure 42:
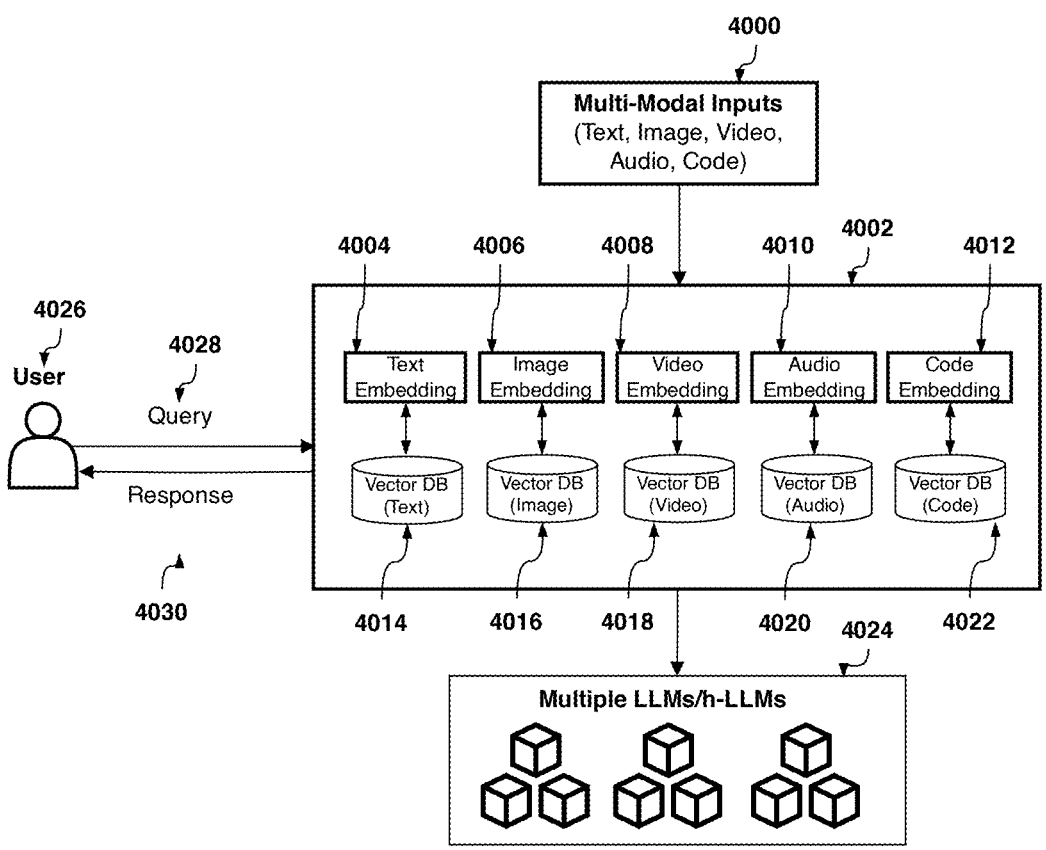
FIG. 42 is an illustration of an implementation of a SCORE-RAG system according to an embodiment of the invention for multi-modal RAG.

Referring now to FIG. 42, an illustration of using the SCORE-RAG system for multi-modal RAG is described in more detail. The SCORE-RAG system 4002 of the present embodiment is designed with advanced multimodal capabilities, enabling it to process and generate a wide array of content types, including text, audio, video, software code, and images. This system handles multi-modal inputs 4000, including but not limited to text, image, video, audio, and code, making it versatile for diverse applications. To achieve improved performance across these varied modalities, the SCORE-RAG system 4002 employs multiple embedding models 4004, 4006, 4008, 4010, 4012 and specialized vector databases 4014, 4016, 4018, 4020, 4022 each fine-tuned for a specific content type such as text, image, video, audio, or code. This specialized approach ensures that the unique characteristics and nuances of each modality are accurately captured and indexed. For the generation phase, the SCORE-RAG system 4002 utilizes an ensemble of LLMs or h-LLMs 4024, each specialized for different tasks. These may include models optimized for question-answering, code generation, image interpretation, audio transcription, and video analysis, among others. This multi-faceted approach allows CORE-RAG to process a wide range of input types and also generate appropriate and context-aware multi-modal outputs. A User 4026 sends a query 4028 (comprising multi-modal inputs) to the SCORE-RAG system 4002 and received a multi-modal response 4030. The multimodal capability of the SCORE-RAG system 4002 enhances the system's utility across diverse fields such as education, research, software development, multimedia content creation, and data analysis, for instance.

Figure 43:
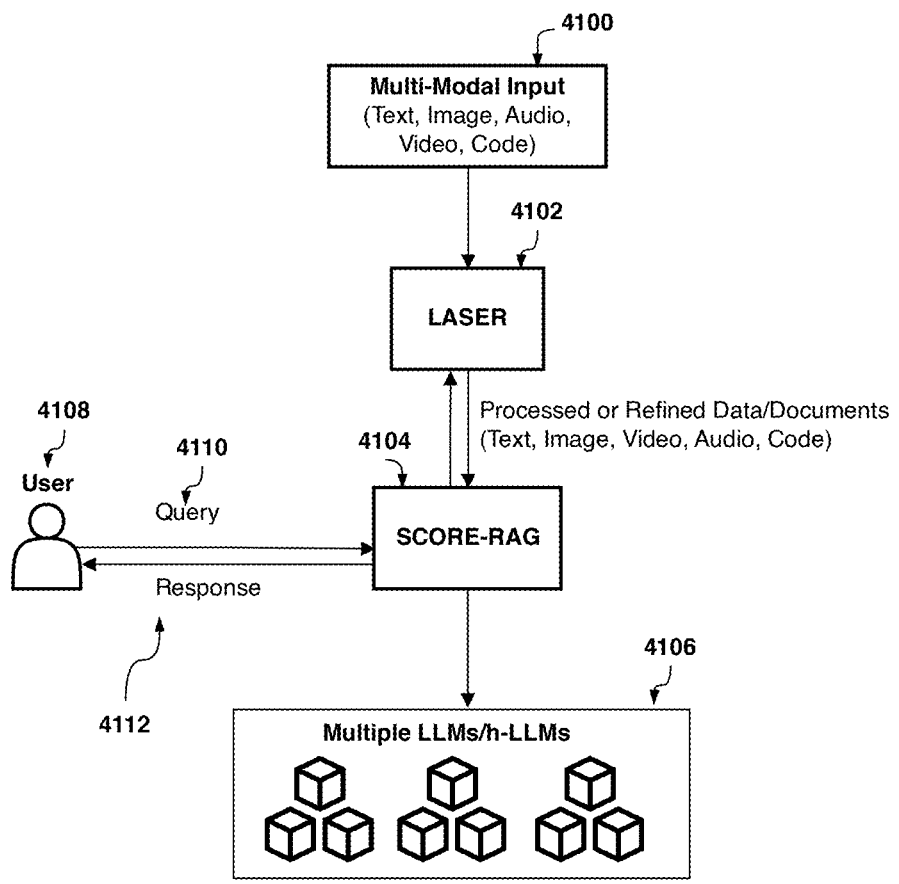
FIG. 43 is an illustration of an implementation of a LASER system and a SCORE-RAG system according to an embodiment of the invention for multi-modal RAG.

Referring now to FIG. 43, an illustration of a process of using a LASER system and a SCORE-RAG system for multi-modal RAG according to an embodiment of the invention is described in more detail. The process starts with a multi-modal input (for example, text, image, audio, video, or code) being ingested by the LASER system 4102 which is then refined/processed/distilled/filtered. The processed or refined data/documents (text, image, video, audio, code) are then fed to the SCORE-RAG system 4104. The SCORE-RAG system 4104 can integrate information from various sources and modalities, providing comprehensive and accurate responses that can combine textual explanations, code snippets, audio interpretations, and visual analyses as needed. For generation tasks, the SCORE-RAG system 4104 utilizes an ensemble of LLMs or h-LLMs 4106, each specialized for different tasks. A User 4108 sends a query 4110 (comprising multi-modal inputs) to the SCORE-RAG system 4104 and receives a multi-modal response 4112. The output from the SCORE-RAG system 4104 can also be fed back to the LASER system 4102 for iterative processing/refinement.

Figure 44:
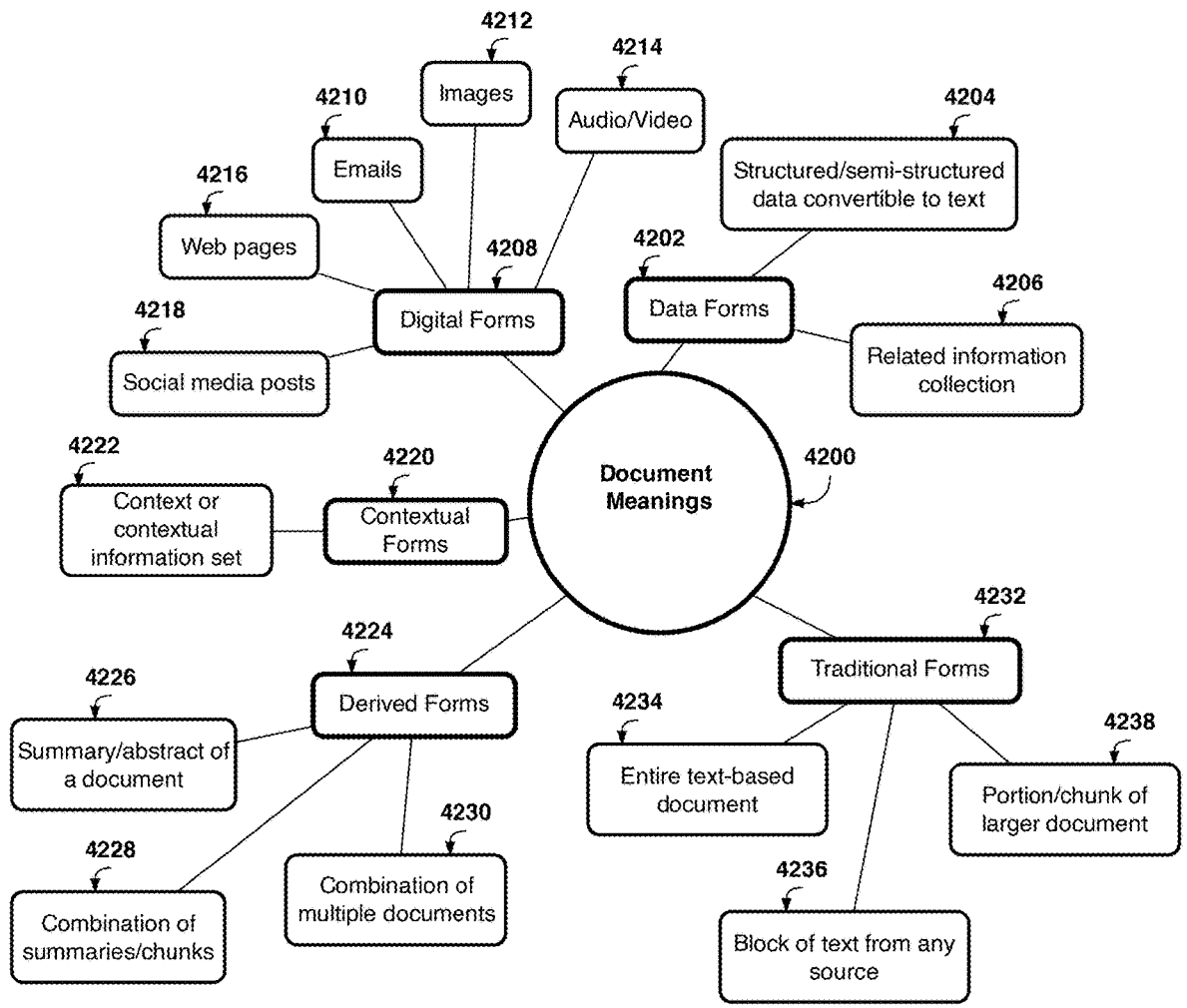
FIG. 44 is an illustration of different meanings of "document" in the context of the present invention.

Referring now to FIG. 44, an illustration of the different meanings of "Document" in the context of the present invention, is described in more detail. A person skilled in the art should understand that "Chunk" or "Block" may refer to, but is not limited to: traditional forms 4232, such as entire text-based document 4234, a portion/chunk of larger document 4238, or a block of text from any source 4236; data forms 4202, such as structured/semi-structured data convertible to text 4204, or related information collection 4206; digital forms 4208, such as social media posts 4218, web pages 4216, emails 4210, images 4212, and audio/video 4214; contextual forms 4220, such as context or contextual information set 4222; and derived forms 4224, such as a summary/abstract of a document 4226, a combination of summaries/chunks 4228, or a combination of multiple documents 4230.

The meaning of "document" in any specific instance is dependent upon the context within which it is used, and the meaning may be expressly modified within the description of particular embodiments. This broad definition is intended to encompass the various ways in which textual or informational content may be presented, processed, or manipulated within the scope of the present invention.

Figure 45:
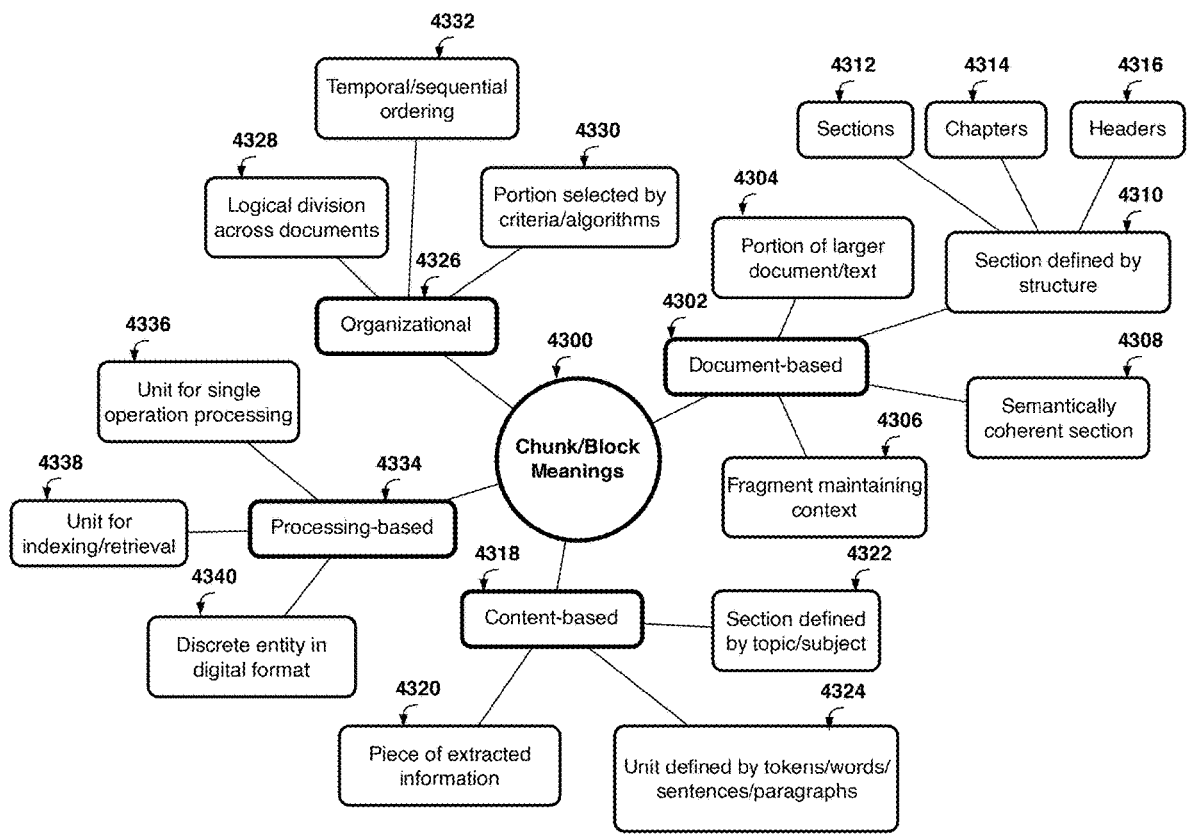
FIG. 45 is an illustration of different meanings of "chunk" and "block" in the context of the present invention.

Referring now to FIG. 45, an illustration of the different meanings of "Chunk/Block" in the context of the present invention, is described in more detail. In the context of the present invention, it should be noted that the terms "chunk" and "clock" are used in a broad and inclusive manner. A person skilled in the art should understand that "chunk" or "block" may refer to, but is not limited to: document-based 4302, such as a portion or segment of a larger document or text 4304, a fragment of a document that maintains some level of context or meaning 4306, a semantically coherent section of text 4308, regardless of its size, a section of a document defined by structural elements 4310 (e.g., headers, chapters, sections); content-based 4318, such as a unit of text 4324 defined by a specific number of tokens, words, sentences, or paragraphs, a piece of information extracted from a larger context 4320; processing-based 4334, such as a unit of data processed or analyzed in a single operation, a unit of information in any digital format that can be processed as a discrete entity 4340, a unit of text used for processing, indexing, or retrieval purposes 4338; or organizational 4326, such as a logical division of content that may span across multiple physical documents 4328, a section of text or data defined by temporal or sequential ordering 4332, a portion of a document or dataset selected based on specific criteria or algorithms 4330.

The terms "chunk" and "block" may be used interchangeably or with distinct meanings depending on the specific context within the description of the invention. The precise definition, size, or characteristics of a "chunk" or "block"

may vary based on the particular embodiment, implementation, or application of the invention being described.

Figure 46:
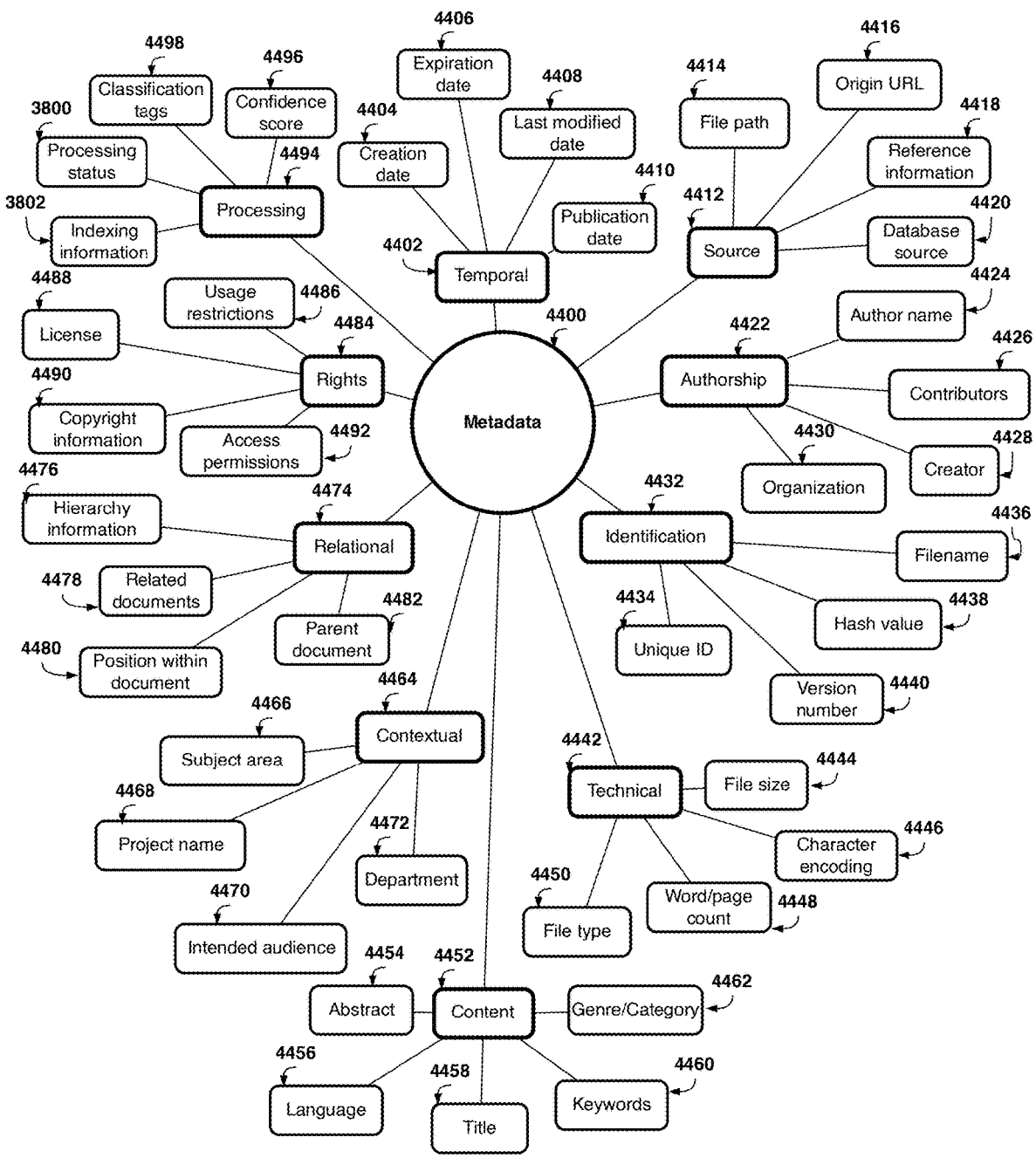
FIG. 46 is an illustration of different meanings of "metadata" in the context of the present invention.

Referring now to FIG. 46, an illustration of the different meanings of "meta-data" in the context of the present invention, is described in more detail. A person skilled in the art should understand that "meta-data" may refer to, but is not limited to: identification 4432, such as filename 4436, unique ID 4434, version number 4440, and hash value 4438; authorship 4422, such as author name 4424, creator 4428, contributors 4426, and organization 4430; temporal 4402, such as creation date 4404, last modified date 4408, publication date 4410, and expiration date 4404; source 4412, such as origin URL 4416, database source 4420, file path 4414, and reference information 4418; content 4452, such as title 4458, abstract 4454, keywords 4460, language 4456, and genre/category 4462; technical 4442, such as file type 4450, file size 4444, character encoding 4446, and word/page count 4448; rights 4484, such as copyright information 4490, license 4488, access permissions 4492, and usage restrictions 4486; relational 4474, such as parent document 4482, related documents 4478, position within document 4480, and hierarchy information 4476; contextual 4464, such as project name 4468, department 4472, subject area 4466, and intended audience 4470; and processing 4494, such as processing status 3800, indexing information 3802, classification tags 4498, and confidence score 4496.

Figure 47:
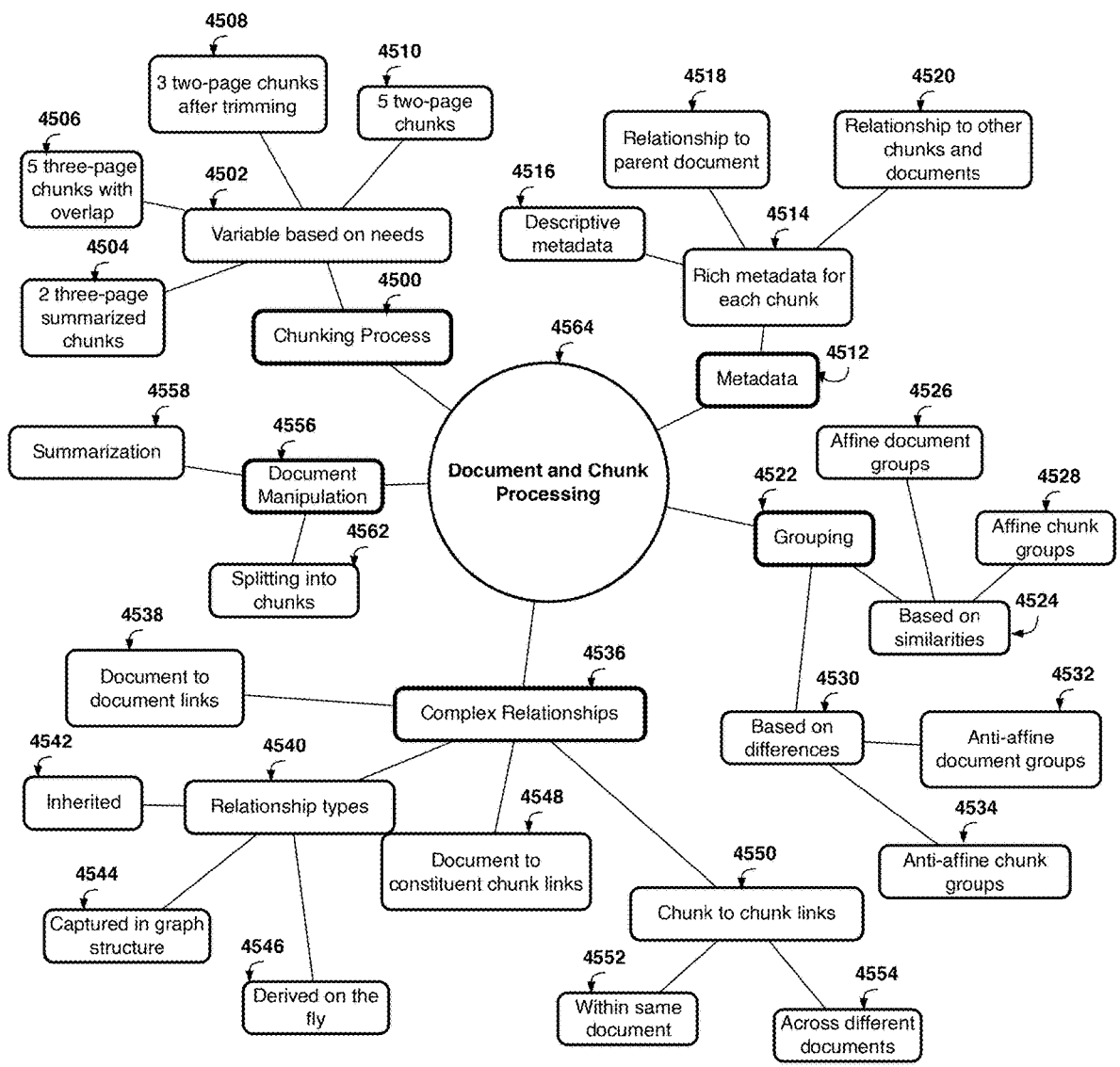
FIG. 47 is an illustration of different meanings of "document processing" or "chunk/block processing" in the context of the present invention.

Referring now to FIG. 47, an illustration of the different meanings of "document processing" or "chunk/block processing" in the context of the present invention, is described in more detail. In the context of the present invention, it should be noted that "document processing" and "chunk processing" are used in a broad and inclusive manner. A person skilled in the art should understand that "document processing" or "chunk/block processing" may refer to, but is not limited to: document manipulation 4556, such as documents being split into chunks 4563, and documents can being summarized into one or more chunks 4558; chunking process 4500, which can vary based on specific needs 4502, for example a ten-page PDF can be broken into 5 three-page chunks (with overlapping text) 4506, the same PDF could be divided into 5 two-page chunks 4510, the same PDF could be trimmed and split into just three 2-page chunks 4508, and/or, alternatively, the same PDF could be condensed by summarization into two 3-page chunks 4504; adding meta-data 4512, where rich metadata is associated with each chunk, such as descriptive metadata about the chunk itself 4516, relationship metadata linking the chunk to its parent document 4518, and relationship metadata connecting the chunk to other chunks and their parent documents 4520; grouping 4522, where chunks and documents can be grouped based on similarities 4524 (affine chunk groups 4528 and affine document groups 4526 representing similar content) or based on differences 4530 (anti-affine chunk groups 4534 and anti-affine document groups 4532 representing different viewpoints or contrasting content; complex relationships exist within the system 4536, such as documents linking to other documents 4538, documents linking to their constituent chunks 4548, chunks linking to other chunks 4550 within the same document 4552 and across different documents 4554, and relationship types 4540 which can be inherited 4542, derived on the fly 4546, or captured in a graph structure 4544.

The precise definitions, sizes, characteristics, and relationships of "documents", "chunks", "blocks", "meta-data" and "document processing" may vary based on the particular embodiment, implementation, or application of the invention being described.

Figure 48:
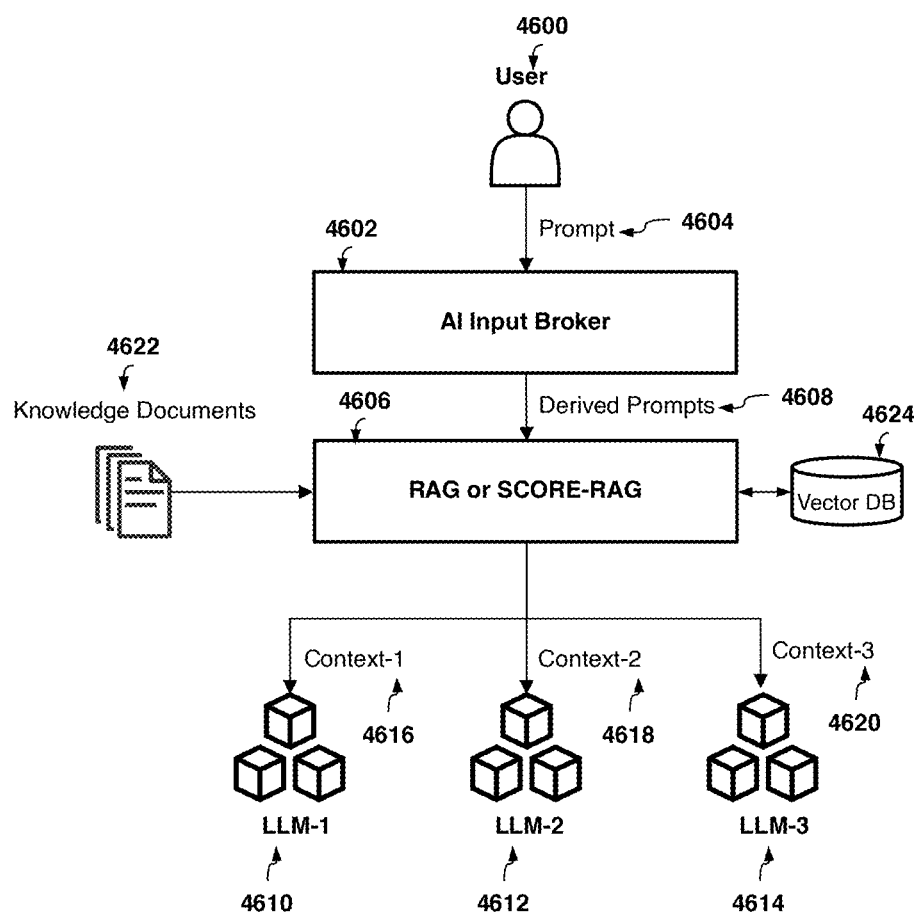
FIG. 48 is an illustration of an approach of generating derived prompts and using them with RAG or SCORE-RAG systems to generate improved results according to an embodiment of the invention.

Referring now to FIG. 48, an illustration of an approach of generating derived prompts and using them with a RAG system or a SCORE-RAG system 4606 to generate the best results, is described in more detail. User 4600 provides a prompt 4604. The prompt is sent to the AI Input Broker 4602 which generates multiple derived prompts. Existing RAG systems often rely on single, user-provided prompts for information retrieval. This approach can be limited by the specificity of the prompt and may not capture the full spectrum of relevant information. The present invention addresses this limitation by automatically generating a set of derived prompts that explore various aspects, phrasings, and contextual interpretations of the original query. The prompt derivation engine employs several techniques to generate derived prompts:

1. Paraphrasing: The original prompt is rephrased while maintaining its core meaning. This captures different ways of expressing the same query.
2. Query Expansion: Relevant terms or synonyms are added to the original query to broaden its scope and capture related concepts.
3. Aspect-based Prompts: The original query is broken down into different aspects or sub-topics, with separate prompts created for each.
4. Question Transformation: Statements are converted into questions and vice versa. The query is also transformed into different question types (e.g., who, what, when, where, why, how).
5. Persona-based Prompts: The query is rephrased from different persona perspectives (e.g., expert, novice, skeptic).
6. Contextual Variations: Context is added or modified to the original prompt to explore different angles.
7. Abstraction and Specification: More general and more specific versions of the original query are created.

The knowledge documents 4622 are fed to a RAG or SCORE-RAG system 4606 which creates embeddings of the documents and indexes in the vector database 4624. If a SCORE-RAG system is used, it leverages context-optimized retrieval techniques to enhance the traditional RAG approach. This system enhances the traditional RAG approach by incorporating advanced techniques such as topic modeling, intelligent document chunking, citation analysis, and hybrid search methods. Upon receiving the derived prompts 4608, the RAG or SCORE-RAG system 4606, proceeds with the retrieval and augmentation tasks creating refined contexts 4616, 4618, 4620. These refined contexts are then transmitted to one or more LLMs 4610, 4612, 4614 for the generation task.

Figure 49:
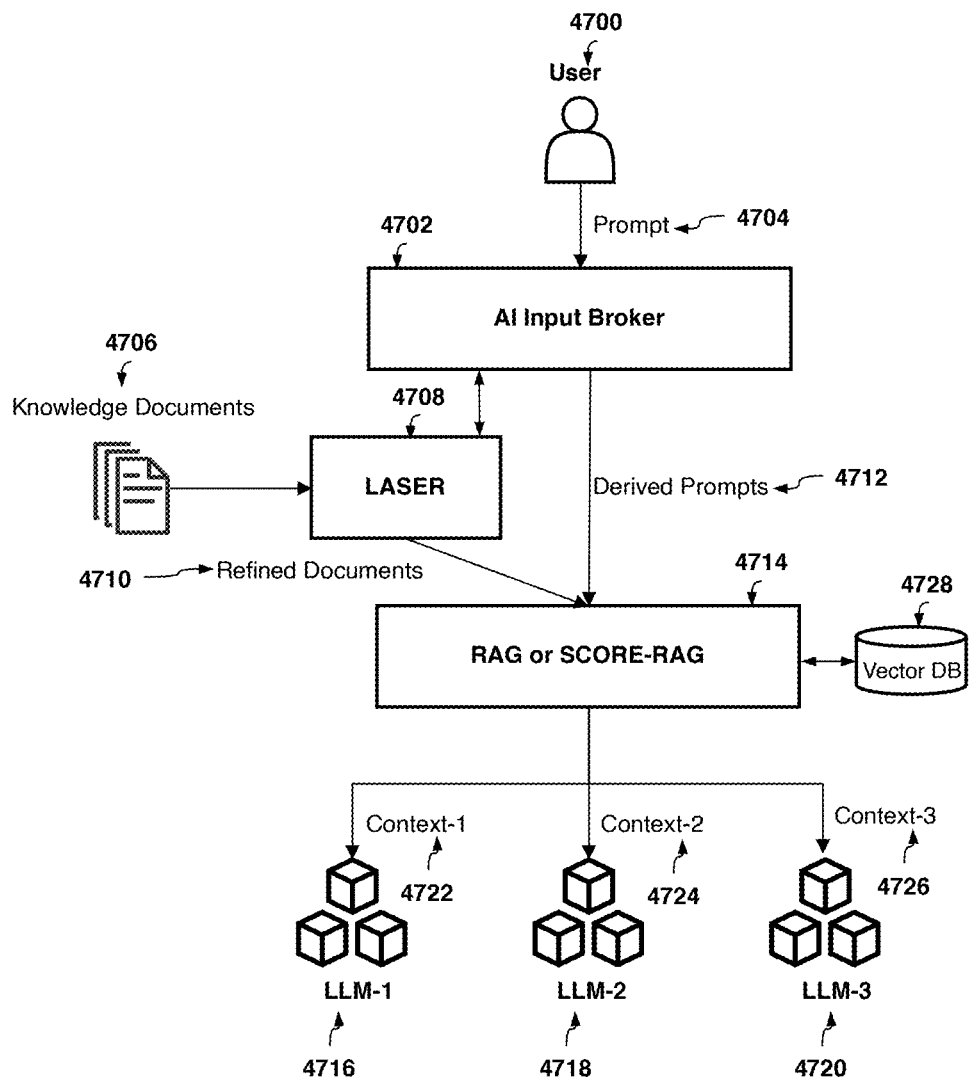
FIG. 49 is an illustration of an approach of generating derived prompts and using LASER and RAG or SCORE-RAG systems to generate improved results according to an embodiment of the invention.

Referring now to FIG. 49, an illustration of an approach of generating derived prompts and using a LASER system 7408 and a RAG or SCORE-RAG system 4714 to generate the improved results, is described in more detail. User 4700 provides a prompt 4704. The prompt is sent to an AI Input Broker 4702 which generates multiple derived prompts. The knowledge documents 4706 are passed through the LASER system 4708. The LASER system 4708 employs the iterative attention focusing technique to refine and distill the context of the long document. After refinement, the refined documents 4710 fed to the RAG or SCORE-RAG system 4714 which creates embeddings of the documents and indexes in a vector database 4728. Upon receiving the derived prompts 4712, the RAG or SCORE-RAG system 4714, proceeds with the retrieval and augmentation tasks creating refined contexts 4722, 4724, 4726. These refined contexts are then transmitting to one or more LLMs 4716, 4718, 4720 for the generation task. Distinctions between the approaches in FIGS. 48 and 49 lie in the introduction of the LASER system 4710 for attention span refinement. The LASER system 4710 acts as an intermediary processor that prepares the long documents (knowledge documents 4706) for more effective handling by the LLM. The LASER system 4710 addresses the limitations of the prior art by introducing an intelligent preprocessing step which enables LLMs to effectively handle long documents that would otherwise exceed their attention capacity.

Figure 50:
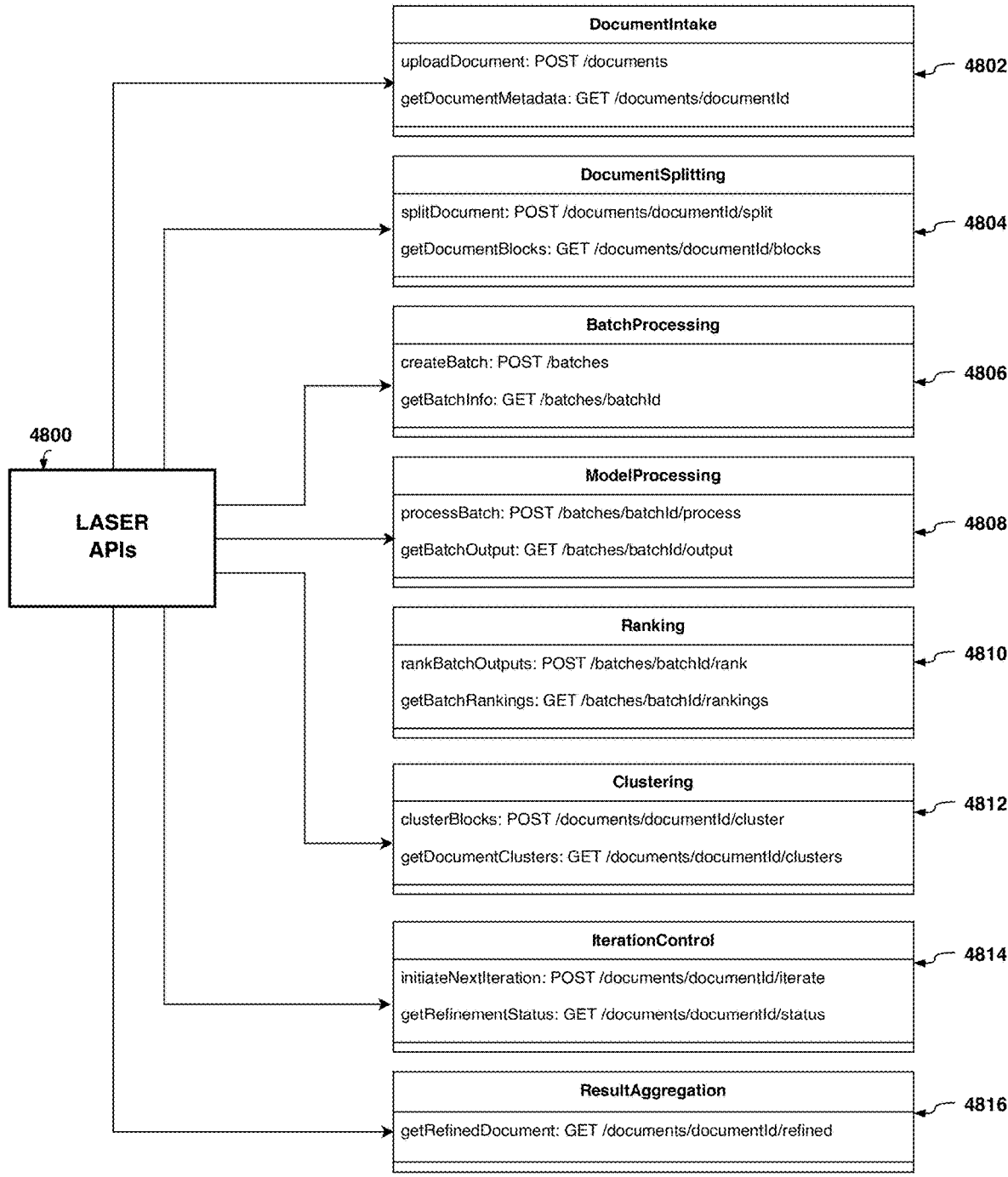
FIG. 50 is an illustration of an exemplary set of APIs of a LASER system according to an embodiment of the invention.

Referring now to FIG. 50, an illustration of an exemplary set of APIs of a LASER system according to an embodiment of the invention are described in more detail. The illustration depicts APIs categorized based on modules: Document Intake 4802; Document Splitting 4804; Batch Processing 4806; Model Processing 4808; Ranking 4810; Clustering 4812; Iteration Control 4814; and Result Aggregation 4816. The Document Intake module 4802 includes APIs for document submission and document retrieval. These endpoints facilitate the ingestion and initial metadata retrieval of documents within the system. The Document Splitting module 4804 includes APIs for splitting a document and getting document blocks/chunks. The Batch Processing module 4806 includes APIs for creating a batch for processing and getting batch information. The Model Processing module 4808 includes APIs for processing a batch using the model and getting the batch output. The Ranking module 4810 includes APIs for ranking batch outputs and getting batch rankings. The Clustering module 4812 includes APIs for clustering blocks/chunks and getting document clusters. The Iteration Control module 4814 includes APIs for initiating subsequent iterations and status retrieval. These endpoints enable the system to manage and monitor the iterative refinement process. The Result Aggregation module 4816 has APIs for retrieving the refined documents, representing the final output of the long document attention span refinement process.

Figure 51:
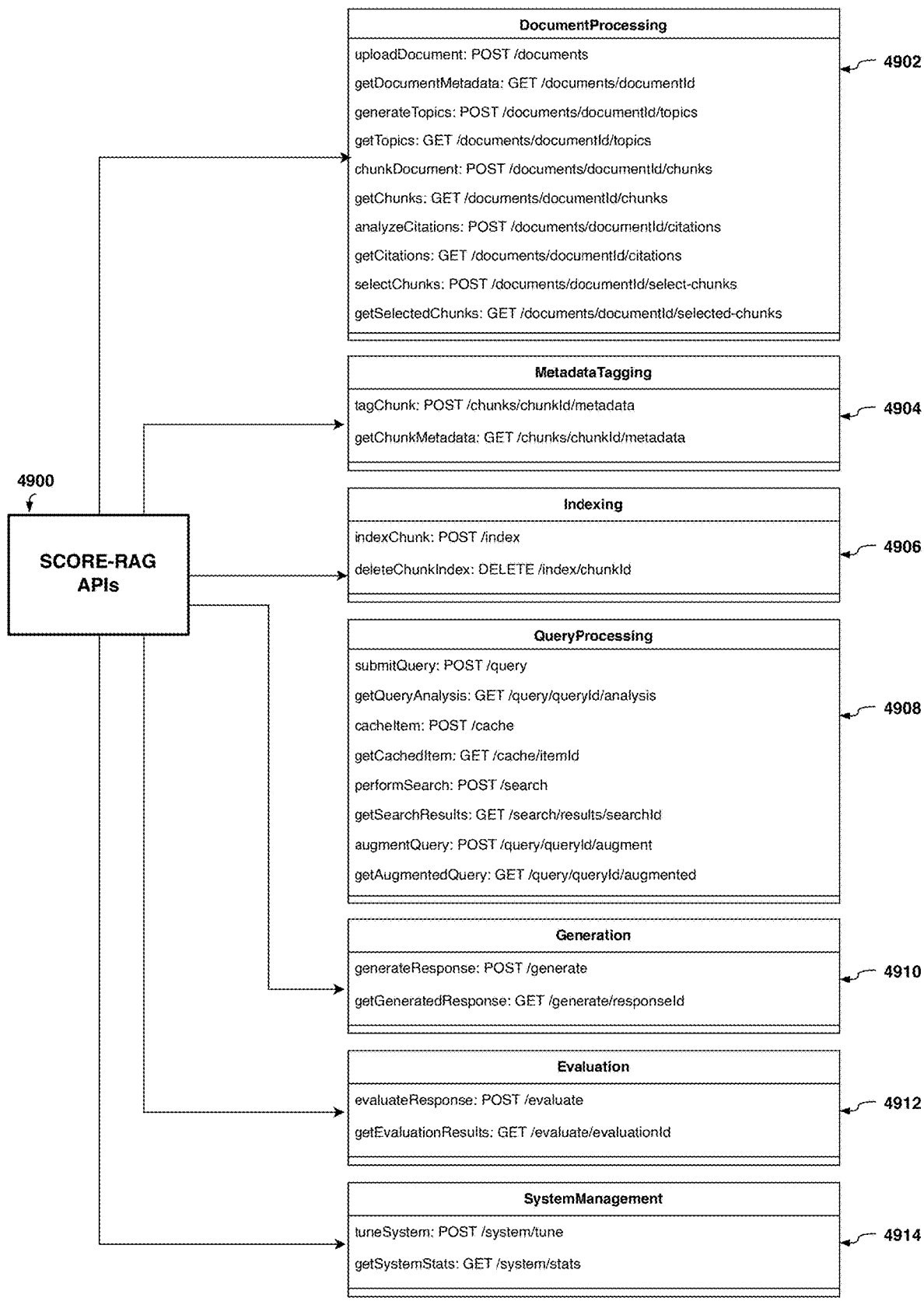
FIG. 51 is an illustration of an exemplary set of APIs of the SCORE-RAG system, according to an embodiment of the invention.

Referring now to FIG. 51, an illustration of an exemplary set of APIs of the SCORE-RAG system are described in more detail. The illustration depicts the APIs categorized based on modules: Document Processing 4902; Metadata Tagging 4904; Indexing 4906; Query Processing 4908; Generation 4910; Evaluation 4912; and System Management 4914. The Document Processing module 4902 includes APIs for document ingestion, analysis, and pre-processing. The Metadata Tagging module 4904 includes APIs for enriching document chunks with metadata. The Indexing module 4906 includes APIs for managing the indexing of processed document chunks. The Query Processing module 4908 includes APIs for handling user queries and search functionalities. The Generation 4910 module includes APIs for response generation. The Evaluation 4912 module includes APIs for assessing the quality of generated responses. The System Management module 4914 includes APIs for system-level operations and monitoring.

The Application Programming Interfaces (APIs) described in FIG. 50 and FIG. 51 herein are not limited to any particular implementation technology or architecture. It should be understood that these APIs can be implemented using various technological approaches, including but not limited to microservices architectures, serverless computing platforms (e.g., AWS Lambda, Azure Functions, Google Cloud Functions), Function-as-a-Service (FaaS) models, containerization technologies (e.g., Docker, Kubernetes), remote procedure call frameworks such as gRPC (gRPC Remote Procedure Call), RESTful web services, GraphQL endpoints, or any combination thereof. The choice of implementation technology may depend on factors such as scalability requirements, performance needs, deployment environment constraints, and integration with existing systems. Furthermore, the APIs may be implemented using different programming languages, frameworks, and runtime environments, as appropriate for the specific use case and technological ecosystem. The flexibility in implementation allows for optimal adaptation of the system to various operational contexts while maintaining the core functionality and architectural principles described in this specification. The textbook *A First Course in Cloud-Based Microservices* (Arshdeep Bahga and Vijay Madisetti, VPT Press, 2024) is incorporated herein by reference in its entirety.

Throughout the application, reference may be made to various computer hardware, including servers, GPUs, storage, cloud storage, and the like. It is contemplated and included within the scope of the invention that the LASER and SCORE-RAG systems and their various components may be software executed on computer devices, including servers, personal computers, smartphone devices, and the like, each comprising a processor configured to execute commands received from software (such as microprocessors, field-programmable gate arrays, integrated circuits, and the like), a non-transitory computer-readable storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described LASER and SCORE-RAG systems includes hardware necessary for such performance as is known in the art.

Figure 52:
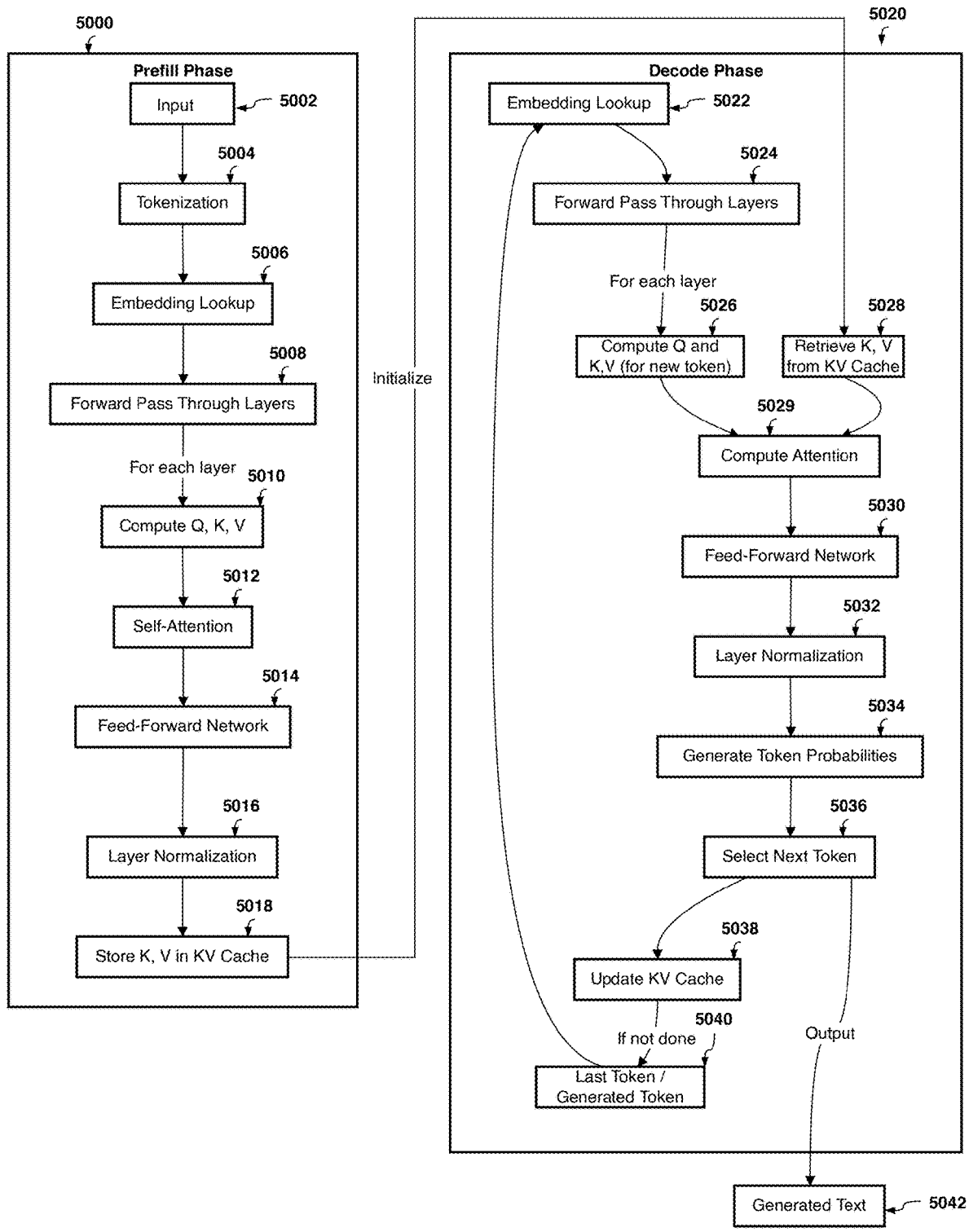
FIG. 52 is a flowchart illustrating methods of performing prefill and decode phases of an LLM inference process according to an embodiment of the invention.

Referring now to FIG. 52 is an illustration of prefill and decode phases in an LLM inference process is described in more detail. LLM inference is the process of using a trained LLM to generate text or perform other language-related tasks. It involves two main phases; prefill 5000 and decode 5020. The prefill phase 5000 occurs at the beginning of the inference process when the model is presented with an initial prompt 5002 or context. The prefill phase 5000 processes all input tokens 5002 in parallel, making it computationally intensive but requiring only one execution per inference session. The input 5002 undergoes tokenization 5004 to convert it into a format suitable for processing. These tokens are transformed into embeddings through an embedding lookup step 5006. The embedded tokens pass through a series of neural network layers at step 5008, where each layer computes query (Q), key (K), and value (V) vectors 5010, resulting in pluralities of Q vectors, K vectors, and V vectors. These pluralities of vectors are used in a self-attention mechanism at step 5012, followed by processing through a feed-forward network at step 5014. After layer normalization at step 5016, where normalized K and V vectors are produced, the normalized key and value vectors are stored in a KV cache at step 5018 for later use.

The decode phase 5020 follows the prefill phase 5000 and is responsible for generating new tokens one at a time. The decode phase 5020 is characterized by autoregressive generation, where each new token depends on all previously generated tokens. The decode phase begins by generating a new token at step 5040 based on the context provided by the prefill phase 5000. This new token undergoes embedding lookup at step 5022 and is processed through the neural network layers at step 5024, similar to the prefill phase 5000. The neural network computes query (Q), key (K), and value (V) vectors 5026 for the new token at each layer, resulting in pluralities of Q, K, and V vectors. An attention computation at step 5029 is performed using the newly computed Q vector and the K and V vectors from both the KV cache 5028 (populated during the prefill phase 5000 and previous decode steps) and the newly computed K and V for the current token. The resulting output passes through a feed-forward network 5030 and layer normalization 5032, producing normalized K and V vectors. The model then generates token probabilities 5034 and selects the next token 5036 based on these probabilities. The newly generated token's normalized K and V vectors are added to the KV cache 5038, which grows with each new token. The decode phase 5020 iterates, using the newly generated token 5040 as input for the next cycle, until the desired output length is reached or a stop condition is met. The final output of this process is the generated text 5042, which represents the model's response.

Referring now to FIG. 52 and also referring back to FIG. 15, the lambda architecture for h-LLMs can be further improved by incorporating prefill and decode strategies. In the batch layer 1402, the base h-LLM can be improved to handle prefill operations more efficiently. By implementing chunked-prefills, where a prefill request is split into near-equal sized chunks, the batch layer can process large prompts more effectively. This approach allows for improved utilization of GPU resources and can improve throughput for batch processing of historical data. The real-time layer 1404 is improved by using dynamic or hybrid scheduling techniques. By allowing new requests to join a running batch without pausing ongoing decodes, the real-time layer can maintain lower latency while achieving higher throughput. This is beneficial for handling streaming data and providing quick responses to user queries. These improvements to the batch and real-time layers help in balancing the throughput-latency tradeoff by interleaving prefill and decode operations.

Referring now to FIG. 52 and also referring back to FIG. 17, the in-memory processing architecture can be further improved by leveraging High Bandwidth Memory (HBM) technologies. HBM offers higher bandwidth and lower power consumption compared to traditional DRAM, making it ideal for LLM inference workloads. In the processing layer 1606, multiple h-LLMs can be loaded into HBM, allowing for faster access to model parameters. This is particularly beneficial for the decode phase, which requires frequent, small memory accesses. By storing frequently accessed data, such as attention keys and values (KV Cache), in HBM, the system can reduce memory access latency and improve overall inference speed. Furthermore, the batches of input data 1604 can be more efficiently managed in HBM, allowing for rapid prefill operations. The high bandwidth of HBM enables the system to quickly load and process large input prompts.

Referring now to FIG. 52 and also referring back to FIG. 15 and FIG. 17, additional memory-related optimizations can be implemented to further enhance the efficiency of LLM inference within the lambda architecture and in-memory processing framework. These enhancements focus on three areas: KV Cache Optimizations, Tiered Memory Systems, and Progressive Loading.

KV Cache Optimizations are crucial for improving memory efficiency during the decode phase of LLM inference. One approach involves implementing KV Cache Pruning, where less important entries are removed from the cache based on factors such as attention scores or token positions. This pruning can be adaptive, with thresholds that adjust based on available memory and sequence length. Additionally, periodic cache cleanup can be performed to remove entries that haven't been accessed recently. Another strategy is Adaptive KV Cache Sizing, where the size of the KV cache is dynamically adjusted based on the current sequence length, available system memory, and model complexity. This can be implemented using a sliding window approach, keeping only a fixed number of recent tokens in the cache.

Tiered Memory Systems leverage different types of memory to balance performance, capacity, and cost, which is particularly relevant for large-scale LLM inference. One approach involves the integration of HBM, DRAM and Non-Volatile Memory (NVM). DRAM for frequently accessed data like the active parts of the model and the KV cache, while leveraging NVM for storing less frequently accessed model parameters. Intelligent data movement algorithms can be implemented to predict which parts of the model will be needed next and preemptively move them to DRAM. A more complex tiered caching system can be developed where different levels of cache use different memory technologies. For example, L1 Cache could use on-chip SRAM for immediate access, L2 Cache could employ High Bandwidth Memory (HBM) for high-speed, larger capacity, L3 Cache could utilize DRAM for a balance of speed and capacity, and L4 Cache could leverage NVM for large capacity. Predictive prefetching algorithms can be implemented to move data between tiers based on usage patterns and model architecture. For multi-GPU or distributed systems, heterogeneous memory management strategies can be developed to efficiently use different memory types across devices, using faster memory (e.g., HBM) on primary computation devices while offloading less critical data to devices with larger but slower memory.

Progressive Loading techniques aim to optimize memory usage by loading only the necessary parts of the model as needed, rather than loading the entire model upfront. Layer-wise Progressive Loading can be implemented, where model layers are loaded into memory sequentially as they are needed for computation. For transformer models, this could mean loading encoder layers progressively for the input processing, then loading decoder layers as needed for generation. Efficient layer swapping mechanisms can be developed to manage memory when the model size exceeds available memory. Adaptive Model Pruning techniques can also be implemented, where the model size is adapted based on input complexity. For simpler inputs, a smaller, pruned version of the model can be loaded, progressively loading more complex model components as needed for challenging inputs.

These memory optimization techniques, when integrated with the lambda architecture described in FIG. 15 and the in-memory processing architecture outlined in FIG. 17, can enhance the efficiency and performance of LLM inference. By implementing these strategies, the system can better manage memory resources, reduce latency, and improve overall throughput, particularly for large-scale language models and high-volume inference tasks.

Figure 53:
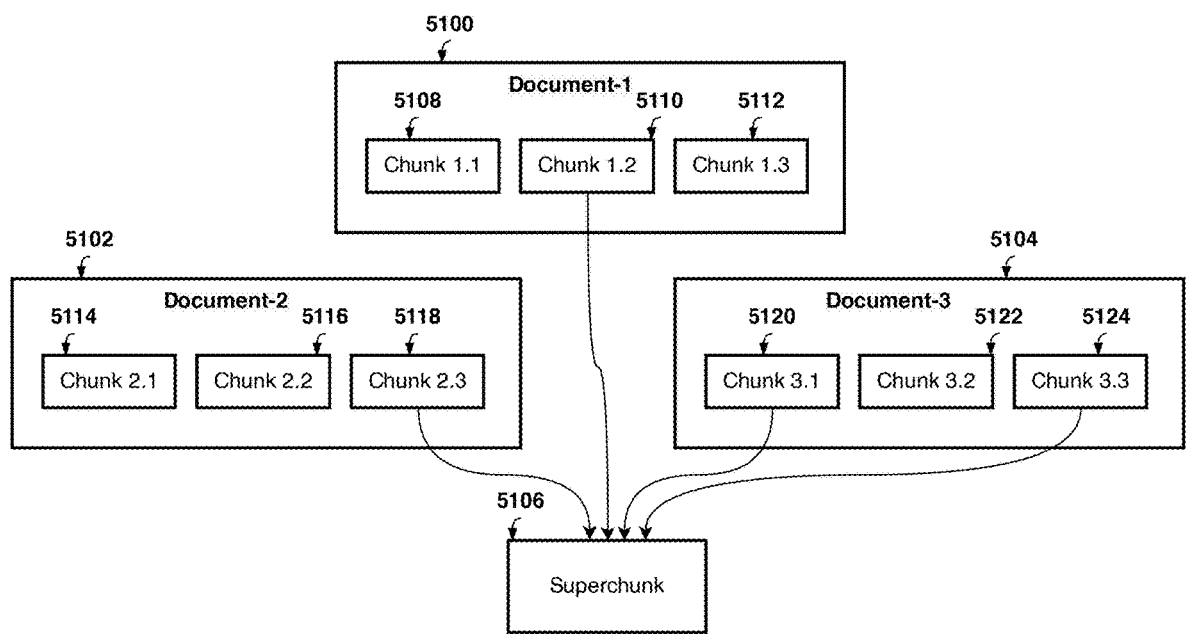
FIG. 53 is an illustration depicting the formation of a superchunk from several chunks from discrete documents according to an embodiment of the invention.

Referring now to FIG. 53, an illustration of an approach for creating, managing, and refining superchunks and using them a SCORE-RAG system according to an embodiment of the invention is described in more detail. While describing the superchunk approach, reference back to the SCORE-RAG architecture illustrated in FIG. 40 will also be made. The superchunk approach, according to an embodiment of the invention, represents an improved method for enhancing the indexing and retrieval of documents and their chunks and utilization of information in the context of RAG systems. The process begins with multiple source documents 5100, 5102, 5104, each of which undergoes a chunking process to create chunks 5108, 5110, 5112, 5114, 5116, 5118, 5120, 5122, and 5124. This chunking process divides each document into smaller, semantically coherent units referred to as chunks in certain embodiments, and in other embodiments they may correspond to paragraphs in a document (and/or images and audio content) processed in a sequential or predetermined order. Each chunk is then associated with metadata, which may include, but is not limited to, information about the parent document, creation date, category, topics, and citations or links to other documents and/or their chunks. The chunking can be performed, for example, by Document Chunking module 3806 (from FIG. 40).

The chunks may then be analyzed to evaluate the importance and relevance of each chunk. This analysis takes into account factors such as the chunk's content, its metadata, and its relationships with other chunks and documents. The Chunk Selection and Ranking module 3810 (from FIG. 40) assigns a score or rank to each chunk based on these factors.

A superchunk creator module may be additionally comprised by the SCORE-RAG system illustrated in FIG. 40. Other embodiments may comprise a superchunk creator module as part of a LASER system/module as described above. The superchunk module may be operable to select the highest-ranked chunks from across multiple documents to form a superchunk 5106. A superchunk may be defined as a collection of the most important and relevant chunks related to a specific topic or category, regardless of their source documents. Each superchunk may be assigned a unique identifier (UUID), which is used to manage and retrieve the superchunk. The superchunk may be created in response to a user query or a type of user query that is expected, or in response to the domain-specific nature of the Generative AI application, e.g., financial analysis or code generation, for example.

The Indexing Engine 3814 (from FIG. 40) may then process the created superchunks for efficient storage and retrieval. This indexing takes into account the composite nature of superchunks, allowing for rapid access to highly relevant information across multiple source documents. The memory access architecture (e.g., high bandwidth memories and their widths) may also be optimized for storage and retrieval of superchunks.

When a user query is received, for example, the query processor 3816 (from FIG. 40) analyzes the query to identify relevant topics or categories. The retrieval orchestrator 3818 (from FIG. 40) then prioritizes the retrieval of superchunks that match these identified topics. This approach ensures that the most pertinent information from across multiple documents is readily available for the RAG process.

The generation module 3822 (from FIG. 40) utilizes the retrieved superchunks to generate a response to the user query. By working with superchunks, the Generation module 3822 has access to a concentrated set of relevant and/or highly relevant information, thus improving the quality and relevance of the generated response for the particular domain.

The Evaluation & Fine-tuning module 3824 (from FIG. 40) continuously assesses the performance of superchunks in query responses and refines their composition based on usage patterns and effectiveness metrics. This ongoing optimization ensures that the system adapts to changing information landscapes and user needs.

The superchunk approach offers several advantages over traditional RAG systems:
1. Enhanced Relevance: By combining the most important chunks from multiple documents, superchunks provide a more comprehensive and focused information set for the RAG process.
2. Improved Efficiency: The use of superchunks reduces the volume of data that needs to be processed during query time, potentially leading to faster response generation. Superchunks can be considered as refined documents in this context. Instead of using with the original set of documents for RAG, a more efficient approach uses the superchunks.
3. Cross-Document Insights: Superchunks enable the system to draw connections and insights from across multiple documents, thus uncovering relationships that might be missed in a document-centric approach.
4. Adaptability: The continuous evaluation and optimization of superchunks allow the system to evolve and improve its performance over time.
5. Scalability: As the volume of source documents grows, the superchunk approach becomes increasingly valuable, providing a method to distill large document collections into manageable, highly relevant information units.

Figure 54:
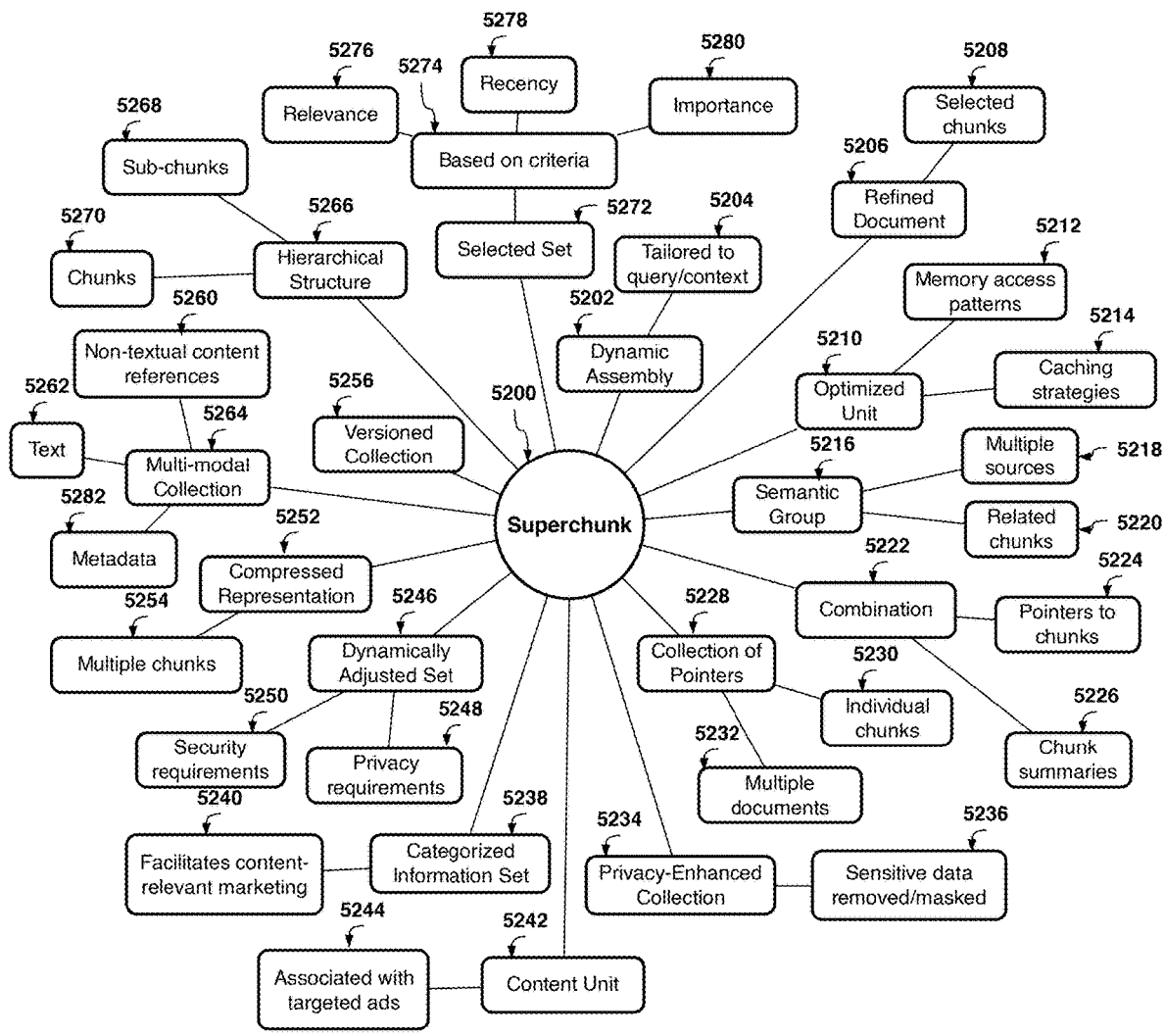
FIG. 54 is an illustration of different meanings of "superchunk" in the context of the present invention.

Referring now to FIG. 54, an illustration of the different non-limiting embodiments of "superchunk" in the context of the present invention, is described in more detail. A person skilled in the art should understand that "superchunk" may refer to, but is not limited to: a collection of pointers 5228 to individual chunks 5230 from one or more documents 5232; a fully populated refined document 5206 composed of selected chunks 5208; a combination 5222 of pointers to chunks 5224 along with their respective summaries 5226; a set of chunks 5272 selected based on specific criteria such as relevance 5276, importance 5280, or recency 5278; a dynamically assembled collection 5202 of information tailored to a particular query or context 5204; a hierarchical structure 5266 of chunks 5270 and sub-chunks 5268; a semantically related group of chunks 5216, regardless of their source documents; a compressed or encoded representation 5252 of multiple chunks 5254; a versioned collection of chunks 5256 that evolves over time; a multi-modal collection 5264 incorporating text 5262, metadata 5282, and references to non-textual content 5260; a unit of information 5210 optimized for specific memory access patterns 5212 or caching strategies 5214; a privacy-enhanced collection 5234 of information with sensitive data removed or masked 5236; a dynamically adjusted set of information 5246 based on privacy 5248 and security requirements 5250; a content unit 5242 that can be associated with targeted advertisements 5244; and a categorized information set 5238 that facilitates content-relevant marketing 5240.

Figure 55:
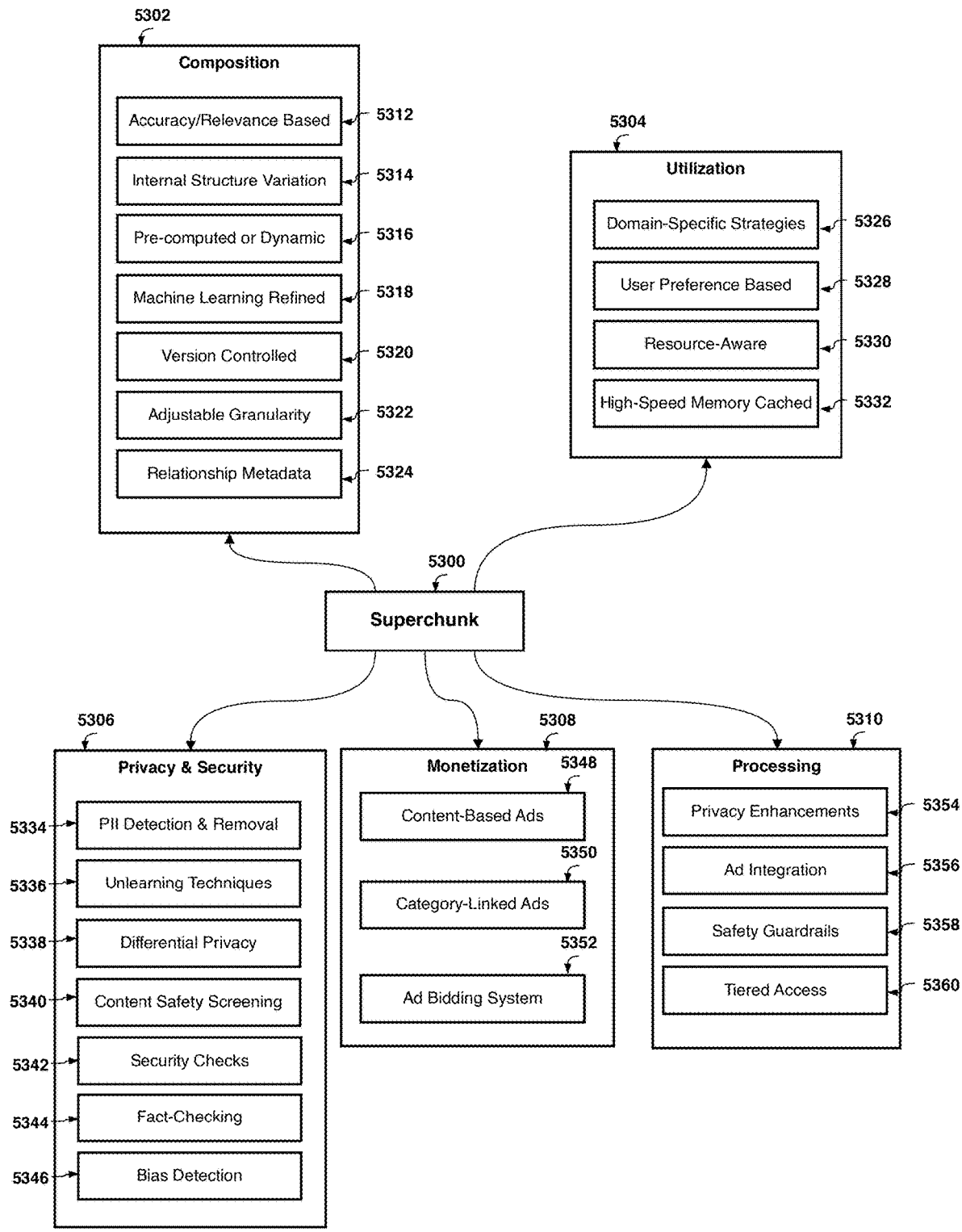
FIG. 55 is an illustration of characteristics of superchunks according to an embodiment of the invention.

Referring now to FIG. 55, an illustration of the characteristics of "superchunks" in the context of the present invention is described in more detail. Superchunks may include composition characteristics 5302. The composition of superchunks 5300 within the system can vary based on different factors and implementation choices, including, but not limited to:
  a) Accuracy/Relevance Based 5312: Superchunks may be assembled based on accuracy or relevance metrics, with the potential for more accurate or comprehensive superchunks to be made available to users with higher service tiers or permissions.
b) Internal Structure Variation 5314: The internal structure of a superchunk may vary from a simple list of references to a complex data structure incorporating multiple layers of information and metadata.
c) Pre-computed or Dynamic 5316: Superchunks may be pre-computed and stored, or they may be dynamically generated in response to specific queries or user interactions.
d) Machine Learning Refined 5318: The process of creating and maintaining superchunks may involve machine learning algorithms that continuously refine the selection and organization of chunks based on usage patterns and feedback.
e) Version Controlled 5320: Superchunks may incorporate version control mechanisms to track changes over time and allow for rollback or comparison between different states.
f) Adjustable Granularity 5322: The granularity of information within a superchunk may be adjustable, allowing for different levels of detail to be presented based on user needs or system capabilities.
g) Relationship Metadata 5324: Superchunks may include metadata about the relationships between contained chunks for capturing complex networks of information.
f). The memory and caches hierarchy and storage architecture interconnecting the GPUs to the high-high bandwidth memories.

Superchunks may include utilization characteristics 5304. The utilization of superchunks within the system can vary based on different factors and implementation choices, including, but not limited to:
a) Domain-Specific Strategies 5326: The system may employ different strategies for superchunk creation and utilization based on factors such as the domain of information.
b) User Preference Based 5328: The system may employ different strategies for superchunk creation and utilization based on factors such as user preferences.
c) Resource-Aware 5330: The system may employ different strategies for superchunk creation and utilization based on factors such as computational resources available.
d) High-Speed Memory Cached 5332: Superchunks may be preferentially stored in high-speed memory or caches to optimize access times and system performance. The system may employ intelligent caching strategies that prioritize frequently accessed or highly relevant superchunks for rapid retrieval.

Superchunks may further comprise privacy and security characteristics 5306. The creation and maintenance of superchunks may involve privacy protection and security mechanisms, including, but not limited to:
a) PII Detection & Removal 5334: Automatic detection and removal or masking of Personally Identifiable Information (PII) before the superchunk is used in downstream processes such as feeding to LLMs or in a RAG pipeline.
b) Unlearning Techniques 5336: Implementation of "unlearning" or "targeted catastrophic forgetting" techniques that can dynamically adjust the content of superchunks based on privacy requirements or user queries.
c) Differential Privacy 5338: Application of differential privacy techniques to add noise to sensitive data while maintaining overall statistical properties of the information.
d) Content Safety Screening 5340: Content safety screening to prevent the inclusion of explicit, violent, or otherwise inappropriate material.
e) Security Checks 5342: Security checks to detect and remove potential malware, phishing attempts, or other security threats.
f) Fact-Checking 5344: Fact-checking to flag or filter out misinformation or unverified claims.
g) Bias Detection 5346: Bias detection and mitigation to ensure a balanced representation of information.

Superchunks may further comprise monetization characteristics 5308. Superchunks may be associated with advertising content based on their composition or categorization, including (but not limited to):
a) Content-Based Ads 5348: Inserting relevant advertisements into superchunks based on the topical content. For example, a superchunk about natural farming practices might include or be associated with advertisements from organic fertilizer companies.
b) Category-Linked Ads 5350: Linking advertisements to the category or classification of the superchunk. For instance, a superchunk related to rent control laws in a specific city might be associated with advertisements for local legal services.
c) Ad Bidding System 5352: Implementing a bidding or auction system for advertisers to target specific types or categories of superchunks.

This advertisement feature can generate advertisements that are relevant to the user query, user interests, user intentions, or user past history of interactions. As part of the derived queries, certain queries may be made by the AI brokers to the user to identify their specific goals and intentions (for example, the AI brokers may ask the user if they are interested in buying a new car in the next six months, given that the user query appears to research and compare various brands of automobiles). The two-way interaction between the AI brokers and the user is seen as another novelty of certain embodiments of the present invention, compared to the one way interaction users currently have with generative AI LLMs.

Superchunks may further comprise processing characteristics 5310 The processing of superchunks may include multiple stages of enhancement and screening, including, but not limited to:
a) Privacy Enhancements 5354: Implementation of privacy enhancements, including, detection and removal of PII, data anonymization or pseudonymization techniques.
b) Ad Integration 5356: Ad generation and integration based on content analysis and categorization.
c) Safety Guardrails 5358: Application of safety and security guardrails to filter or flag potentially harmful or inappropriate content.
d) Tiered Access 5360: The system may employ different strategies for superchunk creation, maintenance, and utilization based on factors such as user authentication level, subscription tier, or specific privacy and security requirements of the use case.

These variations and implementations of superchunks are not mutually exclusive, and the present invention incorporates systems that may include multiple approaches or allow for dynamic switching between different superchunk paradigms based on context or requirements.

Figure 56:
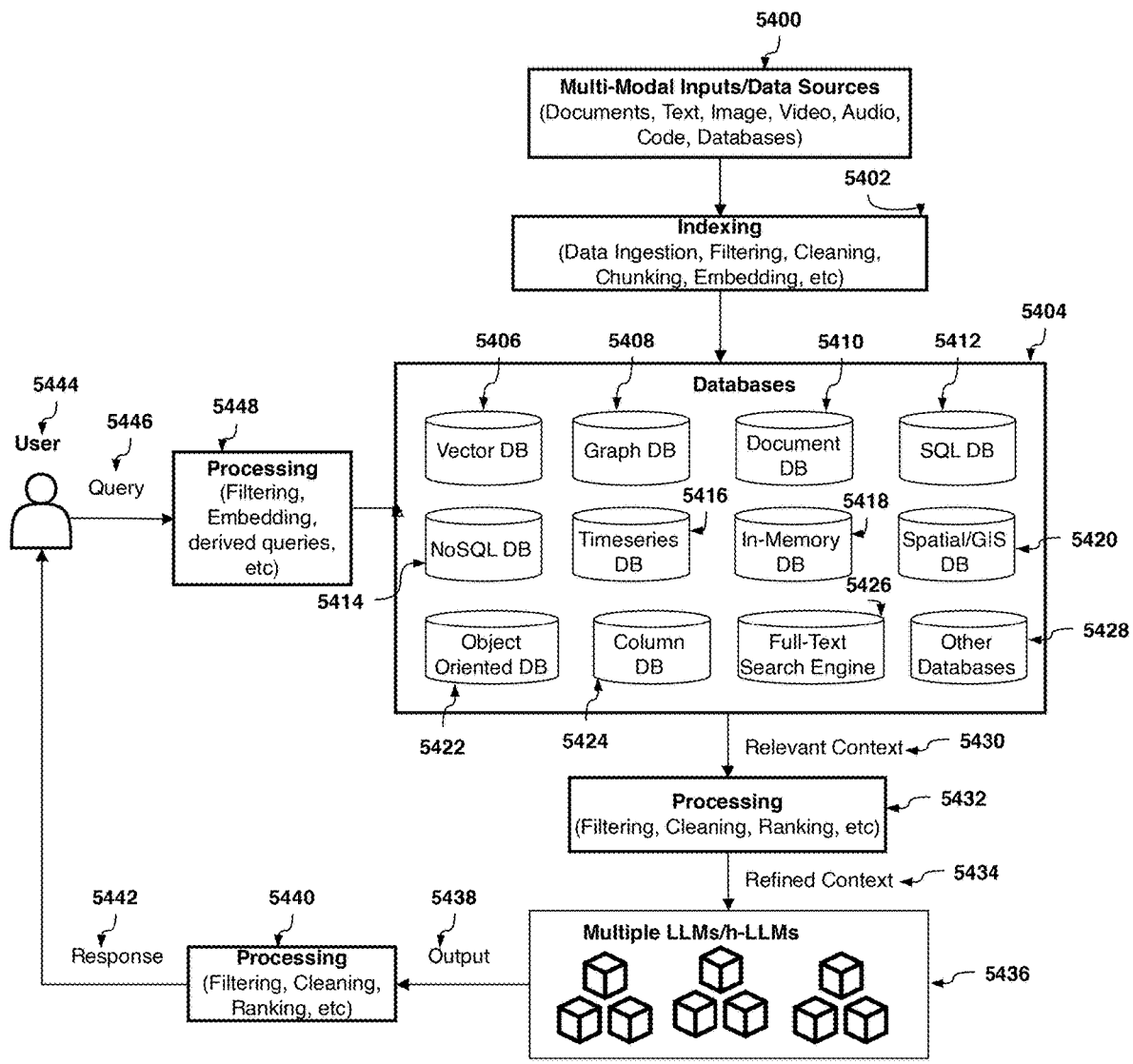
FIG. 56 is an illustration of the architecture of a Hybrid-RAG system according to an embodiment of the invention.

Referring now to FIG. 56, an illustration of an architecture of a Hybrid-RAG system is described in more detail. A Hybrid Retrieval-Augmented Generation (Hybrid-RAG) system is designed to process and generate multi-modal data, including but not limited to text, documents, images, audio, video, and code. The system leverages a combination of various database types and LLMs to overcome the limitations of traditional Vector-RAG or Graph-RAG systems, providing enhanced performance and versatility across diverse data types and query scenarios. The Hybrid-RAG system comprises multiple components designed to efficiently process, store, retrieve, and generate multi-modal data.

To achieve optimal performance for multi-modal data, Hybrid-RAG employs multiple embedding models and specialized databases, each fine-tuned for a specific content type such as text, audio, images, video, or code. This specialized approach ensures that the unique characteristics and nuances of each content modality are accurately captured and indexed. The system begins with the indexing of multi-modal data 5400, which may include text, documents, audio, video, code, and other data types. The indexing process 5402 involves several steps:

1. Data Ingestion: Raw multi-modal data is ingested into the system.
2. Preprocessing: This step includes chunking, filtering, and cleaning of the ingested data.
3. Embedding Generation: Specialized embedding models generate vector representations for each data type.

The processed and embedded data is stored in a variety of database types 5404, including: a Vector Databases 5406 (e.g., Pinecone, Milvus) for efficient similarity search; Graph Databases 5408 (e.g., Neo4j, TigerGraph) for relationship-based queries; Document Databases 5410 (e.g., MongoDB, Couchbase) for unstructured data; Relational Databases 5412 (e.g., PostgreSQL, MySQL) for structured data; Non-Relational Databases 5414 (e.g., DynamoDB) for unstructured or semi-structured data; Time-Series Databases 5416 (e.g., InfluxDB, TimescaleDB) for temporal data; In-Memory Databases 5418 (e.g., Redis, Memcached) for high-speed data access; Spatial/GIS Databases 5420 (e.g., PostGIS) for location-based data; Object-Oriented Databases 5422 (e.g., ObjectDB) for complex object storage; Column-Oriented Databases 5424 (e.g., Apache Cassandra) for wide-column storage; Full-Text Search Engines 5426 (e.g., Elasticsearch, Solr) for keyword-based retrieval; and Other specialized database types 5428 (e.g. NewSQL, multi-modal databases, RDF stores, XML databases, etc).

When a user 5444 submits a query 5446, the system pre-processes the query. Query Preprocessing 5448 involves filtering, embedding generation, and the creation of derived queries. Based on the preprocessed query, the system determines which database(s) are most suitable for retrieval in a query routing process. The system then queries the selected databases to retrieve relevant context 5430. The retrieved context 5430 undergoes processing 5432 including filtering, cleaning, and ranking to generate the refined context 5434. One or more appropriate LLMs or h-LLMs 5436 are then selected based on the query type and refined context 5434. The responses 5438 generated by the LLMs or h-LLMs 5436 undergo filtering, cleaning, and ranking at a post-processing step S440. The final processed response 5442 is then delivered to the user. The previously used contexts may also be stored in-memory (for example, a cache) for faster and more accurate processing times.

For the generation phase, the Hybrid-RAG utilizes an ensemble of LLMs or h-LLMs 5436, each specialized for different tasks. These may include models optimized for question-answering, code generation, image interpretation, audio transcription, and video analysis, among others. This multi-faceted approach allows Hybrid-RAG to not only process a wide range of input types but also to generate appropriate and context-aware multi-modal outputs.

The Hybrid-RAG system addresses limitations of traditional RAG systems by utilizing the most appropriate database(s) for each data type and query scenario. Hybrid-RAG enables multi-modal data processing and generation, thus providing more comprehensive and accurate responses through the integration of multiple data sources and LLMs.

Figure 57:
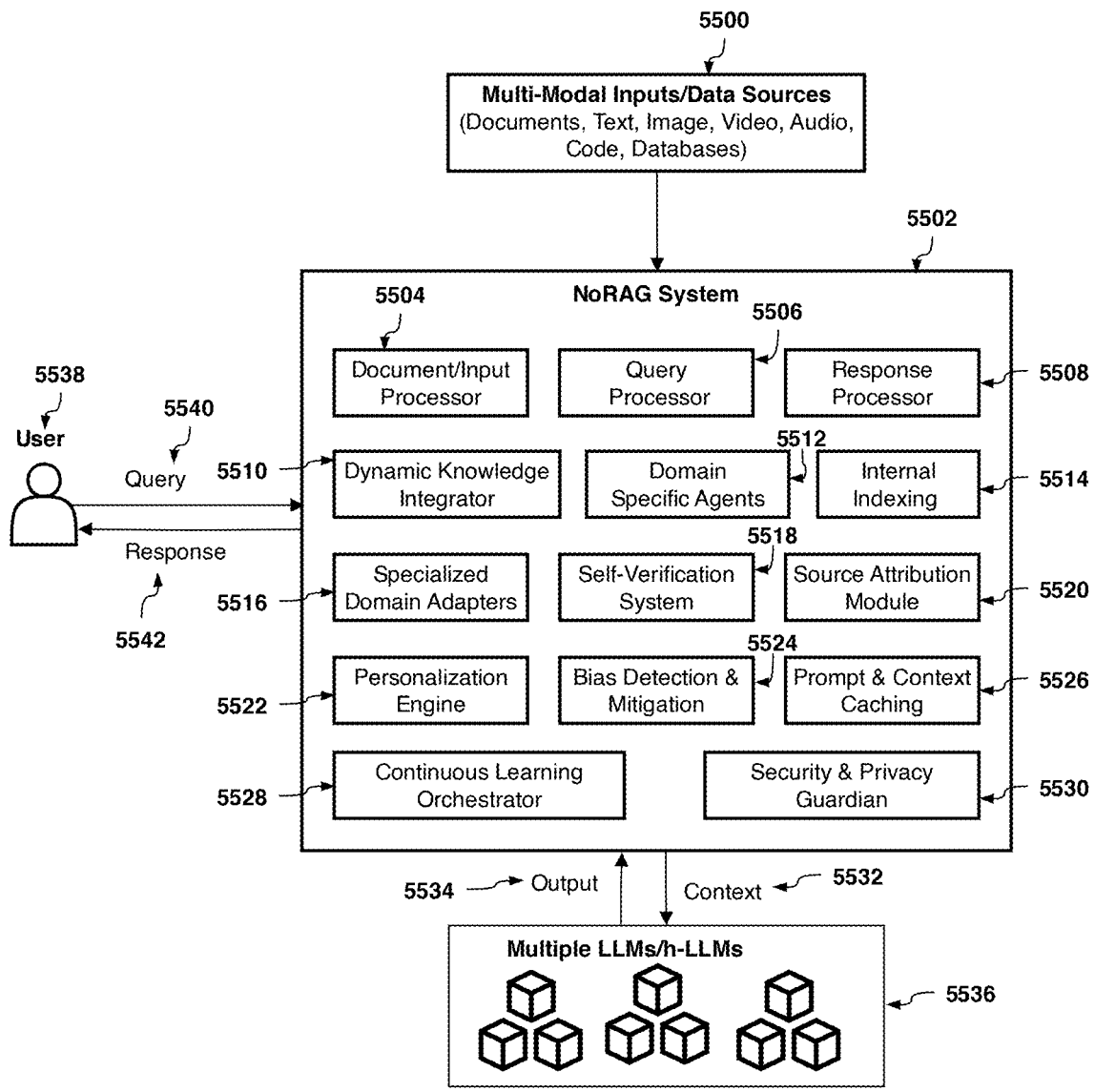
FIG. 57 is an illustration of an architecture of a NoRAG system according to an embodiment of the invention.

Referring now to FIG. 57, an illustration of an architecture of a NoRAG system according to an embodiment of the invention is described in more detail. LLMs face limitations in accessing current information, maintaining factual accuracy, and providing transparent, attributable responses. RAG systems address these limitations of LLMs. RAG is useful for tasks requiring current or specialized knowledge, as it allows language models to draw upon external, updatable sources of information. However, RAG often introduces complexities in implementation and maintenance. Users may (depending on their design options) have to deal the complexities of chunking, embedding, indexing documents, maintaining vector databases, for instance. NoRAG system provides a novel and innovative approach to enhance LLMs without the need for RAG systems, hence the name NoRAG. By integrating key functionalities directly in a plug-in manner into the LLM architecture, in some embodiments as a license-able plugin to LLMs, NoRAG offers improved performance, reduced complexity, and enhanced user experience compared to traditional RAG systems.

The NoRAG system begins with ingesting multi-modal data 5500, which may include text, documents, images, audio, video, code, and other data types. The NoRAG system 5502 comprises several modules, each designed to perform specific functions in the overall process of enhancing LLM capabilities.

The NoRAG system comprises a Document/Input Processor 5504 module. The Input Processor module 5504 is responsible for processing input documents and data sources. It handles various file formats, extracts relevant information, and prepares the data for integration into the NoRAG system.

The NoRAG system further comprises a Query Processor module 5506: The Query Processor module 5506 handles user queries, performing sophisticated analysis to improve them for the LLM 5536. It breaks down complex queries into manageable parts and generates derived queries when necessary.

The NoRAG system further comprises a Response Processor module 5508. The Response Processor module 5508 performs post-processing on the LLM's 5536 output 5534 before sending it to the user. This module refines the generated content, ensures coherence, and applies any necessary formatting or style adjustments to enhance the quality and relevance of the final response.

The NoRAG system further comprises Dynamic Knowledge Integrator component 5510. The Dynamic Knowledge Integrator component 5510 interfaces directly with the LLM 5536, providing relevant information during the generation process. It acts as a bridge between the LLM's 5536 inherent knowledge and the additional information processed by the NoRAG system, improving integration of external knowledge into the LLM's 5536 responses 5534.

The NoRAG system further comprises a Domain Specific Agents module 5512: The Domain Specific Agents module

5512 comprises several domain specific agents which retrieve appropriate specialized knowledge on the query context (e.g. web search agent, stock market agent, weather data agent, IoT data, etc). It enables the NoRAG system to adapt its responses to specific domains, improving accuracy and relevance in specialized fields.

The NoRAG system further comprises an Internal Indexing module 5514. The Internal Indexing module 5514 utilizes a combination of diverse database types, including, but not limited, to vector databases, graph databases, document databases, time-series databases, full-text search engines, in-memory databases, object databases, spatial databases, SQL databases, NoSQL databases, and column databases. This approach ensures efficient indexing and retrieval of information, improving the NoRAG system's performance across various data types and query patterns.

The NoRAG system further comprises Specialized Domain Adapters modules 5516: These plug-in modules 5516 contain specialized knowledge for specific domains. They can be dynamically loaded and unloaded based on the query context, allowing the NoRAG system to provide expert-level responses in various fields without overburdening the core LLM.

The NoRAG system further comprises a Self-Verification system 5518. The Self-Verification system 5518 checks facts and reduces hallucinations in the LLM's 5536 outputs 5534. It employs internal consistency checks and compares generated content against the system's knowledge base to ensure accuracy and reliability in the responses.

The NoRAG system further comprises a Source Attribution module 5520: The Source Attribution module 5520 tracks and cites internal knowledge sources used in generating responses. It enhances the transparency and credibility of the NoRAG system's outputs by providing citations for the information used.

The NoRAG system further comprises a Personalization Engine 5522. The Personalization Engine 5522 adapts responses 5542 based on user preferences and interaction history. It maintains user profiles and adjusts the system's outputs to match individual user needs, enhancing the relevance and usefulness of the responses. This module may optionally inject advertisements in responses based on the user's subscription tier or preferences or queries sent to the user 5538 by the LLM 5536 to identify the user's attitudes, intentions, and predict behavior and future actions.

The NoRAG system further comprises a Bias Detection & Mitigation module 5524. The Bias Detection & Mitigation module 5524 identifies potential biases in the NoRAG system's responses and works to balance them. It employs advanced algorithms to recognize various types of bias and adjusts the output to provide more neutral and fair responses.

The NoRAG system further comprises a Prompt, Derived Prompts, and Context Caching module 5526: This module 5526 caches user queries, derived prompts, and the relevant context used (including previously used contexts) that may be used to generate responses. By storing this contextual information for in-memory processing, the NoRAG system can improve response times for similar queries and maintain consistency in its outputs over time.

The NoRAG system further comprises a Continuous Learning Orchestrator 5528: The Continuous Learning Orchestrator 5528 manages the ongoing learning process of the model. It identifies knowledge gaps, prioritizes learning objectives, and coordinates the integration of new information across all modules, ensuring that the NoRAG system remains up-to-date and continues to improve over time.

The NoRAG system further comprises a Security and Privacy Guardian module 5530: The Security and Privacy Guardian module 5530 ensures data privacy and security in knowledge storage and retrieval. Privacy and security guardrails are implemented to filter sensitive data in the query and responses (such as personally identifiable information (PII)).

When a user 5538 submits a query 5540, the NoRAG system processes the query and generates a relevant context 5532 which is passed to one or more LLMs or h-LLMs 5536. NoRAG utilizes an ensemble of LLMs or h-LLMs 5536, each specialized for different tasks. These may include models optimized for question-answering, code generation, image interpretation, audio transcription, and video analysis, among others. The processed response 5542 is then returned to the user.

The NoRAG plug-in and/or integrated LLM system may provide several advantages over traditional RAG approaches:

1. Reduced Complexity: By integrating functionalities directly into the LLM architecture, the NoRAG system eliminates the need for external retrieval systems, simplifying implementation and maintenance. The NoRAG system works like a plugin system enhancing the capabilities of an LLM.
2. Improved Performance: The tight integration of agents, domain adapters, knowledge and processing modules allows for faster response times and more coherent outputs.
3. Enhanced Customization: The modular architecture of the NoRAG system allows for easy addition or modification of specialized knowledge domains without requiring changes to the core LLM.
4. Improved Privacy and Security: By internalizing data storage and retrieval, the NoRAG system provides improved control over sensitive information and reduces potential vulnerabilities associated with external data sources.
5. Seamless Updates: The Continuous Learning Orchestrator module 5528 enables the NoRAG system to incorporate new information more efficiently than traditional RAG systems, which often require separate update processes for external knowledge bases.
6. Use in Network of LLM Agents: The NoRAG plug-in module can be used as a series or parallel network when connected to LLMs that operate as a network of LLM agents performing specialized tasks in a coordinated sequence (managed by AI brokers or LLMs, for example). Each specialized LLM agent may use a different NoRAG plugin, and NoRAG plugins may be mapped to different LLMs, depending on the type of task being done. A library of NoRAG modules may be developed in a generic manner and also with a target LLM family as an objective, and NoRAG modules for billing, advertisement generation, fault-tolerance, and security may also be added on in a plug-in manner.

Figure 58:
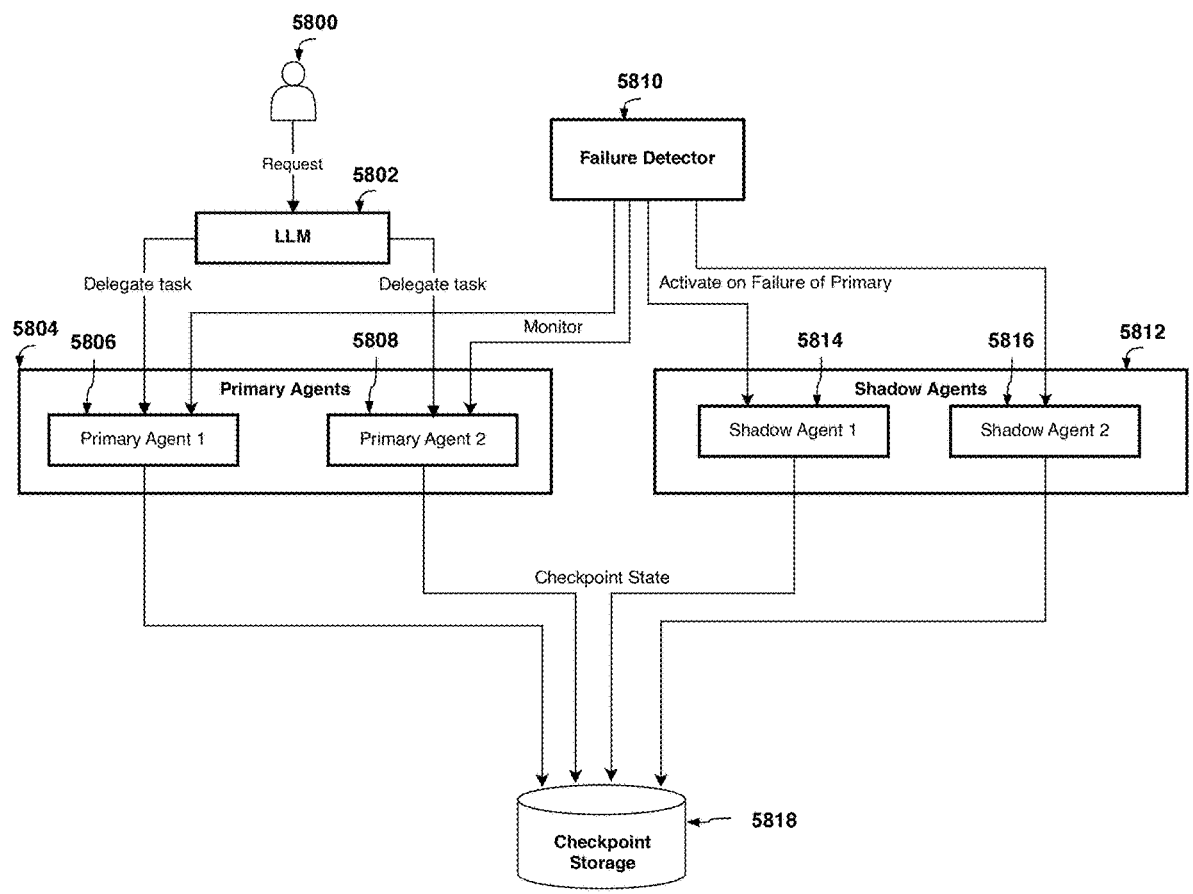
FIG. 58 is an illustration of the H-Token components in the FLM system according to an embodiment of the invention.

Referring now to FIG. 58, an illustration of H-Token components in the FLM system according to an embodiment of the invention is described in more detail. Functional Language Modeling (FLM) or Language Function Models (LFMs), a novel approach that extends traditional RAG systems by introducing Hierarchical Tokens (H-Tokens)—a higher-level abstraction that captures functional units of meaning. This approach works in conjunction with derived prompts and context optimization techniques to provide more efficient and semantically meaningful document processing. H-Tokens represent a shift in how we process and understand text in LLMs. Unlike traditional tokens that represent individual words or subwords, H-Tokens encapsulate entire functional units of meaning. These can include:

1. Domain-specific actions (e.g., legal opinions, booking procedures)
2. Complete operational sequences (e.g., sorting algorithms, data processing routines)
3. Semantic units (e.g., menu sections, document categories)

Each H-Token effectively compresses multiple regular tokens (potentially hundreds or thousands) into a single semantic unit while preserving the functional meaning of the content.

The H-Token components 5600 within an FLM system include:

1. Functions 5604: Domain-specific tasks or processes that lead to events 5610. Functions can have multiple implementation methods. For example, booking procedures, driving operations, legal analysis.
2. Events 5606: Outcomes or results of functions 5612. Events serve as anchoring points for related functions. For example, reaching a destination, completing a purchase.
3. Ways 5608: Different methods to accomplish functions 5614. Ways can themselves be represented as H-Tokens. For example, various transportation options to reach a destination.

Figure 59:
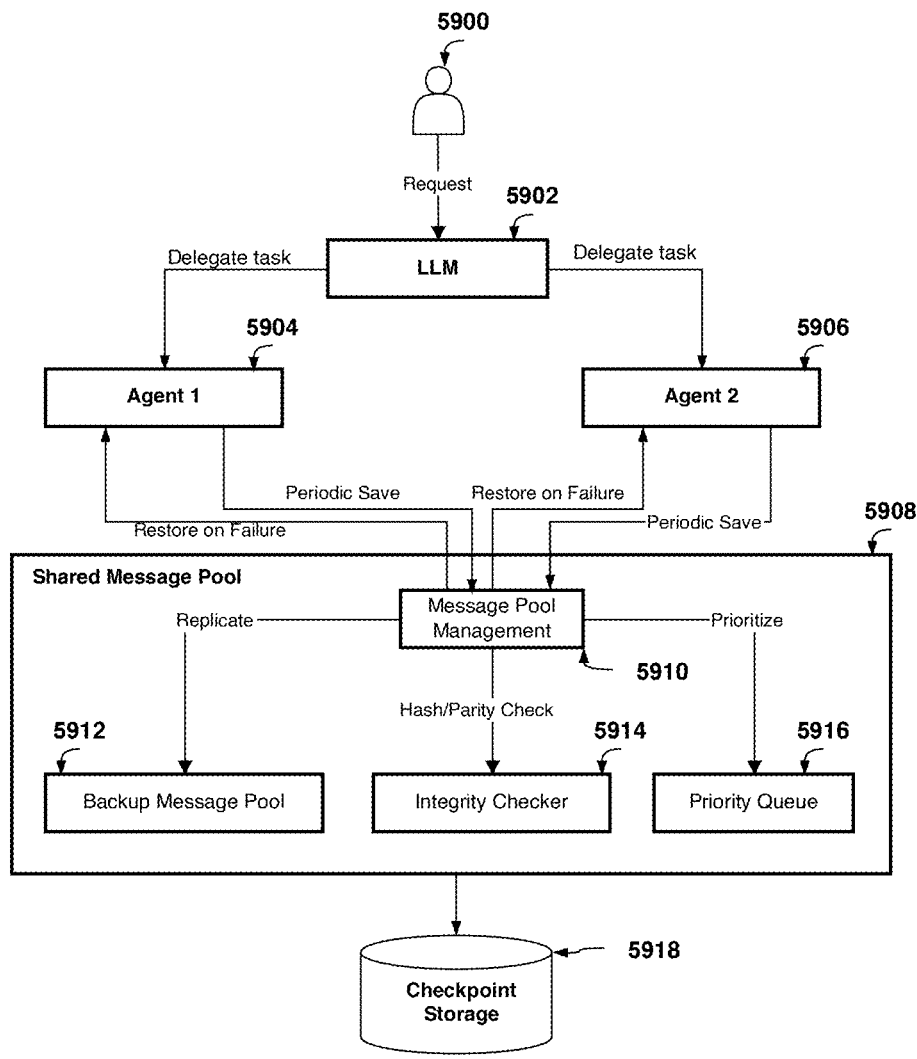
FIG. 59 is an illustration of the steps in the FLM system according to an embodiment of the invention.

Referring now to FIG. 59, an illustration of steps in the FLM or LFMsystem according to an embodiment of the invention is described in more detail. The system begins with Input Processing 5702, where User 5700 inputs a prompt which undergoes initial tokenization 5704, followed by domain recognition 5706 and domain-specific analysis 5708 to understand the context and requirements of the request.

The process continues with Function Identification 5710, which comprises main function analysis 5712, sub-function breakdown 5714, hierarchical mapping 5716, and function relationship analysis 5718. This step identifies the key functional components within the input that will form the basis for H-Token generation.

In the H-Token Generation phase 5720, the system performs functional area analysis 5722, followed by token encapsulation 5724 where regular tokens are compressed into H-Tokens. These H-Tokens are then organized hierarchically 5726, and their relationships are mapped to maintain semantic connections 5728.

The Function Implementation stage 5730 involves H-Token mapping 5732, function definition 5734, event identification 5736, and ways implementation 5738. This phase establishes how the identified functions will be executed and relates them to specific events and implementation methods.

The RAG Processing phase 5740 begins with H-Token context assembly 5742, after which the system follows one of two processing paths 5744. Alternative 1 involves token expansion 5746, where H-Tokens are expanded back to regular tokens for processing. Alternative 2 utilizes direct H-Token processing 5748. Both paths converge at context integration 5750, where the processed information is combined into a coherent context. Efficiency is achieved through compression or expansion of tokens from H-Tokens, if and when needed, expanding the effective context of existing LLMs, for example.

Finally, the Output Generation phase 5752 assembles the information 5754, forms a response 5756, performs quality verification 5758, and produces the final output 5760. This completes the FLM processing cycle, providing a semantically rich and functionally organized response to the initial user prompt.

The FLM or LFM system architecture enables the system to efficiently process and understand complex inputs while maintaining semantic coherence through the use of functional abstractions represented by H-Tokens. The flexibility of choosing between token expansion and direct H-Token processing allows for optimization based on specific use cases and requirements.

Figure 60:
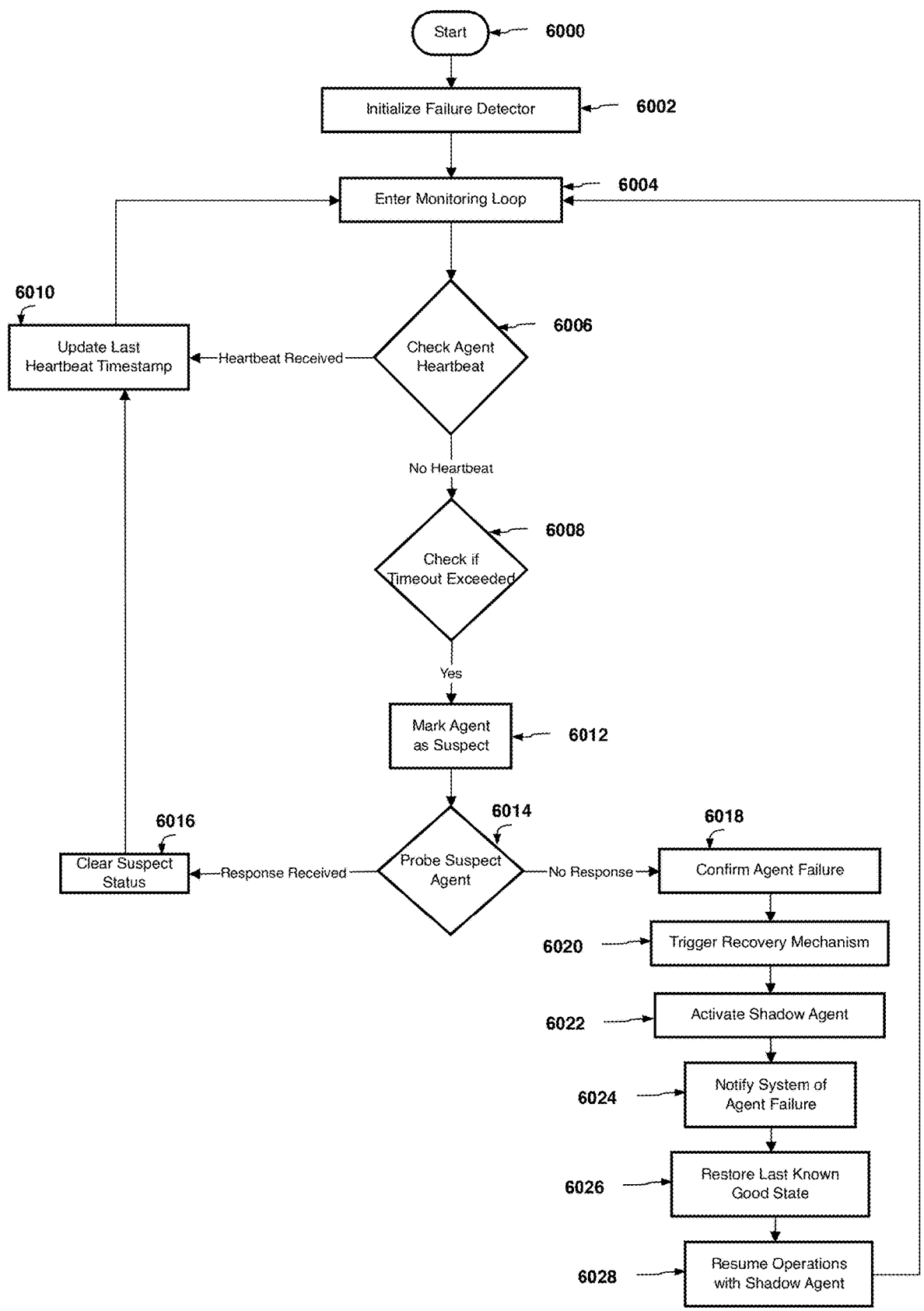
FIG. 60 is an illustration of FLM system implementation in the travel domain according to an embodiment of the invention.

Referring now to FIG. 60, an illustration of FLM or LFM system implementation in the travel domain according to an embodiment of the invention is described in more detail. The figure demonstrates how the system processes a travel-related query through various processing stages.

In the Input Processing stage, the system receives a user 5800 prompt requesting to "Plan a week-long vacation to Hawaii". This prompt undergoes initial tokenization 5804 and is recognized as belonging to the Travel domain 5806 through domain recognition algorithms.

The Function Identification stage 5808 breaks down the travel planning function 5810 into three primary sub-functions: Transportation 5812, Accommodation 5814, and Activities 5816. Each of these sub-functions represents a crucial component of the travel planning process.

In the H-Token Generation stage 5818, each sub-function is further decomposed into specific H-Tokens. The Transportation function 5812 generates H-Token for Flight_Booking 5820. The Accommodation function produces H-Token for Hotel_Booking 5822. The Activities function creates H-Token for Beach_Activities 5824. A sub-function can generate one or more H-Tokens. For example, Activities function can create H-Tokens for Beach_Activities, Sightseeing and Dining.

The Function Implementation stage 5826 demonstrates how individual H-Tokens are processed and broken down into their respective functions, events, and implementation methods. For example, the Flight_Booking H-Token 5820 comprises:

Function: Search_Flights 5828;
Event: Flight_Booked 5830; and
Ways: Airlines/Dates/Routes 5832.

Similarly, the Hotel_Booking H-Token 5822 comprises:
Function: Search_Hotels 5834;
Event: Room_Reserved 5836; and
Ways: Hotels/Locations/Prices 5838.

Similarly, the Beach_Activities H-Token 5824 comprises:
Function: Activity_Planning 5840;
Event: Activities_Scheduled 5842; and
Ways: Tours/Self-Guided/Groups 5844.

The RAG Processing stage assembles the H-Token context 5848, incorporating Location Context, Duration Context, and Preference Context. This context undergoes processing through either Alternative 1 (expansion to regular tokens 5854) or Alternative 2 (direct H-Token processing 5856), leading to either Traditional RAG 5858 or H-Token Aware Response generation 5860.

Figure 61:
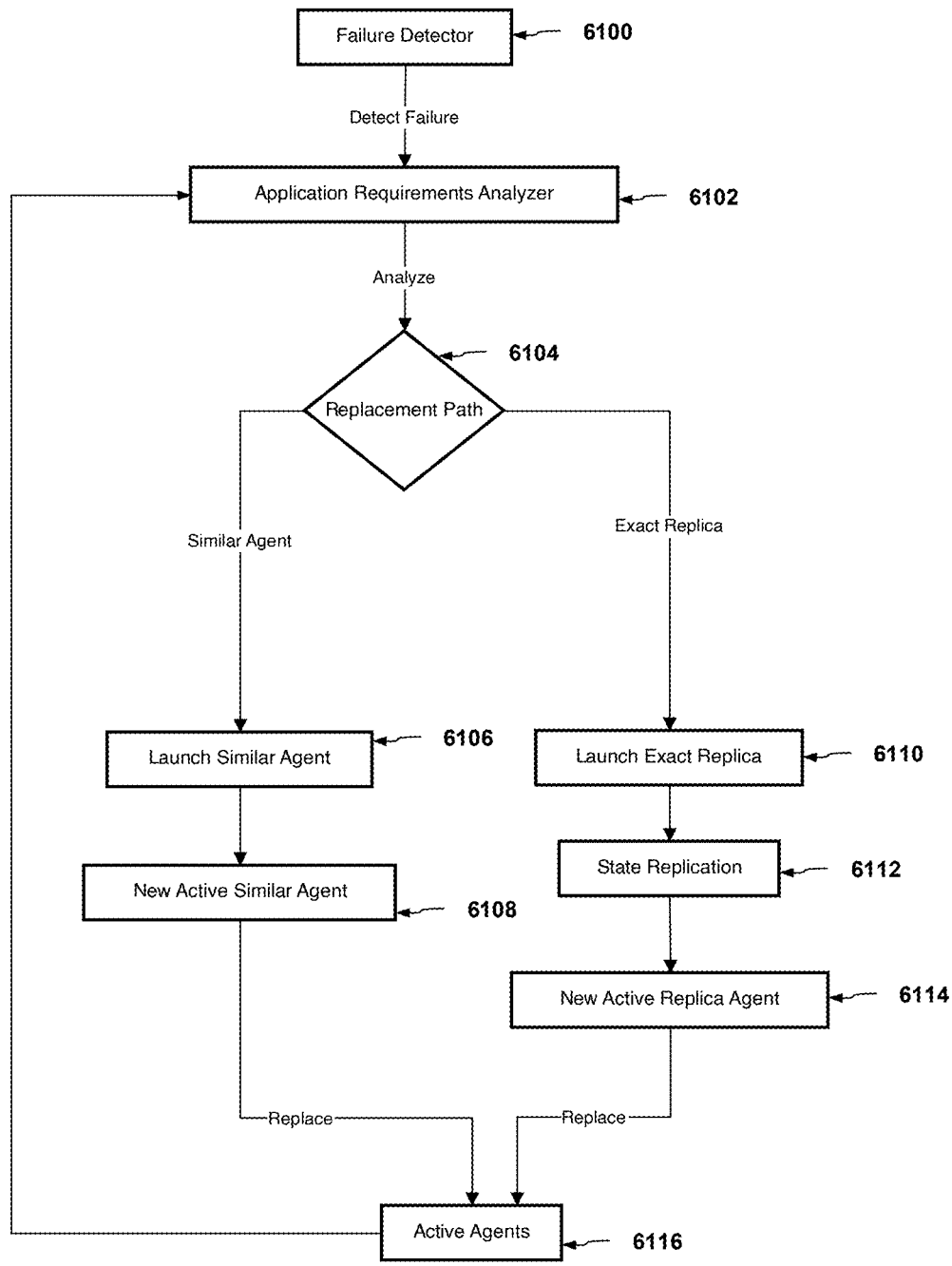
FIG. 61 is a flow chart illustrating a method of a flexible agent replacement mechanism for fault tolerance in a multi-agent system, according to an embodiment of the invention.

Finally, in the Output Generation stage 5862, both processing paths converge to create a detailed itinerary 5864, which is then formatted into the final response for the user 5866. This processing flow enables the system to generate semantically rich and functionally organized travel plans that account for all necessary aspects of the vacation planning process. Referring now to FIG. 61, an illustration of the Flexible Agent Replacement mechanism for fault tolerance in a multi-agent system is described in more detail. A Failure Detector 6100 continuously monitors the Active Agents

6116 for any signs of failure or degradation. Upon detection of a failure in an Active Agent 6116, the system initiates the Flexible Agent Replacement process 6104. This process involves two possible paths:
1. Similar/LesserDegree of Similarity Agent Replacement 6106: In this path, the system launches a new agent from the Replacement Agent pool that performs similar functions and/or has a relatively lesser degree of similarity to the failed agent, but is not necessarily an exact replica. This new agent 6108 takes over the general responsibilities of the failed agent.
2. Exact Replica/GreaterDegree of Similarity Agent Replication 6110: For applications requiring strict state preservation or comparatively greater similarity between the agent and the replicated agent, this path involves launching a new agent that is an exact replica or a replication with a relatively greater degree of similarity of the failed agent. This is achieved through the use of a State Replication mechanism 6112, which ensures the new agent 6114 has the same state and knowledge as the failed agent at the time of its last checkpoint.

The choice between these two paths is determined by an Application Requirements Analyzer 6102, which assesses the specific needs of the current application or task. This Flexible Agent Replacement mechanism allows the system to maintain operational continuity while adapting to different application requirements, thus providing a versatile approach to fault tolerance. Regardless of which path is taken, the agent generated thereby is added to the active agents 6116. The Application Requirements Analyzer 6102 continues monitoring the active agents for any subsequent failures.

Figure 62:
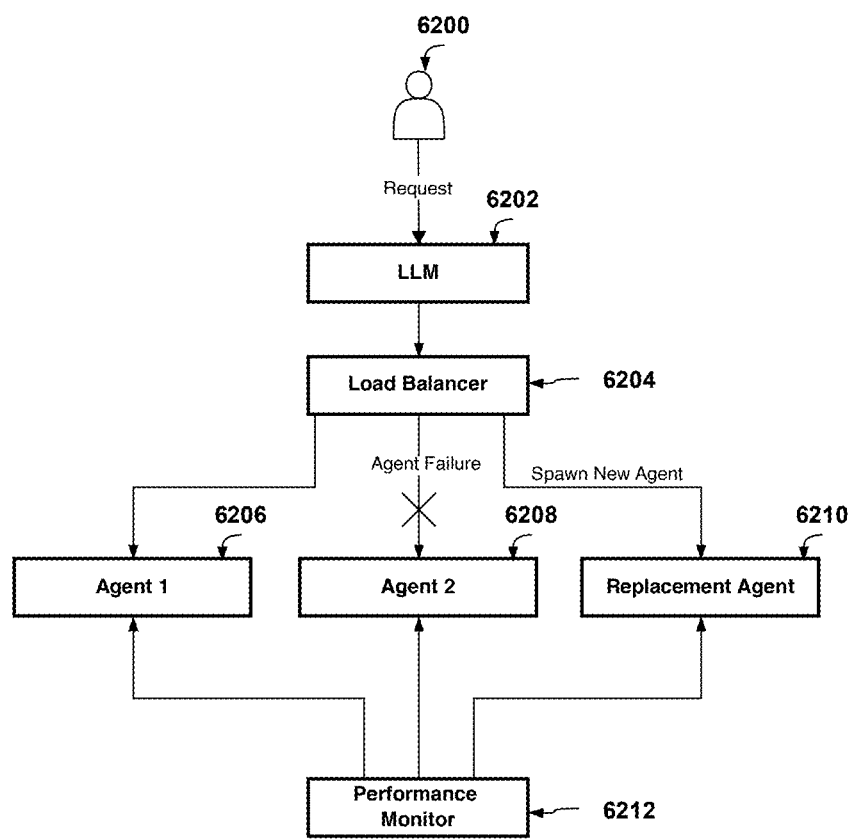
FIG. 62 is an illustration of the soft failure handling mechanism in a fault-tolerant agent system, according to an embodiment of the invention.

Referring now to FIG. 62, an illustration of a soft failure handling mechanism in a fault-tolerant agent system is described in more detail. The system comprises multiple Agent Processes (6206, 6208) managed by a Load Balancer 6204. A Performance Monitor 6212 continuously tracks the performance metrics of each agent, including response times, task completion rates, and resource utilization. When the Performance Monitor 6212 detects a soft failure condition, such as missed deadlines or performance degradation due to overload, it triggers the soft failure handling mechanism. This mechanism involves several steps:
1. Load Redistribution: The Load Balancer 6204 reassigns tasks from the overloaded agent 6208 to other available agents 6206, helping to alleviate the immediate performance issues;
2. Resource Allocation: Additional computational resources are allocated to the affected agent if available, potentially resolving resource-related performance issues;
3. Agent Scaling: If the overload persists, new agents are spawned 6210 from an Agent Template to share the workload. These new agents 6210 are added to the active agent pool and begin processing tasks; and
4. Gradual Recovery: As the system stabilizes, the Performance Monitor 6212 continues to track metrics, gradually returning to normal operation as performance improves.

This soft failure handling mechanism allows the system to address performance issues and overload scenarios without complete agent failure, maintaining system stability and ensuring continuous operation.

Figure 63:
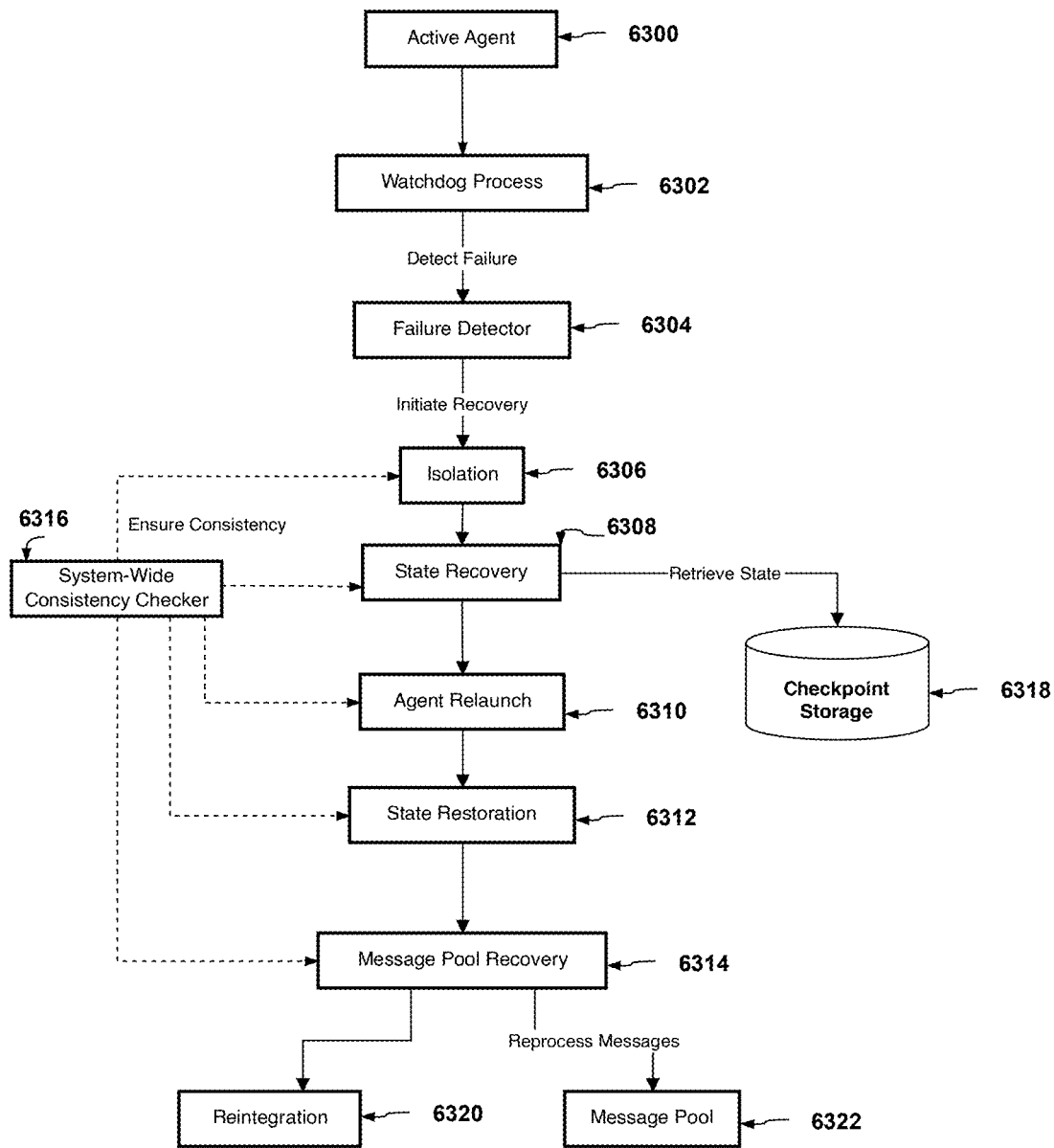
FIG. 63 is a flow chart illustrating a method of hard failure handling mechanism in a fault-tolerant agent system, according to an embodiment of the invention.

Referring now to FIG. 63, an illustration of a hard failure handling mechanism in a fault-tolerant agent system is described in more detail. The system comprises one or more Active Agents (6300), each with an associated Watchdog Process (6302). A Failure Detector 6304 oversees the entire system. In some embodiments, a Message Pool 6322 facilitates communication between agents. In other embodiments, an API service mesh that allows inter-agent communication may be employed.

When a hard failure occurs, such as an agent process termination or complete loss of communication, the following steps are initiated:
1. Failure Detection 6304: The Watchdog Process 6302 associated with the failed agent detects the failure and alerts the central Failure Detector 6304;
2. Isolation 6306: The failed agent is immediately isolated from the system to prevent cascading failures or corruption of the Message Pool 6322;
3. State Recovery 6308: The last known good state of the failed agent is retrieved from a Checkpoint Storage 6318;
4. Agent Relaunch 6310: A new agent process is launched, either as an exact replica of the failed agent or as a similar agent with comparable capabilities, depending on system requirements;
5. State Restoration 6312: The recovered state is applied to the newly launched agent, bringing it up to date with the system's current state;
6. Message Pool Recovery 6314: Any pending messages in the Message Pool associated with the failed agent are reprocessed or redirected to the new agent as appropriate. Alternatively, an API gateway and/or API service mesh may be provided for exchange of messages between the agents and/or a message storage database (See solo.io/topics/service-mesh/service-mesh-vs-api-gateway/to see how these terms may be described, the content of which is incorporated in its entirely by reference except to the extent disclosure therein is inconsistent with disclosure herein).
and
7. System Reintegration 6320: The new agent is reintegrated into the active system, resuming the tasks of the failed agent.

Throughout this process, a System-Wide Consistency Checker 6316 ensures that the overall system state remains consistent and that no critical information or tasks are lost during the transition. This Hard failure handling mechanism enables the system to recover from severe failures, maintaining data integrity and operational continuity even in the face of complete agent failures.

Figure 64:
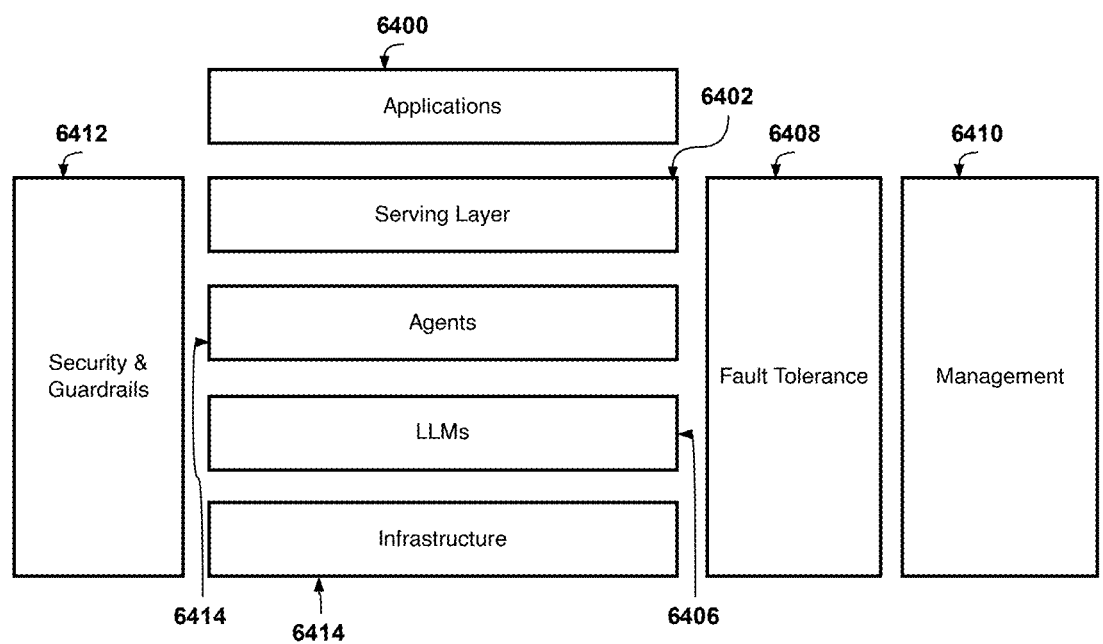
FIG. 64 is an illustration of Generative AI Agent Stack (AGES), according to an embodiment of the invention.

Referring now to FIG. 64, an illustration of generative AI Agent Stack (AGES) is described in more detail. AGES is designed to provide a generative AI stack for fault-tolerant agents. AGES comprises the following layers:
1. Application Layer 6400: This is the topmost layer where the end-user applications and interfaces reside. It is where the fault-tolerant agents are integrated into specific use cases or products.
2. Serving Layer 6402: This layer is responsible for deploying and serving the agents and models. It includes API endpoints for agent interactions, scaling mechanisms to handle varying loads, request routing and load distribution.
3. Agent Layer 6404: This layer contains the individual agents, including primary agents and shadow agents. It manages agent interactions, task delegation, and coordination between agents.
4. LLM Layer 6406: This layer comprises the Large Language Models that power the agents. It includes model inference, fine-tuning capabilities, and potentially multiple LLM options for different agent roles.

5. Fault Tolerance Layer 6408: This layer implements the fault tolerance mechanisms. It includes mechanisms like shadow agent management, checkpointing and state saving, failure detection algorithms, and message pool replication and management.

6. Management Layer 6410: This layer oversees the entire system. It handles agent lifecycle management (spawning, termination), load balancing and resource allocation, system monitoring and logging, and configuration management.

7. Security & Guardrails Layer 6412: This layer ensures the security and integrity of the entire system. It includes authentication and authorization mechanisms, encryption for data in transit and at rest, secure message passing between agents, and integrity checks for message pools and checkpoints. Guardrails and filters are included to ensure the generated results are safe, relevant, and align with predefined criteria.

8. Infrastructure Layer 6414: This is the foundation layer that provides the computational resources and storage. It includes cloud or on-premises servers, GPUs/TPUs for model inference, distributed storage systems for message pools and checkpoints, networking infrastructure, and blockchain network(s).

AGES incorporates architectural patterns and technologies similar in some ways, and different in other significant ways, to those used in Microservices, Containers, Service Meshes, Functions-as-a-Service (FaaS), and Blockchain to enhance the scalability, flexibility, trust, auditability, resilience, and manageability of agents and agentic applications, described as follows:

1. Microservices: Microservices architecture is applied across multiple layers (Agent, LLM, Fault Tolerance, Management, and Serving). Each agent, LLM instance, or specific functionality (like failure detection or load balancing) is implemented as a separate microservice using APIs. This allows for better scalability, easier updates, and more flexible deployment options.

2. Containers: Containers (like Docker) are used to package and deploy the specialized h-LLMs/agents. This ensures consistency across development and production environments, simplifies deployment, and enables easy scaling of individual components.

3. Service Mesh: A service mesh (like Istio or Linkerd) is implemented to manage communication (utilizing asynchronous or synchronous or gRPC-like mechanisms) between agents and specialized h-LLMs. It handles service discovery, load balancing, encryption, and provides additional observability and traffic management features.

4. Functions-as-a-Service (FaaS): FaaS are utilized for specific, event-driven tasks within the Agent, LLM, and Fault Tolerance layers. For example, spawning new agents, running inference on LLMs, or executing fault tolerance checks are implemented as serverless functions.

5. Orchestration: Orchestration tools and frameworks are used to manage the containers, service mesh, and FaaS components. It includes tools like Kubernetes for container orchestration, which handles scaling, load balancing, and self-healing of the containerized microservices that house these specialized agents.

6. Blockchain: Blockchain technology is leveraged to enhance AGES by providing a secure, transparent, and decentralized infrastructure for agent interactions and system management. A Blockchain network (as part of the infrastructure layer) enables decentralized identity management, smart contracts for agent governance, immutable audit trails, and tokenization of compute resources. This integration improves security through cryptographic mechanisms, enhances fault tolerance with distributed checkpointing, and enables transparent resource allocation and reputation systems for agents.

7. Agent-as-Code: AGES leverages a novel Agent-as-Code (AaC) model enabling automated deployment, scaling, and lifecycle management of agents. The AaC model introduces a declarative approach to defining and managing AI agents within the AGES framework. The AaC model allows developers to specify agent characteristics, behaviors, and interactions using a domain-specific language or configuration files. These definitions encompass the agent's cognitive architecture, learning parameters, API endpoints, and inter-agent communication protocols. By versioning these agent definitions in code repositories, teams can track changes, collaborate effectively, and ensure reproducibility across environments. This methodology facilitates rapid prototyping, easier testing, and more efficient updates to agent systems, while maintaining consistency and reducing manual configuration errors.

The term "agent" as used throughout this specification should be interpreted broadly to encompass a wide range of specialized h-LLMs applications, including use of AI brokers, and implementations and functionalities that can generate and/or use the "derived tasks" and "relevant context" of our inventive methods and systems. An agent may refer to but is not limited to: specialized autonomous or semi-autonomous software entities, AI-driven assistants, task-specific modules, multi-agent systems, language models with specialized capabilities, code interpreters, workflow automation tools, chatbots, virtual developers, research assistants, data analyzers, code generators, testing tools, or any combination thereof. Agents may operate independently or as part of a larger system, may be domain-specific and may utilize various specialized LLM technologies. The specific implementation, architecture, or capabilities of an agent or AI broker should not be construed as limiting the scope of the present invention. Agents may evolve, adapt, or be repurposed over time, and may incorporate new technologies or methodologies as they emerge. The term "agent" also extends to systems that manage, coordinate, or facilitate the operation of multiple sub-agents or agent components.

Figure 65:
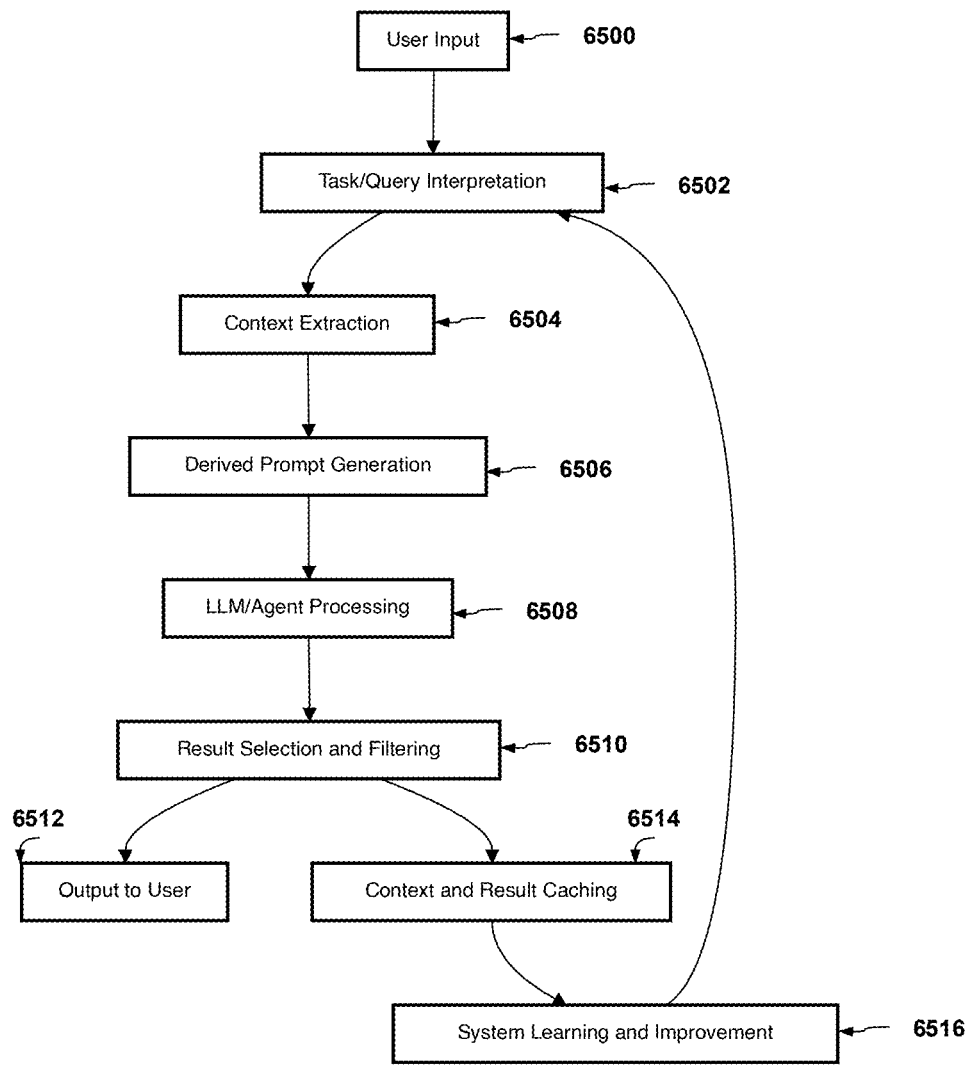
FIG. 65 is a flow chart illustrating a method of a Language Adaptive AI Processing (LEAP) model, according to an embodiment of the invention.

Referring now to FIG. 65, an illustration of Language Adaptive AI Processing (LEAP) model is described in more detail. LEAP is a new computing model that represents a significant departure from traditional computing paradigms such as ETL (Extract, Transform, Load), and instruction-set architectures like MIPS or RISC.

A method of a LEAP model comprises the following steps:

1. User Input 6500: Unlike traditional systems where inputs need to be precisely formatted, LEAP allows for natural language inputs. Users can directly express their needs, tasks, or queries without adhering to strict syntax or command structures.

2. Task and Query Interpretation 6502: The system interprets the user's input, understanding the intent and desired outcome. This step involves natural language understanding and requires context awareness.

3. Context Extraction and Generation 6504: At this step the system gathers relevant information needed to complete the task. It involves tasks such as retrieving information from databases or the internet, analyzing the user's history or preferences, and generating additional context or sub-tasks as needed.

4. Derived Prompt and/or Task Generation 6506: Based on the extracted context, the system may generate more specific or detailed prompts. These derived prompts are designed to elicit the most relevant and accurate responses from the LLM or agents who may in turn generate additional derived tasks or prompts for additional processing, including calling external tools, such as search tools or accessing external content.

5. LLM/Agent Processing 6508: The core computation happens here, where LLMs or specialized AI agents process the prompts, and/or generate derived tasks, and generate results. This step can involve multiple iterations or agent collaborations.

6. Result Selection and Filtering 6510: The system applies guardrails and filters to ensure the generated results are safe, relevant, and align with predefined criteria. This step might involve fact-checking, bias detection, or content moderation. The results can then be output to the user 6512.

7. Context and Result Caching 6514: The system caches both the context and results for future reference.

8. System Learning and Improvement 6516: The cached context and results improve efficiency for similar future queries and allows the system to learn and improve over time.

The benefits of LEAP as compared to traditional computation models includes:

1. Flexibility: Unlike rigid instruction-set architectures (ISA) like MIPS or RISC, LEAP adapts to user needs dynamically, by leveraging application or task specific agents.
2. Natural Interaction: It moves away from command-line interfaces or structured programming to natural language interactions.
3. Contextual Understanding: Unlike the load/store/execute model, LEAP incorporates
4. Continuous Learning: The feedback loop enables ongoing improvement, contrasting with static traditional models.
5. Task-Centric: While ETL focuses on data movement and transformation, LEAP is centered around completing user-defined tasks.
6. Abstraction: LEAP abstracts away low-level computational details, focusing on high-level problem-solving.
7. Improved Performance: The techniques used in the LEAP model lead to improvements in speed, accuracy, capability and automation.

The Language Adaptive AI Processing (LEAP) model described herein encompasses various implementations and configurations. The steps outlined in FIG. 30 may be executed in different orders, combined, or further subdivided based on specific applications or implementations. The acquisition, generation, or utilization of data, context, tools, or instructions may occur at any point within the LEAP processing pipeline, including but not limited to the initial stages, during agent task assignment, or as part of iterative processing loops. Context, as referenced in this specification, should be interpreted broadly to include, but not be limited to, data from databases, real-time data feeds, tools for data retrieval or manipulation, instructions for task execution, or any other information or resources that contribute to task comprehension and execution. The flexible nature of LEAP allows for dynamic adaptation of its processes based on the requirements of each unique task or query, and the specific implementation should not be limited to a fixed sequence of operations.

Figure 66:
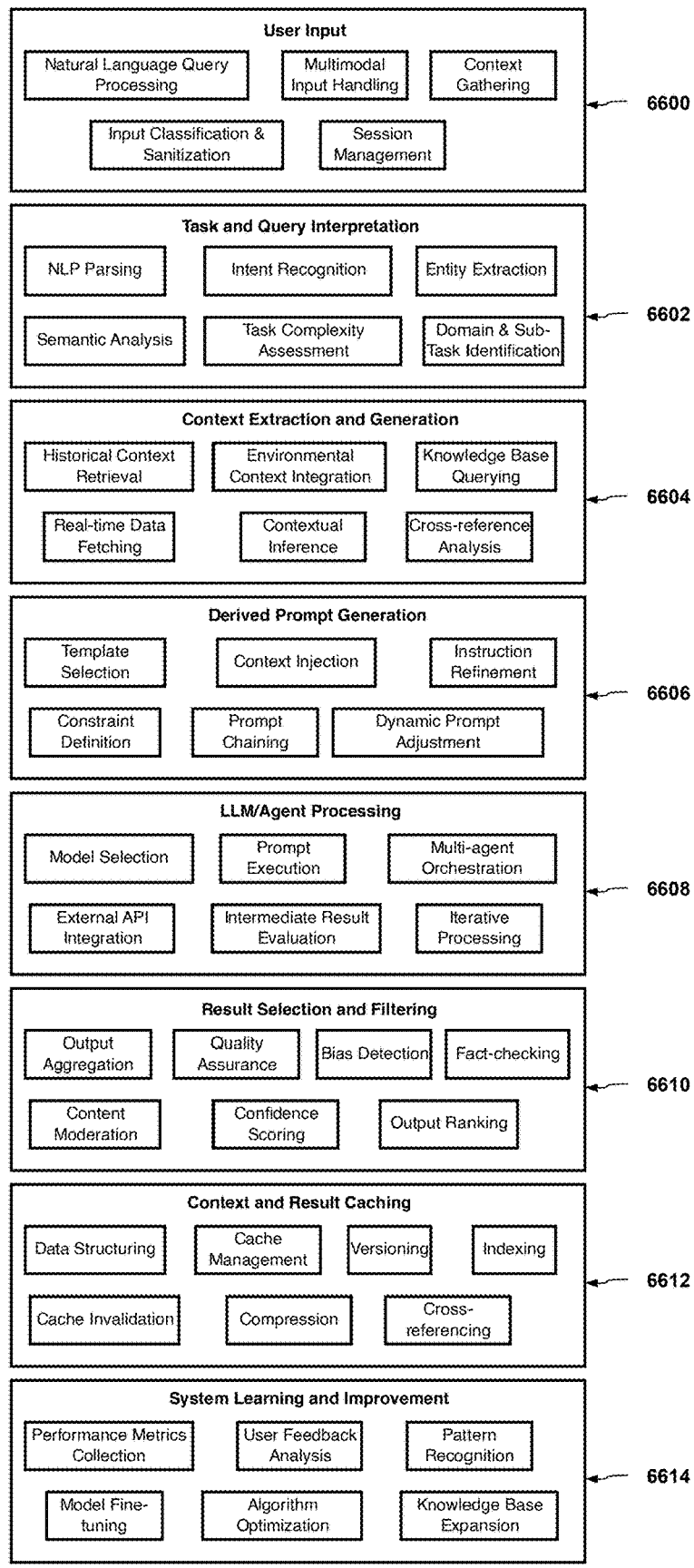
FIG. 66 is an illustration of the tasks/processes involved at each step of the LEAP model, according to an embodiment of the invention.

Referring now to FIG. 66, an illustration of the tasks/processes involved at each step of the LEAP model, is described in more detail. The list of tasks/processed for each step of the LEAP model includes:

1. User Input 6600:
   a) Natural Language Query Processing: Accept and parse user input in natural language form;
   b) Multimodal Input Handling: Process various input types (text, voice, images, video);
   c) Context Gathering: Collect relevant contextual information from user history, environment, or explicit user input;
   d) Input Classification & Sanitization: Categorize the type of input or task for appropriate routing. Clean and standardize input to prevent errors or security issues; and
   e) Session Management: Verify user identity and permissions if required. Maintain user session data for continuity in multi-session interactions.

2. Task and Query Interpretation 6602:
   a) NLP Parsing: Break down the input into analyzable components (tokens, phrases, sentences);
   b) Intent Recognition: Identify the user's primary goal or intent behind the query or task;
   c) Entity Extraction: Identify and categorize key entities, concepts, and parameters in the input;
   d) Semantic Analysis: Understand the meaning, relationships, and implications in the input;
   e) Task Complexity Assessment: Evaluate the complexity and scope of the requested task; and
   f) Domain & Subtask Identification: Determine the relevant domain(s) for the task or query; break down complex queries into component subtasks if necessary;

3. Context Extraction and Generation 6604:
   a) Historical Context Retrieval: Access and incorporate relevant past interactions or tasks;
   b) Environmental Context Integration: Incorporate time, location, device type, user profile, and other information;
   c) Knowledge Base Querying: Access relevant information from internal or external knowledge bases;
   d) Real-time Data Fetching: Retrieve up-to-date information from APIs or databases as needed;
   e) Contextual Inference: Generate additional context based on available information; integrations with external tools, APIs, data providers and brokers allows enhancing the context information; and
   f) Cross-reference Analysis: Identify connections between the current task and related information;

4. Derived Prompt Generation 6606:
   a) Template Selection: Choose or create appropriate base prompts for the task;
   b) Context Injection: Integrate relevant context into the prompt structure;
   c) Instruction Refinement: Optimize instructions for clarity, specificity, and effectiveness;
   d) Constraint Definition: Set boundaries and limitations for the output in the prompt;
   e) Prompt Chaining: Create sequences of prompts for multi-step tasks; and
   f) Dynamic Prompt Adjustment: Modify prompts based on intermediate results or feedback;

5. LLM/Agent Processing 6608:
   a) Model Selection: Choose appropriate LLM(s), agent(s), and/or broker(s) for the task(s) or derived task(s);
   b) Prompt Execution: Submit derived prompts to the selected LLM(s), agent(s), and/or broker(s);
   c) Multi-agent Orchestration: Coordinate multiple AI agents for complex tasks;
   d) External API Integration: Interface with external services or tools as needed;
   e) Compute Resource Allocation: Manage and optimize computational resources;
   f) Intermediate Result Evaluation: Assess outputs at various stages of processing; and
   g) Iterative Processing: Conduct multiple rounds of processing if required;
6. Result Selection and Filtering 6610:
   a) Output Aggregation: Compile and organize results from various processing steps;
   b) Quality Assurance: Check output for accuracy, relevance, coherence, and safety;
   c) Bias Detection: Identify and mitigate potential biases in the output;
   d) Fact-checking: Verify factual claims against reliable sources;
   e) Content Moderation: Filter out inappropriate or harmful content;
   f) Confidence Scoring: Assign confidence levels to different parts of the output; and
   g) Output Ranking: Prioritize multiple results based on relevance and quality;
7. Context and Result Caching 6612:
   a) Data Structuring: Organize context and results in efficient data structures;
   b) Cache Management: Implement and maintain caching mechanisms for quick retrieval;
   c) Versioning: Track different versions of context and results over time;
   d) Indexing: Create indexes for fast searching and retrieval of cached data;
   e) Cache Invalidation: Determine when cached data should be updated or removed;
   f) Compression: Optimize storage of cached data to save space; and
   g) Cross-referencing: Link related cached items for comprehensive retrieval;
8. System Learning and Improvement 6614:
   a) Performance Metrics Collection: Gather data on system performance and user satisfaction;
   b) User Feedback Analysis: Process and learn from explicit and implicit user feedback;
   c) Pattern Recognition: Identify recurring patterns in tasks, contexts, and results;
   d) Model Fine-tuning: Adjust language models based on accumulated data and feedback;
   e) Algorithm Optimization: Improve task interpretation and context extraction algorithms; and
   f) Knowledge Base Expansion: Update and expand internal knowledge bases with new information.

Additional tasks, such as advertisement generation based on elicitation of attitudes, behavior, contextual history of purchases or queries, and derivation of intentions of the user by the LLMs can be used to provide a context for monetization of these AI agents.

The tasks, processes, and steps described in herein for the Language Adaptive AI Processing (LEAP) model are provided as exemplary and non-limiting illustrations. It should be understood that these examples are not exhaustive, and additional tasks or processes may be implemented at each step of the LEAP model. The specific tasks performed, their ordering, and their implementation may vary depending on the particular embodiment, application, or use case of the LEAP model.

Furthermore, the ordering of the steps and tasks presented in this specification is not fixed and may be altered, combined, subdivided, or rearranged in different embodiments or variations of the LEAP model. Some steps or tasks may be performed concurrently, iteratively, or in a different sequence than presented here. Certain steps or tasks may be omitted in some implementations, while additional steps or tasks not explicitly mentioned may be incorporated in others. The flexibility of the LEAP model allows for dynamic adaptation to various contexts, requirements, and technological advancements. As such, the scope of this present invention is not limited to the specific examples, orderings, or implementations described, but encompasses all variations and modifications that fall within the domain of the LEAP model. Additional details regarding these features may be found in U.S. patent application Ser. No. 18/812,707 which is incorporated by reference hereinabove.

Figure 67:
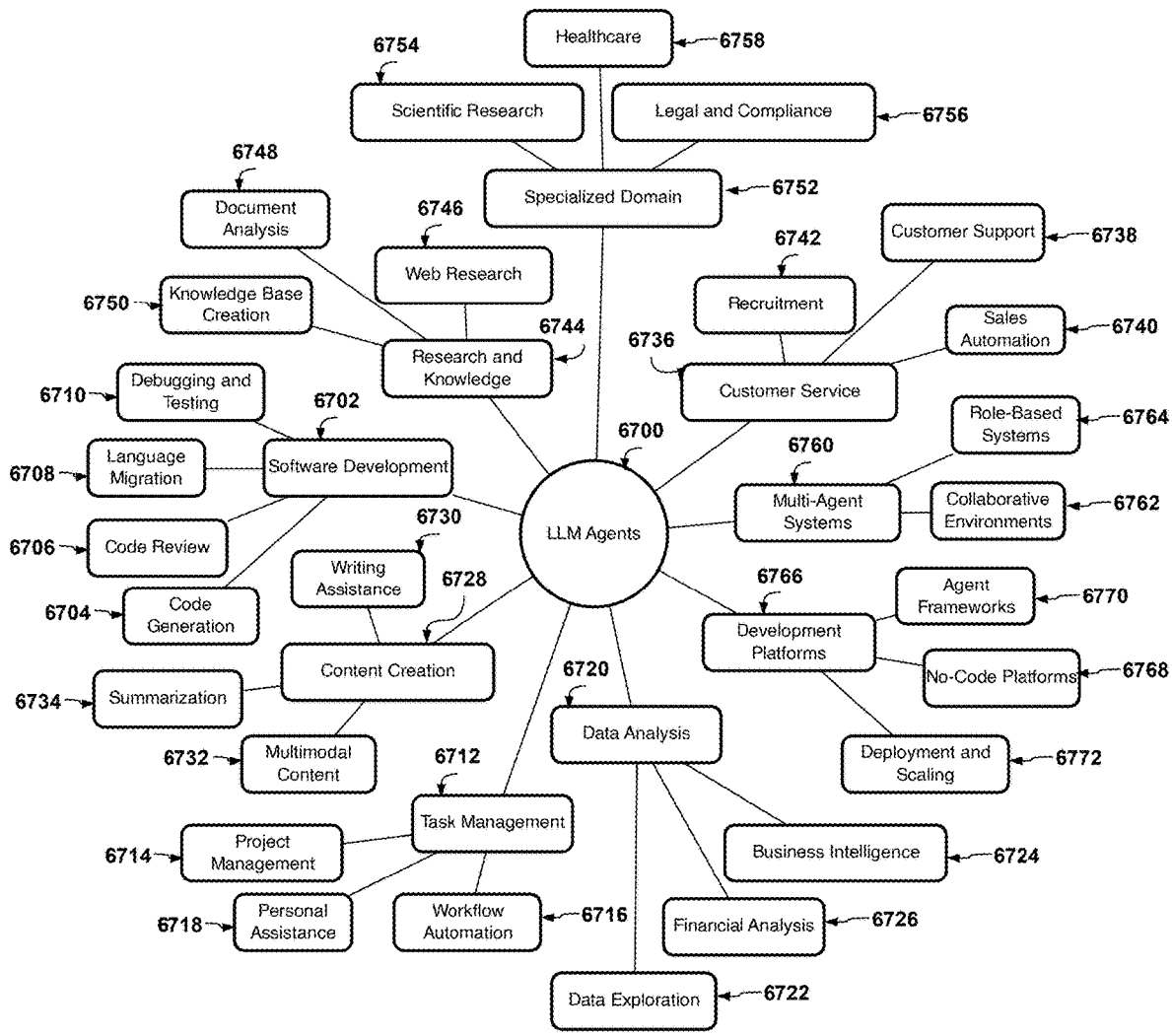
FIG. 67 is an illustration of types of LLM and AI Agents, and Agent Frameworks, according to an embodiment of the invention.

Referring now to FIG. 67, an illustration of types of LLM and AI Agents, and Agent Frameworks is described in more detail. LLM Agents are AI-powered systems that can perform a wide range of tasks autonomously or semi-autonomously. These agents leverage the capabilities of LLMs to understand and generate human-like text, enabling them to interact with users, process information, and complete various actions. The following categories describe different types of LLM Agents:

1. Software Development Agents 6702: These agents assist in various aspects of software development:
   a) Code Generation 6704: Agents that can generate entire codebases or specific functions based on natural language prompts;
   b) Code Review and Improvement 6706: Agents capable of reviewing code, suggesting improvements, and even creating pull requests;
   c) Language and Framework Migration 6708: Agents that can assist in migrating codebases between different programming languages or frameworks; and
   d) Debugging and Testing 6710: Agents designed to identify and fix bugs, as well as generate and run tests;
2. Task Management and Workflow Automation Agents 6712: These agents help organize and execute tasks:
   a) Project Management 6714: Agents that can manage and prioritize tasks within a project context;
   b) Workflow Automation 6716: Agents capable of automating complex workflows and business processes; and
   c) Personal Assistance 6718: Agents that can help with daily tasks, note-taking, and personal organization.
3. Data Analysis and Business Intelligence Agents 6720: These agents specialize in processing and analyzing data:
   a) Data Exploration 6722: Agents that can explore and analyze datasets, generate insights, and visualize results;
   b) Business Intelligence 6724: Agents capable of providing business insights and performing market analysis; and
   c) Financial Analysis 6726: Agents that can assist with financial modeling and analysis;

4. Content Creation and Management Agents 6728: These agents help create, edit, and manage various types of content:
   a) Writing Assistance 6730: Agents that can generate written content for various purposes, such as marketing or documentation;
   b) Multimodal Content Creation 6732: Agents capable of creating or manipulating images, audio, or video alongside text; and
   c) Content Summarization and Organization 6734: Agents that can summarize content and create quizzes or other derivative materials;
5. Customer Service and Sales Agents 6736: These agents interact with customers or assist with sales processes:
   a) Customer Support 6738: Agents that can handle customer inquiries, provide product information, and troubleshoot issues;
   b) Sales Automation 6740: Agents capable of assisting with lead generation, follow-ups, and sales processes; and
   c) Recruitment 6742: Agents that can assist with various aspects of the recruiting process;
6. Research and Knowledge Management Agents 6744: These agents help gather, organize, and synthesize information:
   a) Web Research 6746: Agents capable of searching the internet for information on specific topics;
   b) Document Analysis 6748: Agents that can analyze and extract information from large document collections; and
   c) Knowledge Base Creation 6750: Agents that can help create and maintain knowledge bases or wikis for organizations;
7. Specialized Domain Agents 6752: These agents focus on specific industries or domains;
   a) Scientific Research 6754: Agents that specialize in domain-specific tasks and research, such as chemistry or biology;
   b) Legal and Compliance 6756: Agents that can assist with legal research, contract analysis, and compliance checks; and
   c) Healthcare 6758: Agents capable of helping with medical research, patient data analysis, and treatment recommendations;
8. Multi-Agent Systems 6760: These are frameworks or platforms that allow multiple agents to work together:
   a) Collaborative Environments 6762: Systems that enable multiple agents to interact and solve problems collectively; and
   b) Role-Based Systems 6764: Frameworks that allow for the creation of teams of agents with specific roles and responsibilities;
9. Development and Deployment Platforms 6766: These are tools and platforms for creating, managing, and deploying LLM Agents:
   a) No-Code Platforms 6768: Systems that allow users to create and deploy agents without programming knowledge;
   b) Agent Frameworks 6770: Tools that provide developers with frameworks for building custom agents; and
   c) Deployment and Scaling 6772: Platforms that help deploy and scale agent applications in production environments.

The above categorization and description of LLM and Generative AI Agents is provided for illustrative purposes only and is not intended to be exhaustive or limiting in nature. The present invention encompasses these described types of agents as well as other types of agents not explicitly mentioned herein. The categorization is exemplary, and it is understood that agents may fall into multiple categories, combine features from different categories, or represent entirely new categories not described below. The scope of the present invention includes any and all types of LLM and Generative AI Agents that utilize AI models to perform tasks autonomously or semi-autonomously.

Figure 68:
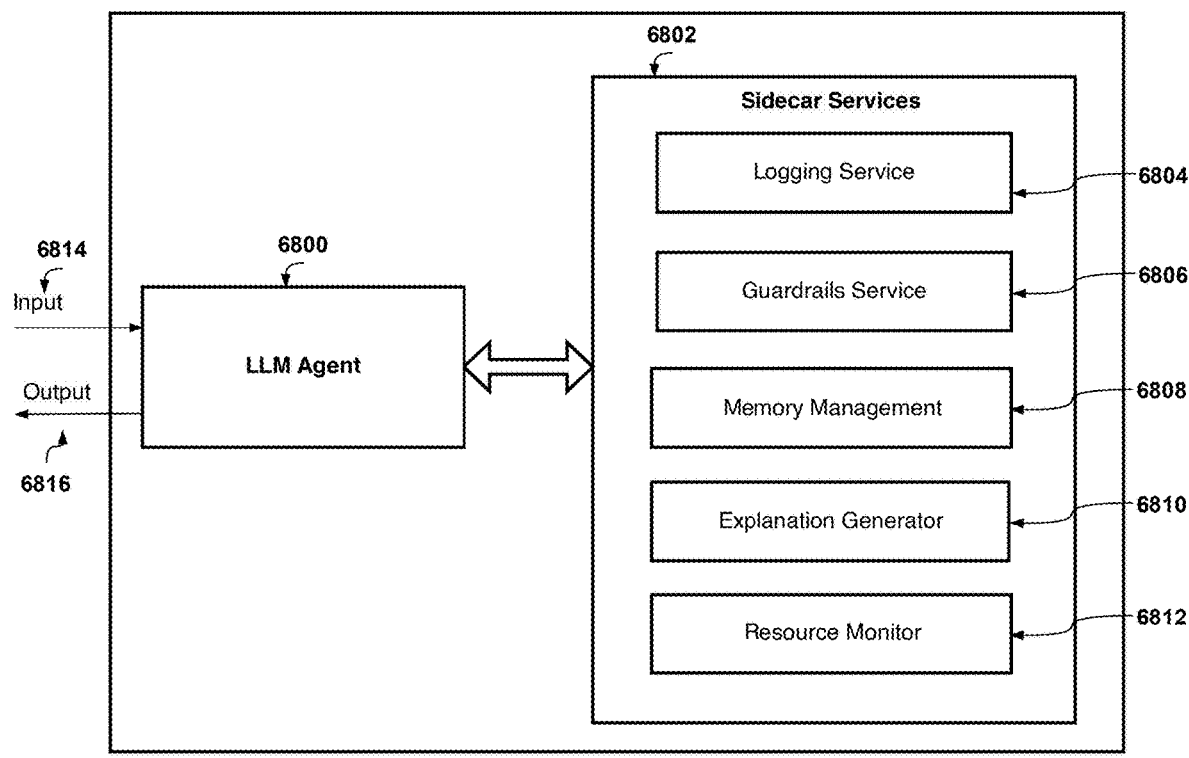
FIG. 68 is an illustration a sidecar pattern for agents, according to an embodiment of the invention.

Referring now to FIG. 68, an illustration of a sidecar pattern for agents according to an embodiment of the invention is described in more detail. The sidecar pattern provides a method for attaching auxiliary services to a main LLM agent without modifying its core logic. The main LLM agent 6800 is surrounded by multiple sidecar services 6802, including but not limited to a logging service 6804, a guardrails service 6806, a memory management service 6808, an explanation generator service 6810, and a resource monitor service 6812. The logging service 6804 tracks at least some and/or of interactions, decisions, and internal states of the agent, providing a comprehensive audit trail of the agent's operations. The guardrails service 6806 enforces ethical constraints and safety measures on the agent's actions, ensuring that the agent operates within predefined boundaries. The memory management service 6808 handles short-term and long-term memory storage and retrieval for the agent, enabling more consistent and context-aware responses over extended interactions. The explanation generator service 6810 provides human-readable explanations for the agent's decisions, enhancing transparency and interpretability of the agent's actions. The resource monitor 6812 tracks and optimizes resource usage, including API calls and compute resources, ensuring efficient operation of the agent. External input 6814 flows into the LLM agent, and external output 6816 flows out, with all sidecar services 6802 potentially influencing or monitoring this flow. The sidecar services 6802 may operate in its own container within a pod that it shares with an agent or broker's container.

Figure 69:
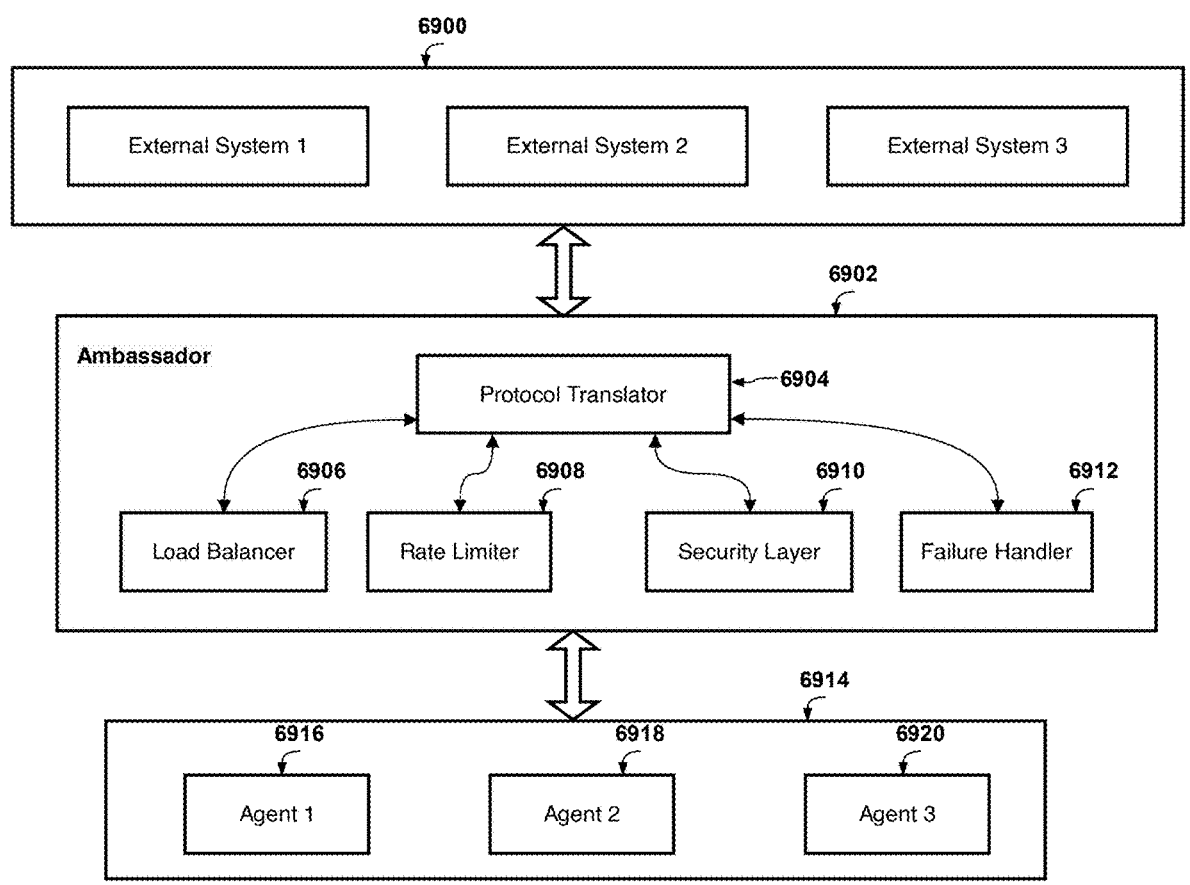
FIG. 69 is an illustration of an ambassador pattern for agent communication, according to an embodiment of the invention.

Referring now to FIG. 69, an illustration of an ambassador pattern for agent communication according to an embodiment of the invention is described in more detail. The ambassador pattern provides a method for managing communication between agents and external systems. An ambassador component 6902 acts as an intermediary between external systems 6900 and an agent cluster 6914. The ambassador pattern comprises a protocol translator 6904, which handles the conversion of various communication protocols between external systems and agents. Connected to the protocol translator 6904 are four services: a load balancer 6906, a rate limiter 6908, a security layer 6910, and a failure handler 6912. The load balancer 6906 distributes incoming requests across multiple agents in the cluster, ensuring efficient utilization of resources. The rate limiter 6908 prevents overwhelming of individual agents or external services by controlling the rate of requests. The security layer 6910 implements authentication and authorization mechanisms, ensuring secure communication between external systems and agents. The failure handler 6912 implements retry logic and fallback mechanisms for failed agent responses, enhancing the overall reliability of the system.

Figure 70:
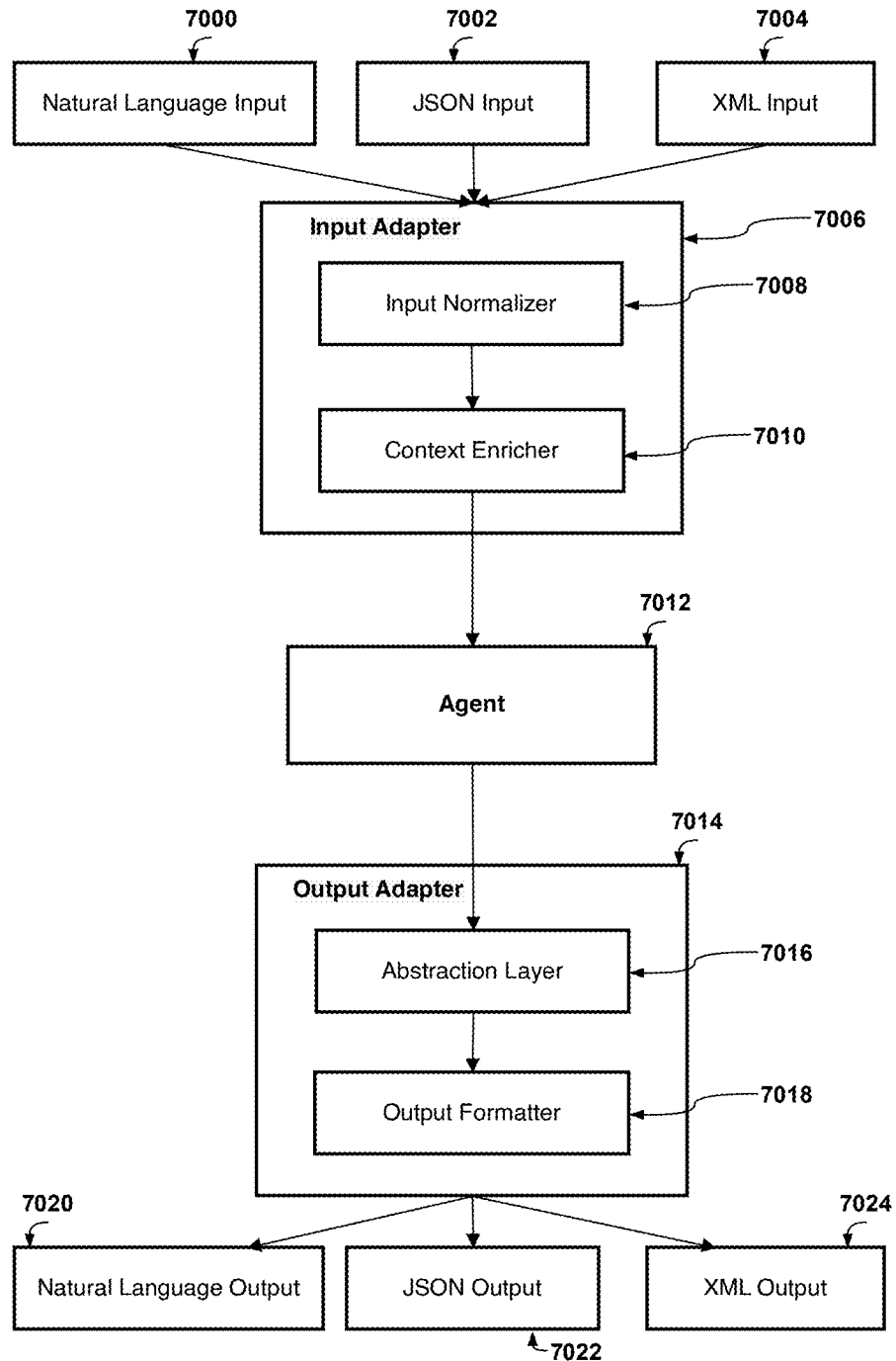
FIG. 70 is an illustration of an adapter pattern for input/output transformation, according to an embodiment of the invention.

Referring now to FIG. 70, an illustration of an adapter pattern for input/output transformation according to an embodiment of the invention is described in more detail. The adapter pattern provides a method for standardizing inputs to and outputs from an LLM Agent. The adapter pattern comprises an input adapter 7006, an output adapter 7014, and an agent 7012. The input adapter 7006 comprises, and in some embodiments consists of, an input normalizer 7008 and a context enricher 7010. The input normalizer 7008 standardizes various input formats 7000, 7002, 7004 (e.g., natural language, JavaScript Object Notation (JSON), and/or extensible markup language (XML)) into a consistent structure for the agent. The context enricher 7010 augments the normalized input with additional context before passing it to the agent. The output adapter 7014 comprises, and in some embodiments consists of, an abstraction layer 7016 and an output formatter 7018. The abstraction layer 7016 simplifies complex agent outputs and the output formatter 7018 transforms the abstracted output into required formats for external consumption, for example natural language output 7020, JSON output 7022, and/or XML output 7024. This arrangement facilitates the agent 7012 operating on a standardized input format and produce a standardized output, regardless of the varying requirements of different external systems.

The sidecar, ambassador, and adapter patterns described above offer several advantages for LLM agents and agentic applications:
1. Modularity: Each pattern allows for the addition or modification of functionality without altering the core agent logic.
2. Scalability: The patterns facilitate easy scaling of agent systems to handle increased load or complexity.
3. Maintainability: By separating concerns, these patterns make it easier to update, debug, and maintain different aspects of the agent system independently.
4. Flexibility: The patterns allow for easy adaptation to different use cases and integration with various external systems.
5. Reliability: Through features like load balancing and failure handling, these patterns enhance the overall reliability of agent systems.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:
1. A method of generating outputs in large language models (LLMs) comprising:
   receiving one or more documents comprising textual content;
   defining one or more contexts for the one or more documents comprising:
      identifying at least one of a topic or a category associated with the textual content;
      segmenting the textual content into one or more content chunks, each content chunk being associated with the at least one of topic or category;
      assigning at least one tag to each content chunk of the one or more content chunks;
      identifying one or more selected chunks from the one or more content chunks;
      adding metadata to the one or more selected chunks; and
      indexing the one or more selected chunks into an index;
   receiving a query related to the one or more documents from a user; and
   performing a response generation process comprising:
      determining if a cache comprises information related to the query;
      responsive to determining the cache comprises information related to the query, retrieving the information from the cache; and
      responsive to determining the cache does not comprise the information, performing a search of the index to retrieve the information;
      generating an augmented query by augmenting the query with information retrieved from at least one of the cache or the search; and
      generating a response based on the augmented query;
   evaluating the response for compliance with one or more criteria;
   responsive to determining the response complies with the one or more criteria:
      generating a final response; and
      transmitting the final response to the user; and
   responsive to determining the response does not comply with at least one criterion of the one or more criteria, performing a fine-tuning process comprising redefining a context of the one or more contexts.
2. The method of claim 1 wherein identifying one or more selected chunks from the one or more content chunks comprises:
   identifying a first set of selected chunks from the one or more content chunks utilizing a first selection search method; and
   identifying a second set of selected chunks from the one or more content chunks utilizing a second selection search method in parallel with the identification of the first set of selected chunks.

3. The method of claim 2 further comprising:
adding metadata to each chunk of the first and second sets of selected chunks;
indexing the first set of selected chunks in a first index;
indexing the second set of selected chunks in a second index;
performing a first response generation process for the query using the first index, generating a first response;
performing a second response generation process for the query using the second index, generating a second response, in parallel to performing the first response generation process; and
at least one of:
merging the first and second responses into a merged final response and transmitting the merged final response to the user; or
selecting one of the first and second responses as a selected final response and transmitting the selected final response to the user.

4. The method of claim 1 wherein identifying one or more selected chunks from the one or more content chunks comprises:
identifying a first set of selected chunks from the one or more content chunks utilizing a first selection search method;
identifying a second set of selected chunks from the one or more content chunks utilizing a second selection search method;
adding metadata to each chunk of the first and second sets of selected chunks;
indexing the first set of selected chunks in a first index;
indexing the second set of selected chunks in a second index;
performing a first response generation process for the query using the first index, generating a first response;
performing a second response generation process for the query using the second index, generating a second response, subsequent to performing the first response generation process;
aggregating the first and second responses into an aggregated response;
evaluating the aggregated response as the response for compliance with the one or more criteria;
responsive to determining the aggregated response complies with the one or more criteria:
generating the final response; and
transmitting the final response to the user; and
responsive to determining the aggregated response does not comply with at least one criterion of the one or more criteria, performing a fine-tuning process comprising redefining a context of the one or more contexts.

5. The method of claim 1 wherein indexing the one or more selected chunks into the index comprises indexing the one or more selected chunks into at least one of a vector database, a graph database, or a full-text search engine.

6. The method of claim 5 wherein:
indexing the one or more selected chunks into the index comprises indexing the one or more selected chunks into at least two of a vector database, a graph database, or a full-text search engine; and
performing a search of the index comprises performing a hybrid search of the at least two of a vector database, a graph database, or a full-text search engine.

7. The method of claim 1 wherein the fine-tuning process comprises changing at least one of an LLM or a parameter used in:
identifying the at least one of a topic or a category;
segmenting the textual content into the one or more content chunks;
assigning at least one tag to each content chunk of the one or more content chunks;
identifying the one or more selected chunks;
adding metadata to the one or more selected chunks;
indexing the one or more selected chunks; or
performing a search of the index.

8. The method of claim 1 wherein evaluating the response is performed by at least one LLM.

9. The method of claim 8 wherein evaluating the response is performed by a plurality of LLMs.

10. The method of claim 9 wherein the plurality of LLMs are implemented in a cloud environment.

11. The method of claim 9 wherein at least one LLM of the plurality of LLMs is specialized to evaluate the response for a specific criterion.

12. The method of claim 11 wherein the specific criterion is one of quality, accuracy, correctness, ethics, bias, or relevance.

13. A system for generating outputs in large language models (LLMs) comprising:
a processor;
a communication device positioned in communication with the processor and operable to send and receive transmissions across a network; and
a non-transitory computer-readable storage medium positioned in communication with the processor and having stored thereon software that, when executed by the processor, is operable to:
receive one or more documents comprising textual content;
define one or more contexts for the one or more documents comprising:
identifying at least one of a topic or a category associated with the textual content;
segmenting the textual content into one or more content chunks, each content chunk being associated with the at least one of topic or category;
assigning at least one tag to each content chunk of the one or more content chunks;
identifying one or more selected chunks from the one or more content chunks;
adding metadata to the one or more selected chunks; and
indexing the one or more selected chunks into an index;
receive a query related to the one or more documents from a user; and
perform a response generation process comprising:
determining if a cache comprises information related to the query;
responsive to determining the cache comprises information related to the query, retrieving the information from the cache; and
responsive to determining the cache does not comprise the information, performing a search of the index to retrieve the information;

generating an augmented query by augmenting the query with information retrieved from at least one of the cache or the search; and
generating a response based on the augmented query;
evaluate the response for compliance with one or more criteria;
responsive to determining the response complies with the one or more criteria:
generate a final response; and
transmit the final response to the user; and
responsive to determining the response does not comply with at least one criterion of the one or more criteria, perform a fine-tuning process comprising redefining a context of the one or more contexts.

14. The system of claim 13 wherein identifying one or more selected chunks from the one or more content chunks comprises:
identifying a first set of selected chunks from the one or more content chunks utilizing a first selection search method; and
identifying a second set of selected chunks from the one or more content chunks utilizing a second selection search method in parallel with the identification of the first set of selected chunks.

15. The system of claim 14 wherein the software is configured to, when executed by the processor:
further define the context of the one or more documents by:
adding metadata to each chunk of the first and second sets of selected chunks;
indexing the first set of selected chunks in a first index; and
indexing the second set of selected chunks in a second index;
perform a first response generation process for the query using the first index, generating a first response;
perform a second response generation process for the query using the second index, generating a second response, in parallel to performing the first response generation process; and
at least one of:
merge the first and second responses into a merged final response and transmitting the merged final response to the user; or
select one of the first and second responses as a selected final response and transmitting the selected final response to the user.

16. The system of claim 13 wherein the software is configured to, when executed by the processor:
identify the one or more selected chunks from the one or more content chunks by:
identifying a first set of selected chunks from the one or more content chunks utilizing a first selection search method;
identifying a second set of selected chunks from the one or more content chunks utilizing a second selection search method;
adding metadata to each chunk of the first and second sets of selected chunks;
indexing the first set of selected chunks in a first index; and
indexing the second set of selected chunks in a second index;
perform a first response generation process for the query using the first index, generating a first response;
perform a second response generation process for the query using the second index, generating a second response, subsequent to performing the first response generation process;
aggregate the first and second responses into an aggregated response;
evaluate the aggregated response as the response for compliance with the one or more criteria;
responsive to determining the aggregated response complies with the one or more criteria:
generate the final response; and
transmit the final response to the user; and
responsive to determining the aggregated response does not comply with at least one criterion of the one or more criteria, perform a fine-tuning process comprising redefining a context of the one or more contexts.

17. The system of claim 13 wherein indexing the one or more selected chunks into the index comprises indexing the one or more selected chunks into at least one of a vector database, a graph database, or a full-text search engine.

18. The system of claim 17 wherein:
indexing the one or more selected chunks into the index comprises indexing the one or more selected chunks into at least two of a vector database, a graph database, or a full-text search engine; and
performing a search of the index comprises performing a hybrid search of the at least two of a vector database, a graph database, or a full-text search engine.

19. The system of claim 13 wherein the software is configured to, when executed by the processor, perform the fine-tuning by changing at least one of an LLM or a parameter used in:
identifying the at least one of a topic or a category;
segmenting the textual content into the one or more content chunks;
assigning at least one tag to each content chunk of the one or more content chunks;
identifying the one or more selected chunks;
adding metadata to the one or more selected chunks;
indexing the one or more selected chunks; or
performing a search of the index.

20. The system of claim 13 wherein the software is configured to, when executed by the processor, evaluate the response by transmitting the response to be evaluated by at least one LLM.

21. The system of claim 20 wherein the software is configured to, when executed by the processor, evaluate the response by transmitting the response to be evaluated by a plurality of LLMs.

22. The system of claim 21 wherein the plurality of LLMs are implemented in a cloud environment.

23. The system of claim 21 wherein at least one LLM of the plurality of LLMs is specialized to evaluate the response for a specific criterion.

24. The system of claim 23 wherein the specific criterion is one of quality, accuracy, correctness, ethics, bias, or relevance.

* * * * *